(12) United States Patent
Gasselin de Richebourg et al.

(10) Patent No.: US 10,114,499 B2
(45) Date of Patent: Oct. 30, 2018

(54) ENHANCED HANDLING OF REMOTE CONTROLLER TOUCHPAD INPUT DATA

(71) Applicant: Apple Inc., Cupertino, CA (US)

(72) Inventors: Jacques P. Gasselin de Richebourg, San Jose, CA (US); Norman N. Wang, Saratoga, CA (US); James J. Cwik, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 138 days.

(21) Appl. No.: 14/833,943

(22) Filed: Aug. 24, 2015

(65) Prior Publication Data
US 2017/0060287 A1 Mar. 2, 2017

(51) Int. Cl.
| | | |
|---|---|---|
| G06F 3/0488 | (2013.01) | |
| A63F 13/42 | (2014.01) | |
| G06F 3/041 | (2006.01) | |
| H04N 21/472 | (2011.01) | |
| G06F 3/0484 | (2013.01) | |
| G06F 3/0346 | (2013.01) | |
| A63F 13/422 | (2014.01) | |
| H04N 21/45 | (2011.01) | |

(Continued)

(52) U.S. Cl.
CPC .......... *G06F 3/0416* (2013.01); *A63F 13/42* (2014.09); *G06F 3/04886* (2013.01); *A63F 13/422* (2014.09); *G06F 3/0346* (2013.01); *G06F 3/04847* (2013.01); *G06F 3/04883* (2013.01); *G06F 2203/04808* (2013.01); *H04N 21/4227* (2013.01); *H04N 21/4532* (2013.01); *H04N 21/4781* (2013.01); *H04N 21/47217* (2013.01)

(58) Field of Classification Search
CPC .......... G06F 3/044; G06F 2203/04104; G06F 2201/835; G06F 3/0416; G06F 3/0346; G06F 3/04847; G06F 3/04883; G06F 3/04886; G06F 2203/04808; G06F 3/041; A63F 13/42; A63F 13/422; A63F 13/40; A63F 13/216; A63F 13/00; H04N 21/4227; H04N 21/4532; H04N 21/47217; H04N 21/4781; H04N 21/4524; H04N 21/45; H04N 21/00
See application file for complete search history.

(56) References Cited

U.S. PATENT DOCUMENTS 9,197,717 B2 * 11/2015 Gibbon ................. H04L 67/325
9,310,930 B2 * 4/2016 Sundara-Rajan ..... G06F 3/0416
(Continued)

FOREIGN PATENT DOCUMENTS

WO WO 2014129753 A1 * 8/2014 ........... G06F 3/0416

OTHER PUBLICATIONS

"Game Conrtoller Programming Guide" Apple Inc., Mar. 19, 2014, 35 pages.

*Primary Examiner* — Julie Anne Watko
(74) *Attorney, Agent, or Firm* — Van Court & Aldridge LLP

(57) ABSTRACT

Systems, methods, and computer-readable media are provided for enabling efficient control of a media application at a media electronic device by a user electronic device, and, more particularly, for more practically handling initial and subsequent user touch events on a surface of a touchpad input component with respect to a potentially intended default center position and/or for more accurately enabling full saturation of a particular directional control.

20 Claims, 29 Drawing Sheets

(51) Int. Cl.
*H04N 21/4227* (2011.01)
*H04N 21/478* (2011.01)

(56) References Cited

U.S. PATENT DOCUMENTS

| | | | |
|---|---|---|---|
| 2012/0169646 A1* | 7/2012 | Berkes | G06F 3/0488 |
| | | | 345/174 |
| 2012/0206380 A1* | 8/2012 | Zhao | G06F 3/04883 |
| | | | 345/173 |
| 2013/0021272 A1* | 1/2013 | Wang | G06F 3/0416 |
| | | | 345/173 |
| 2014/0313146 A1* | 10/2014 | Munechika | G06F 3/041 |
| | | | 345/173 |
| 2018/0046265 A1* | 2/2018 | Cook | G06F 3/0346 |

* cited by examiner

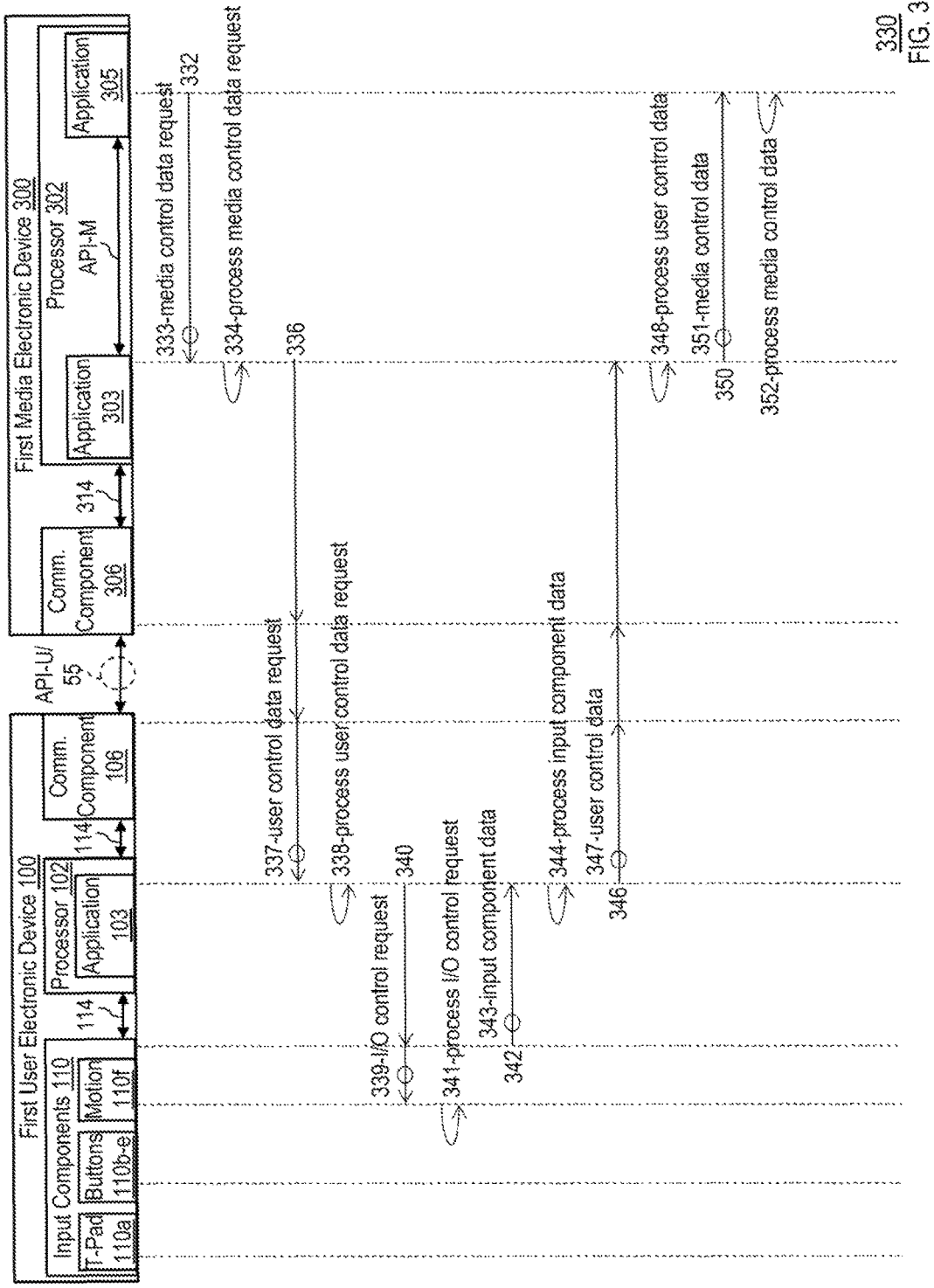

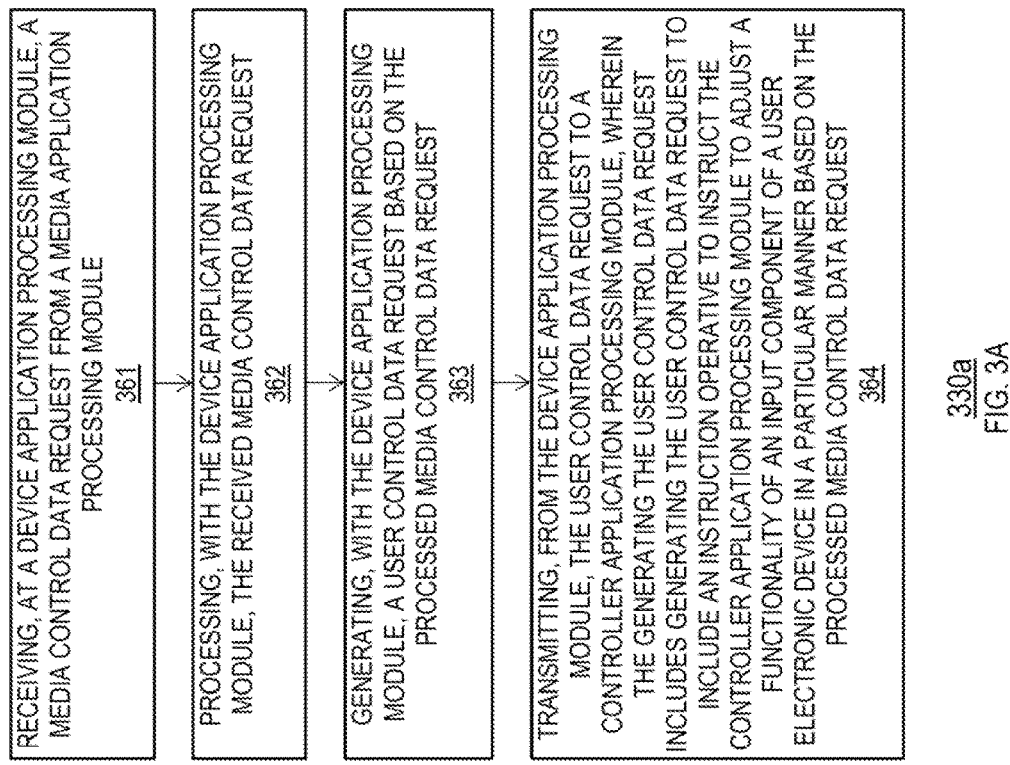

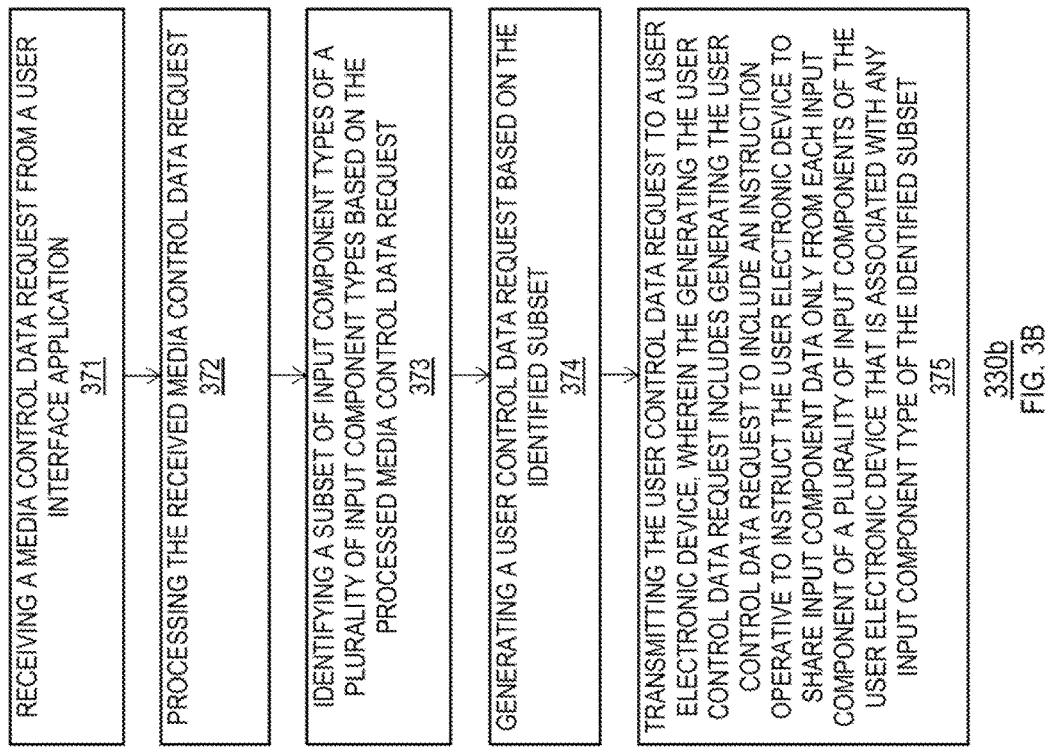

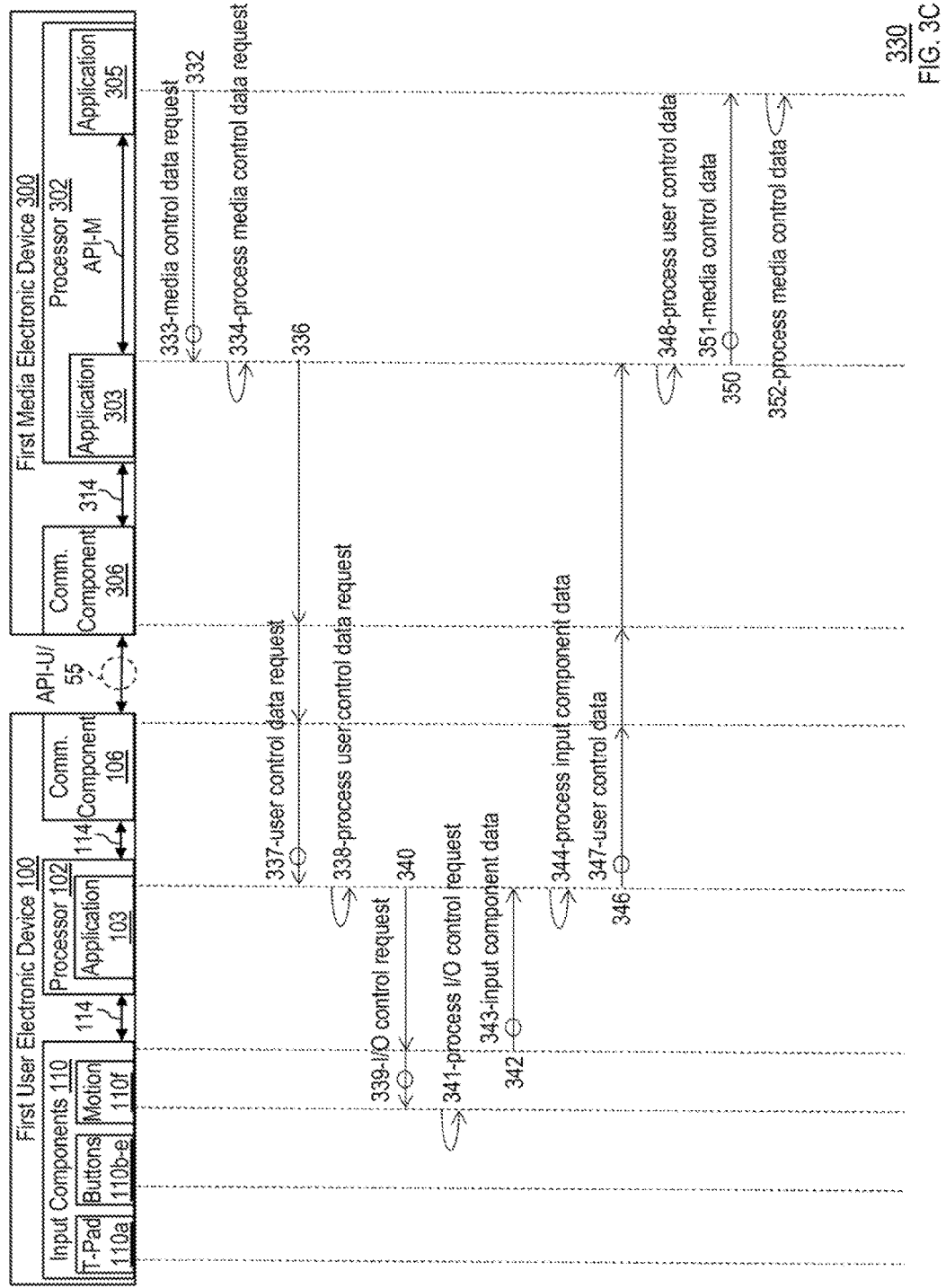

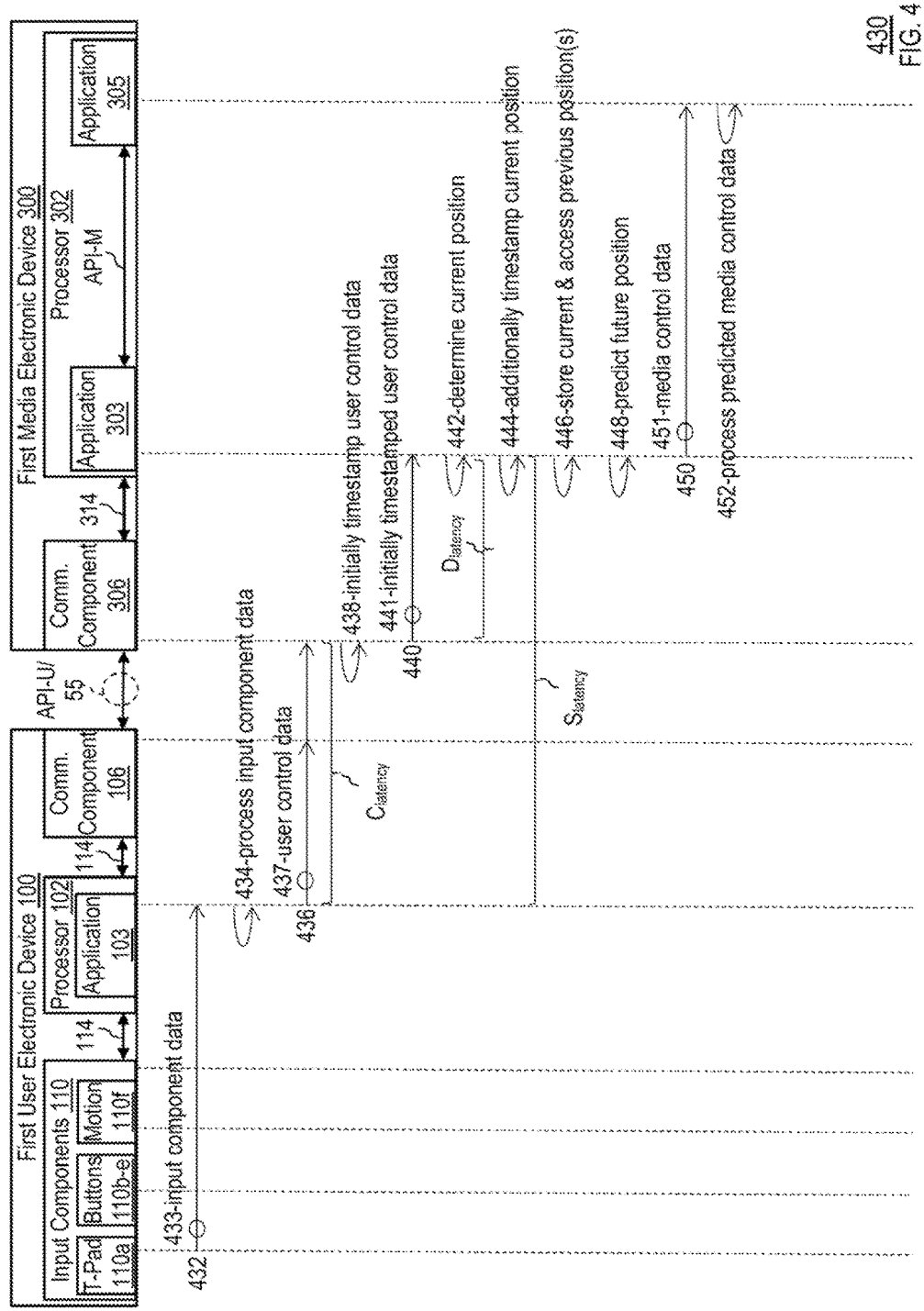

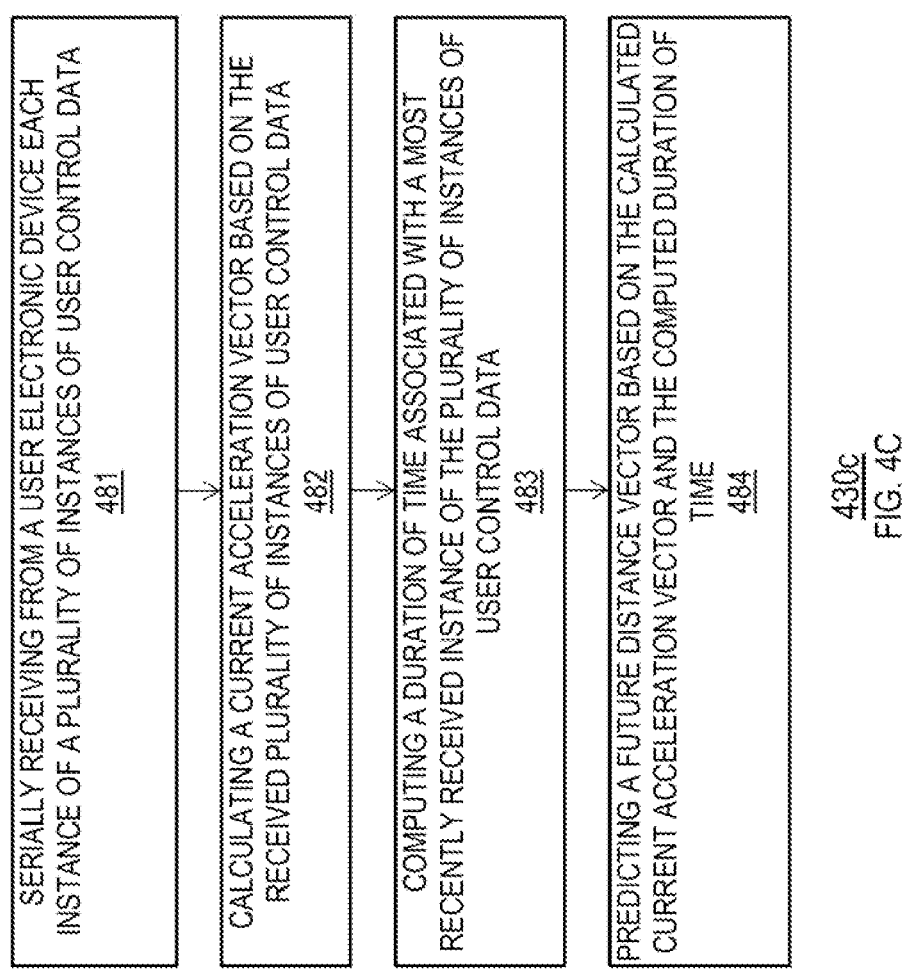

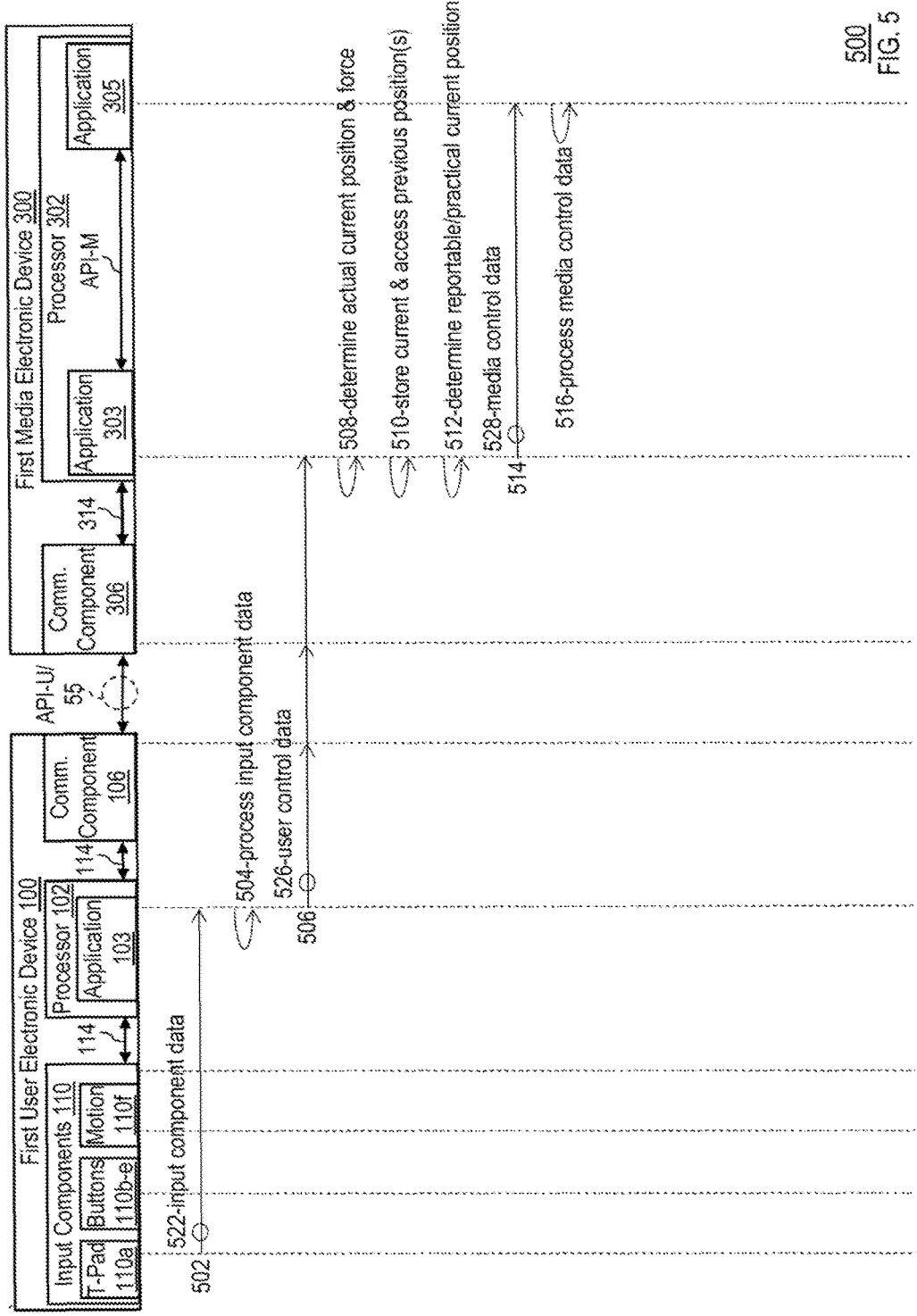

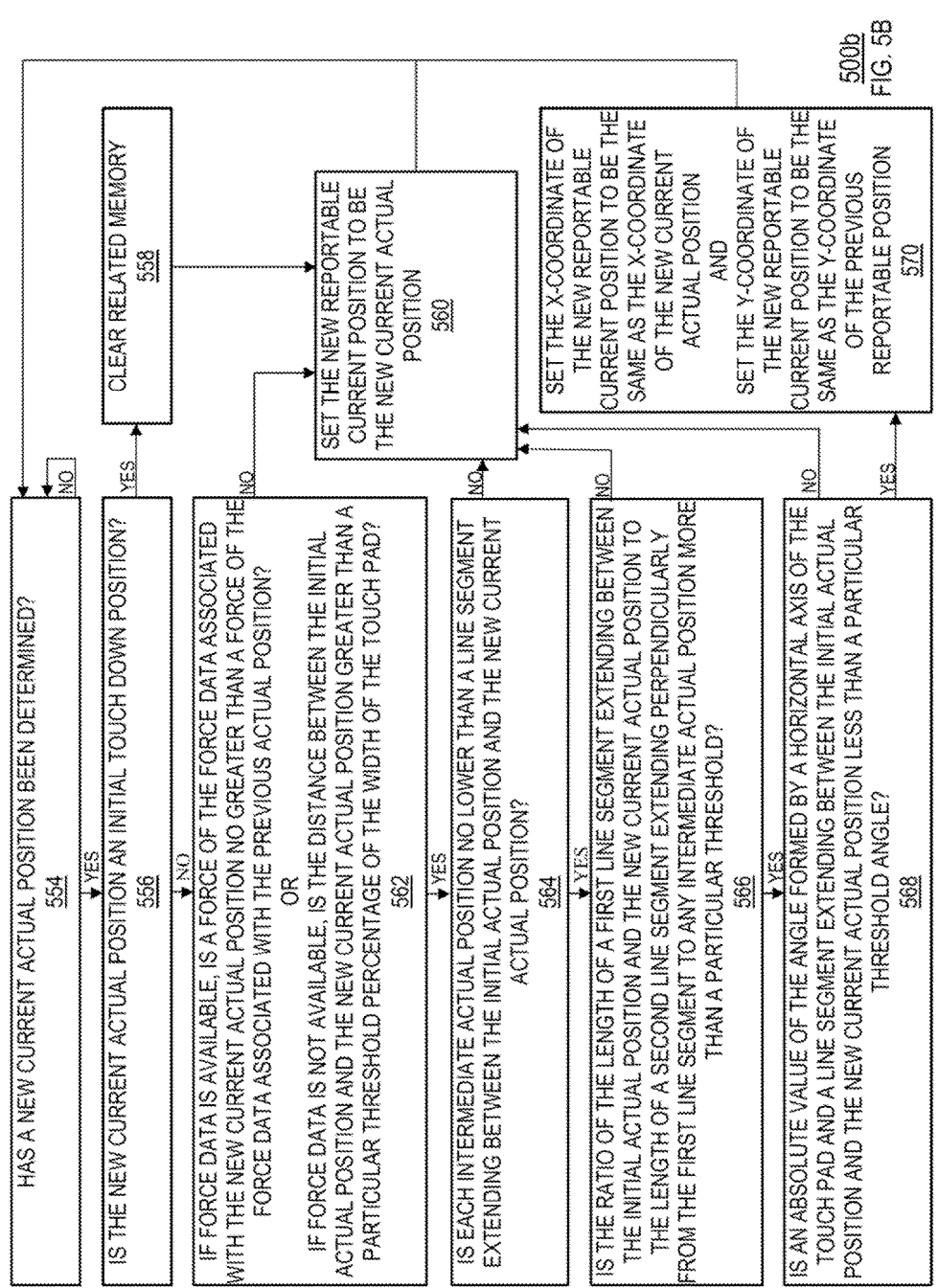

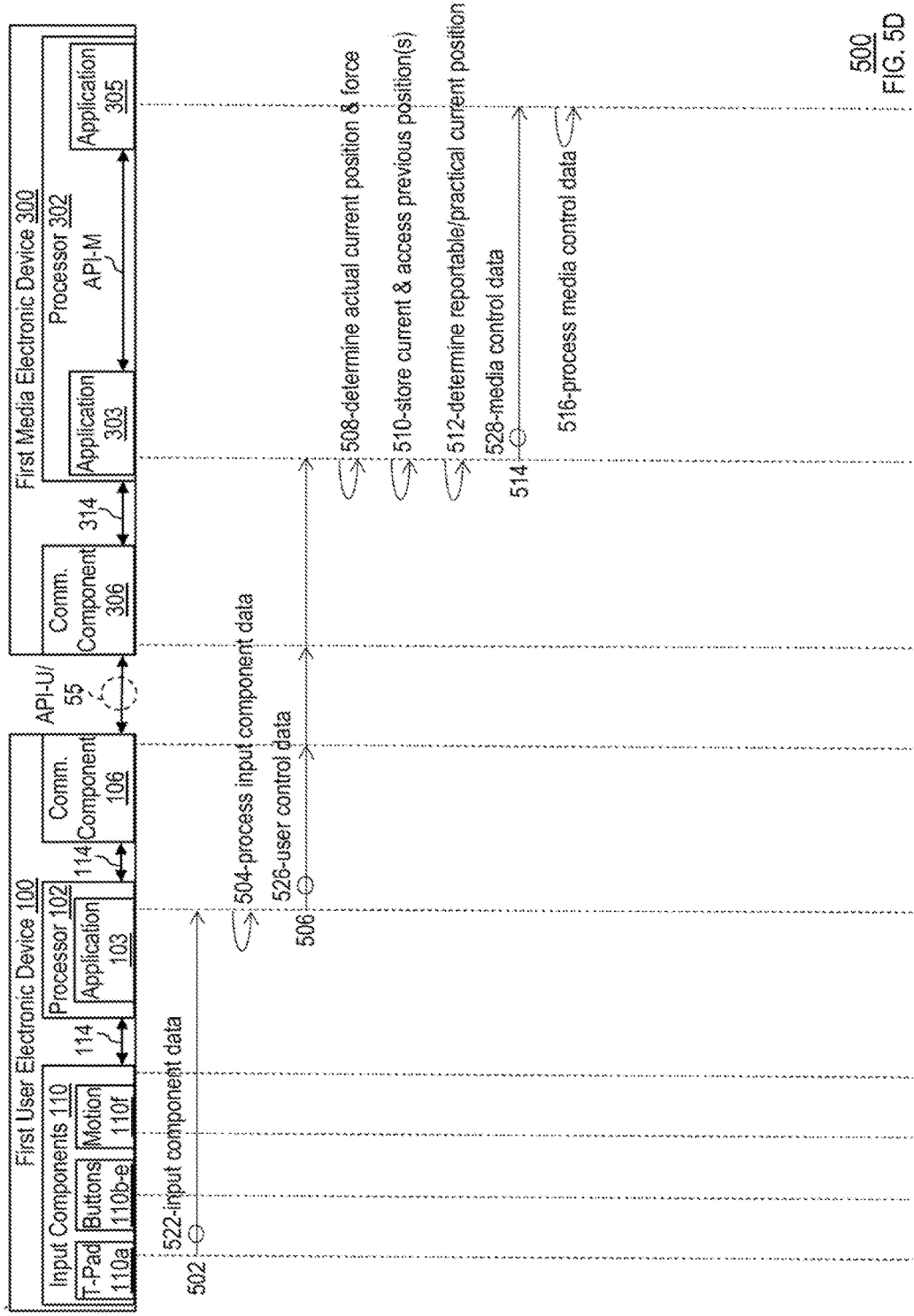

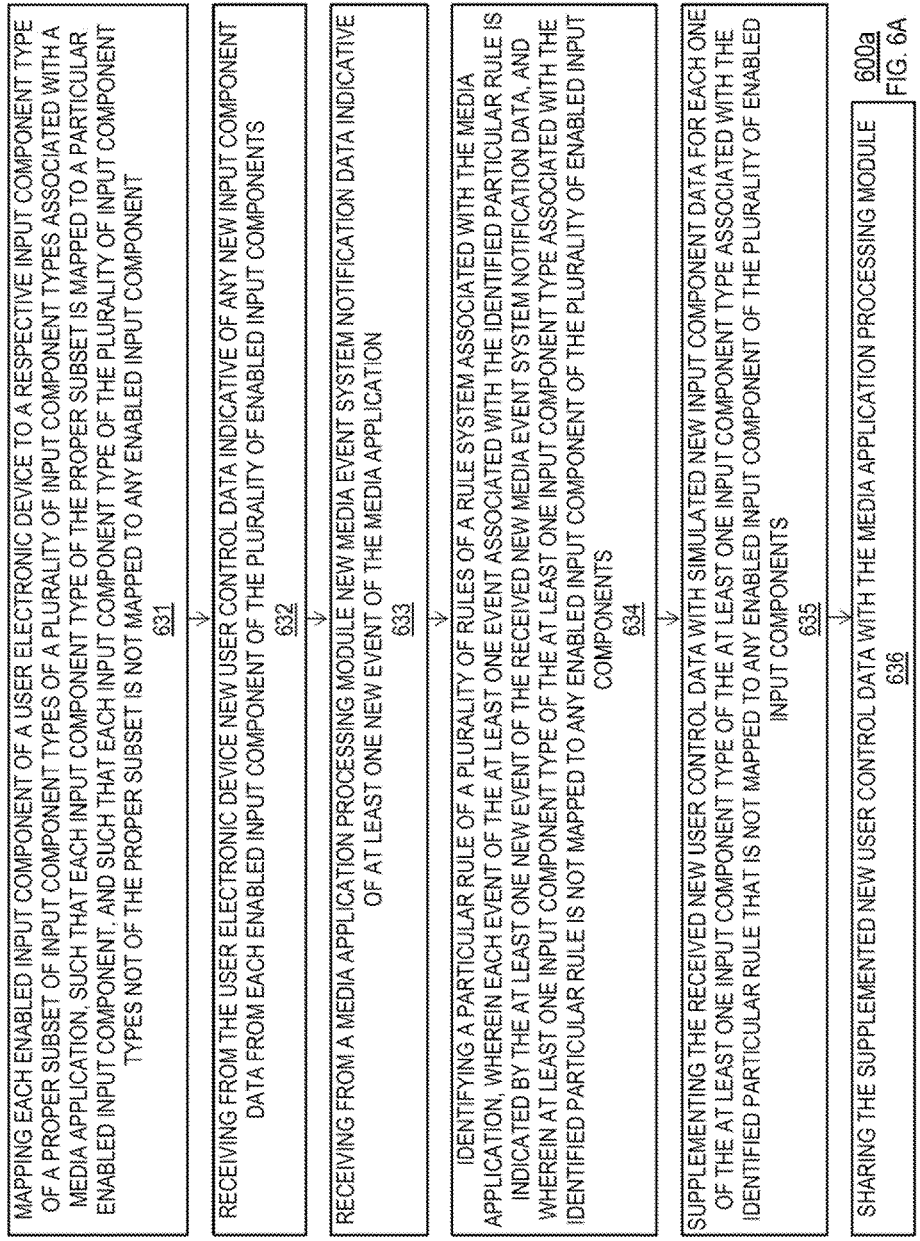

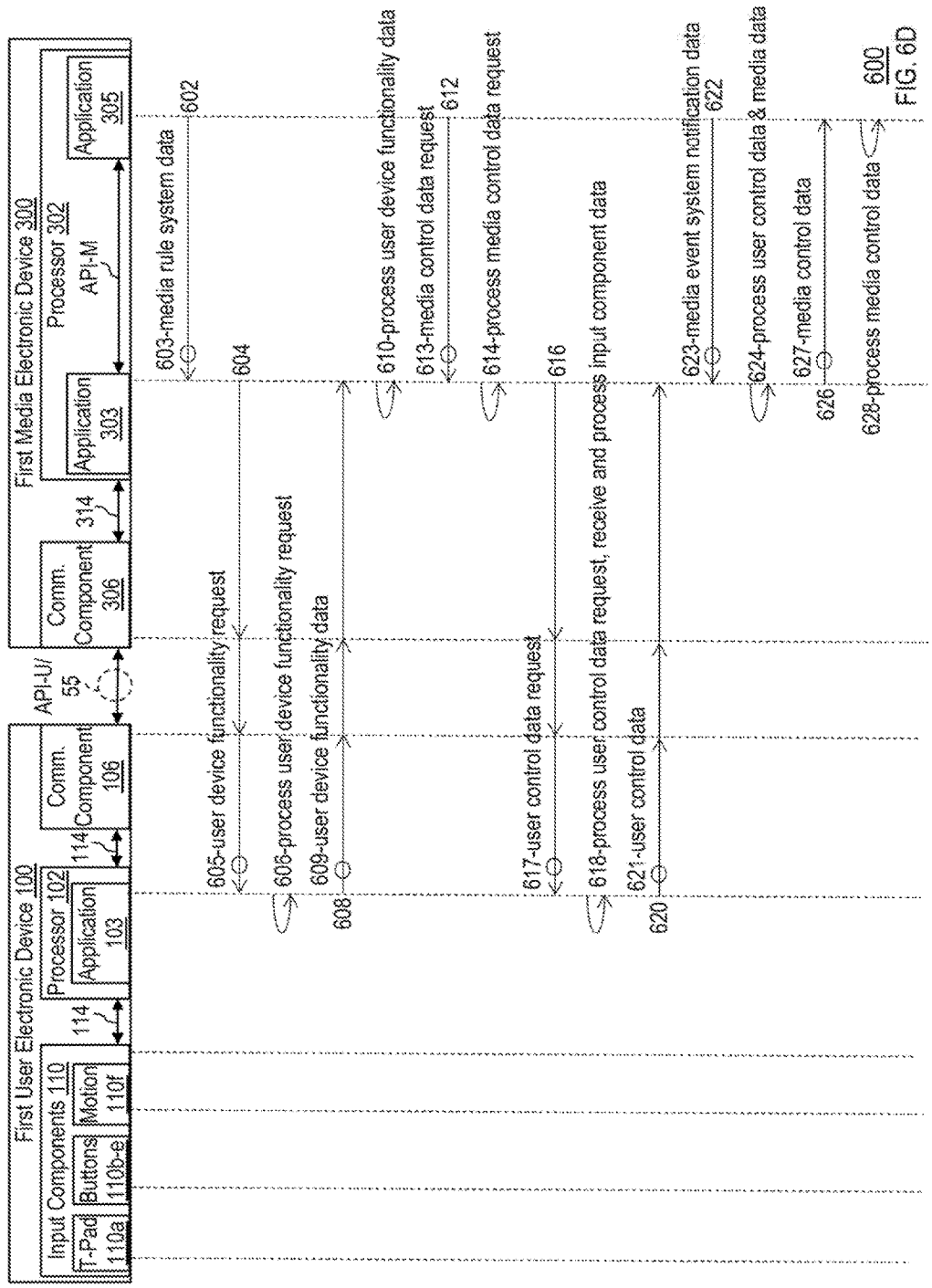

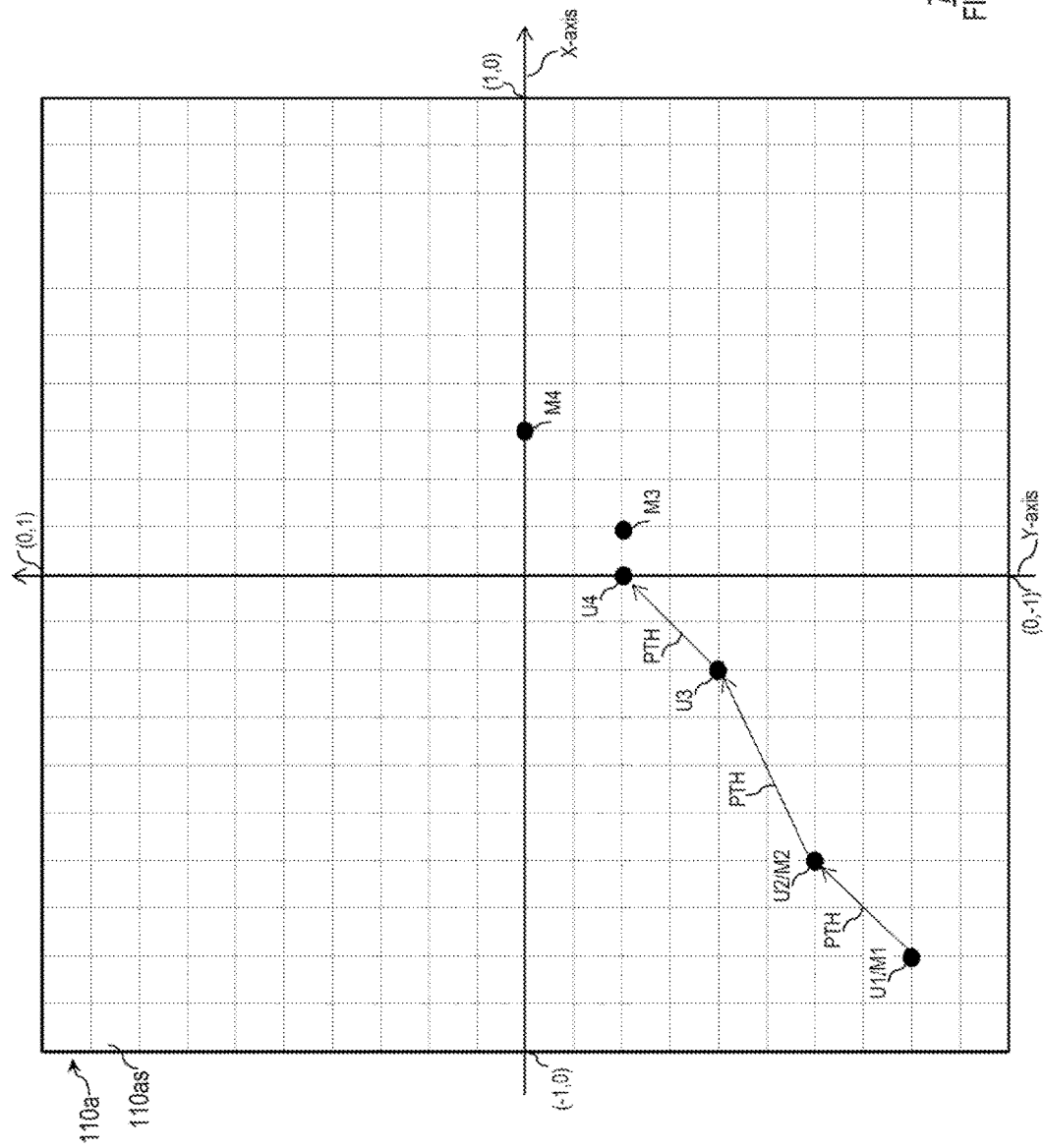

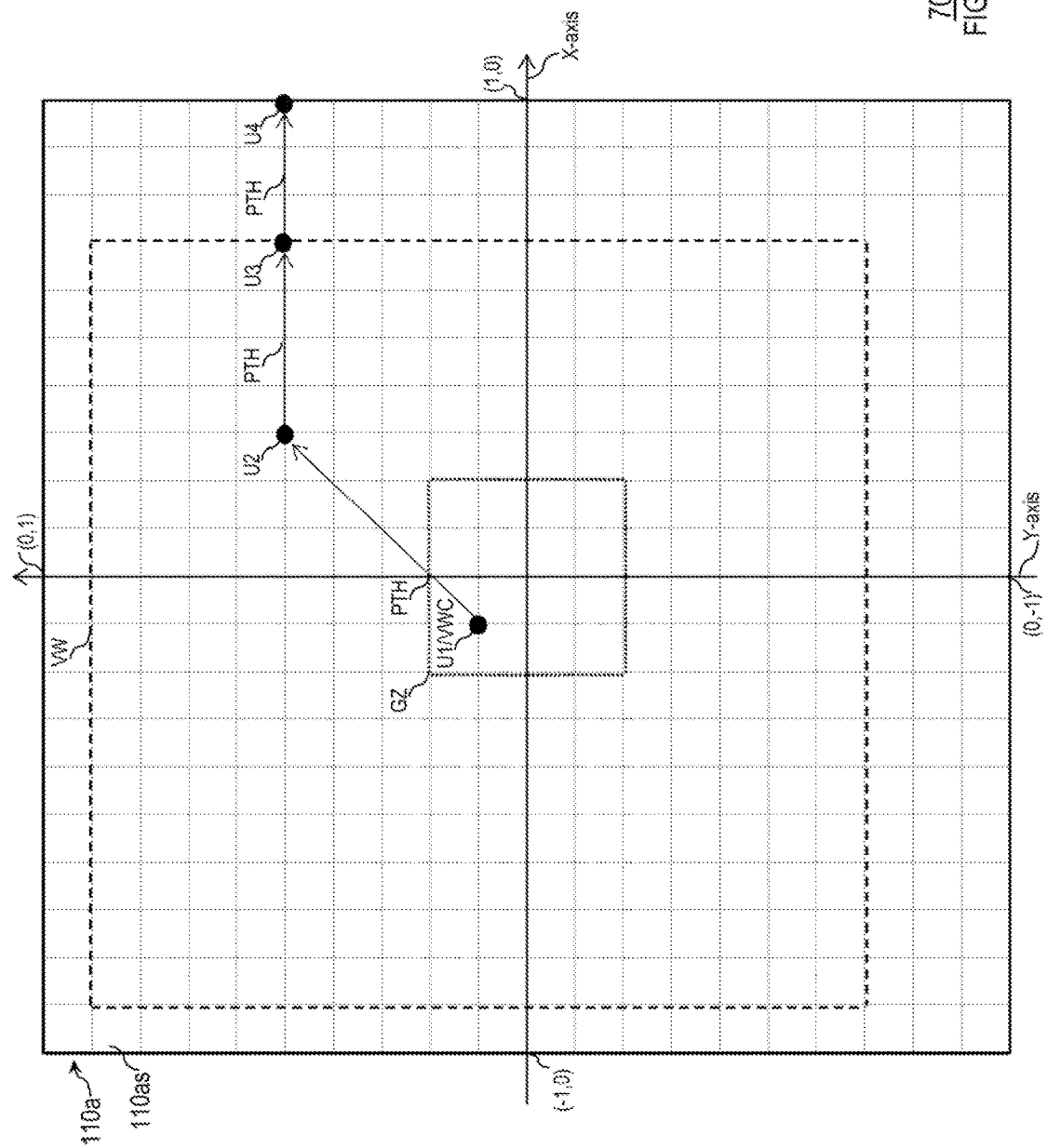

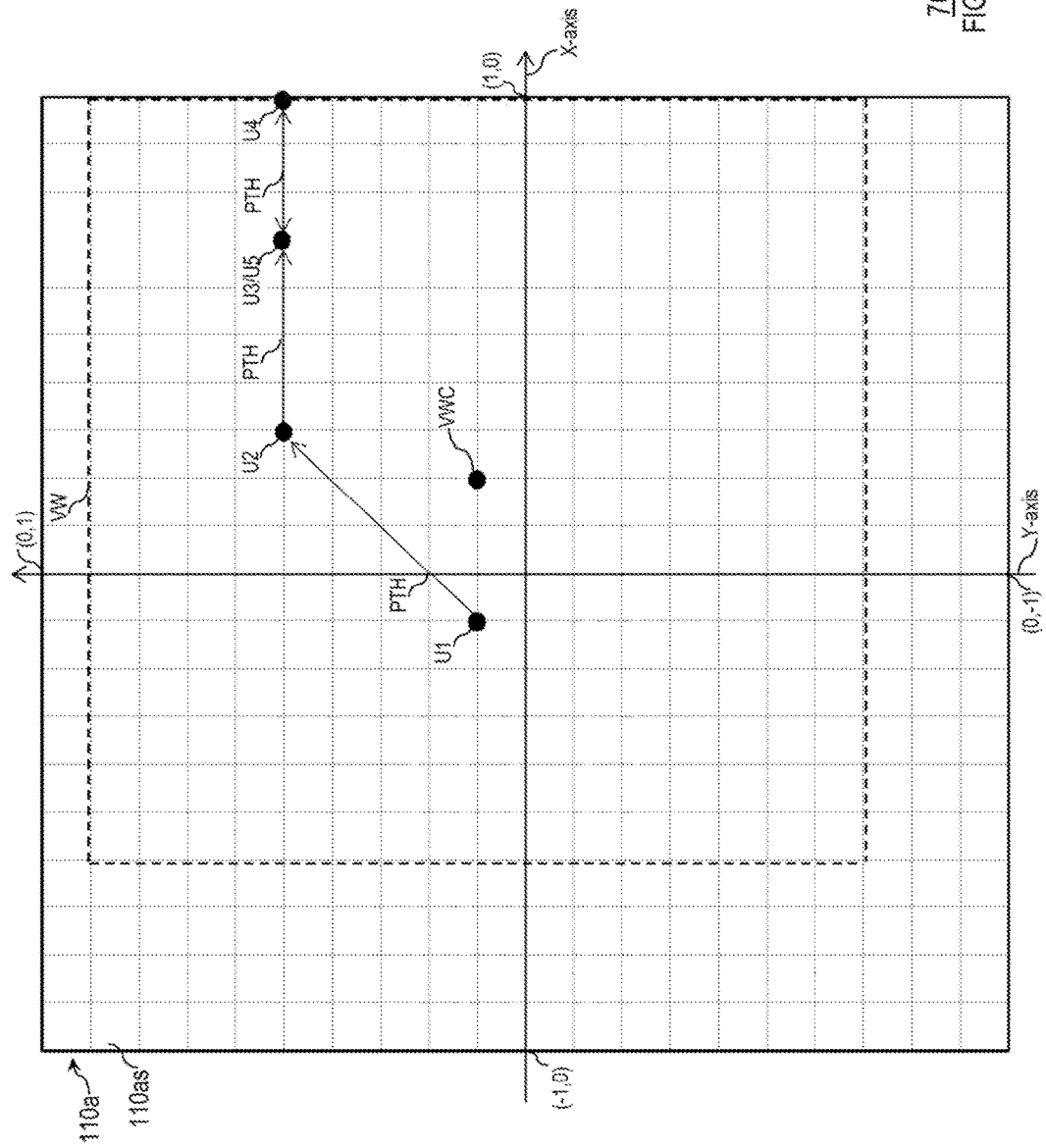

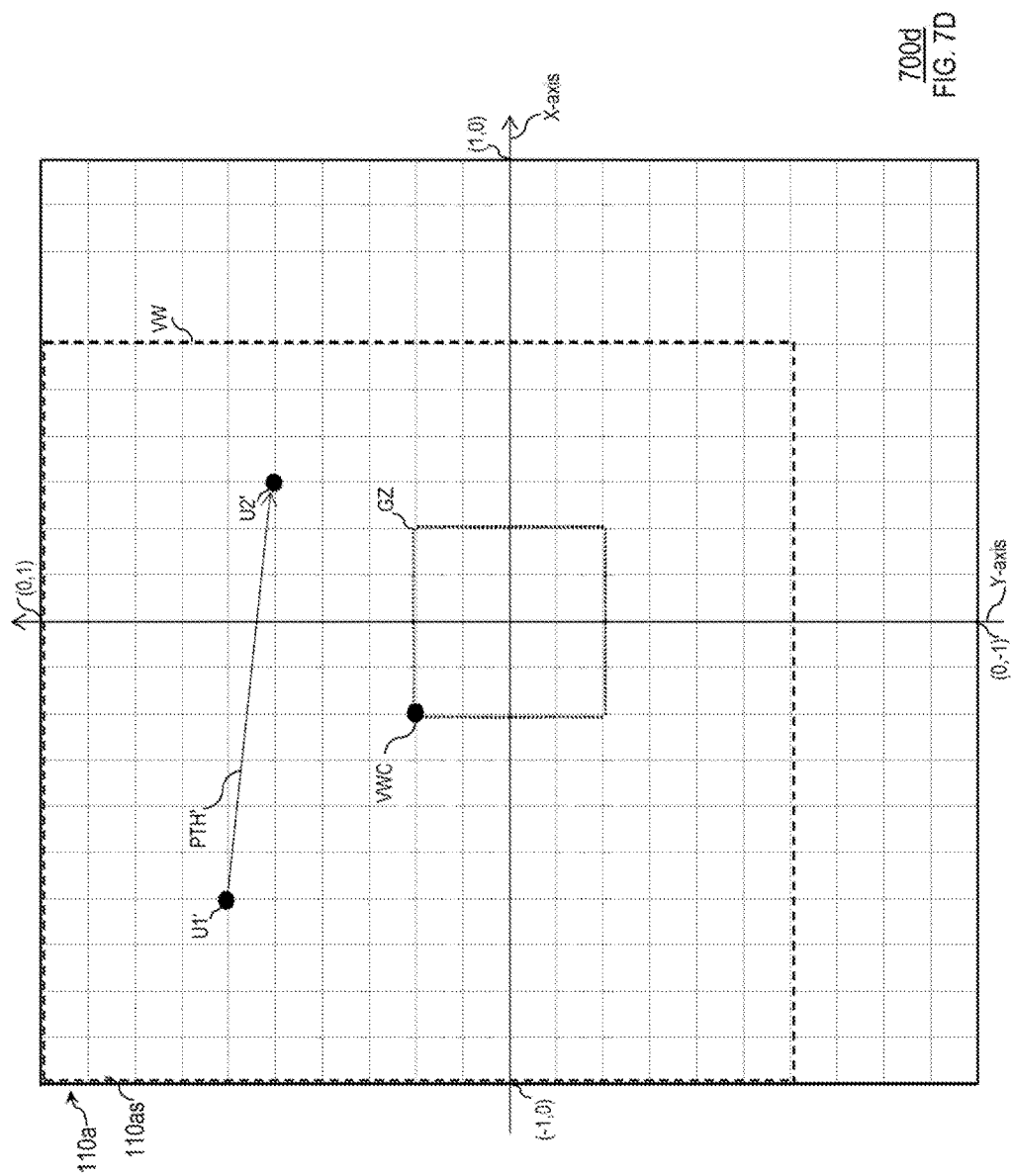

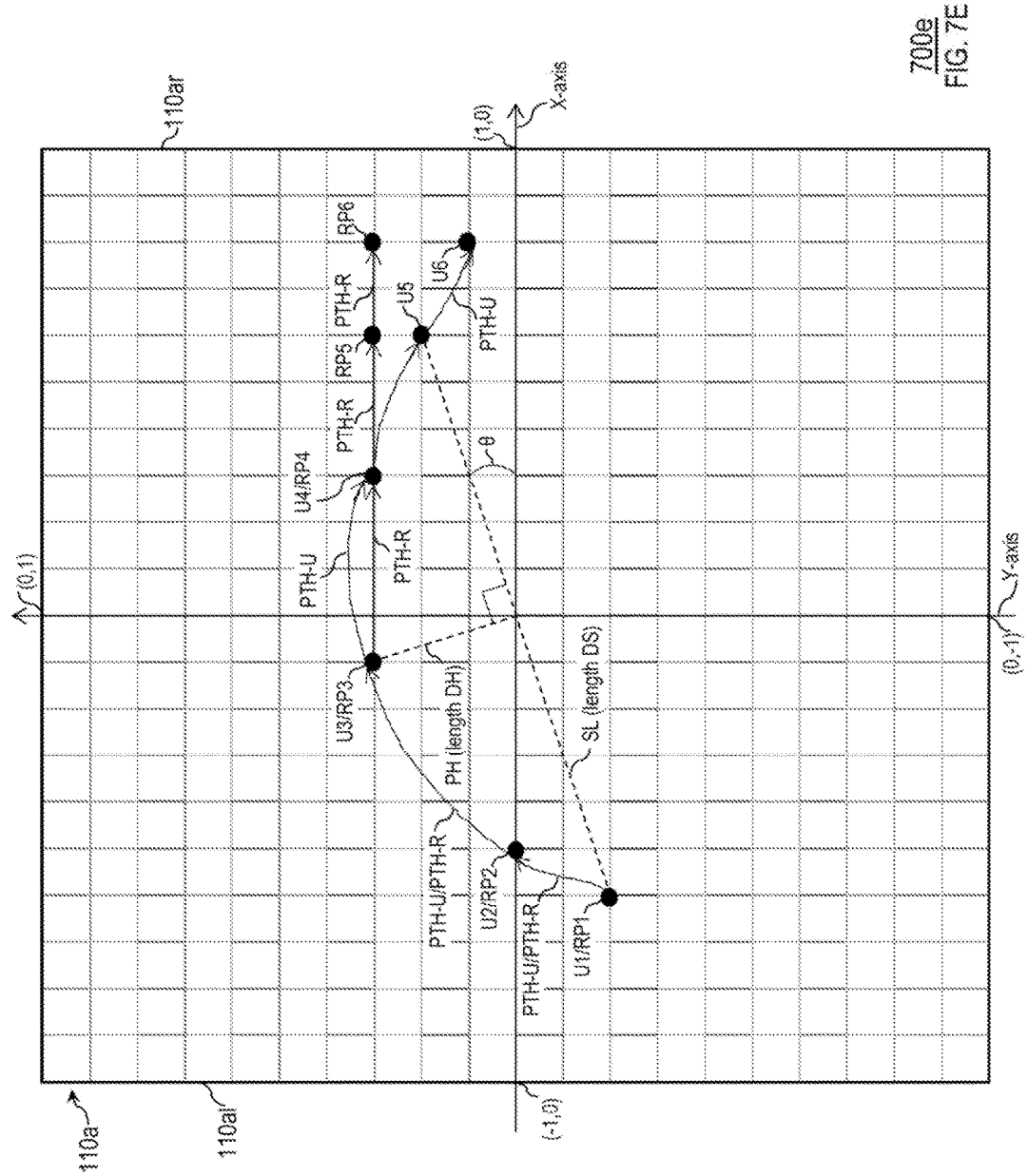

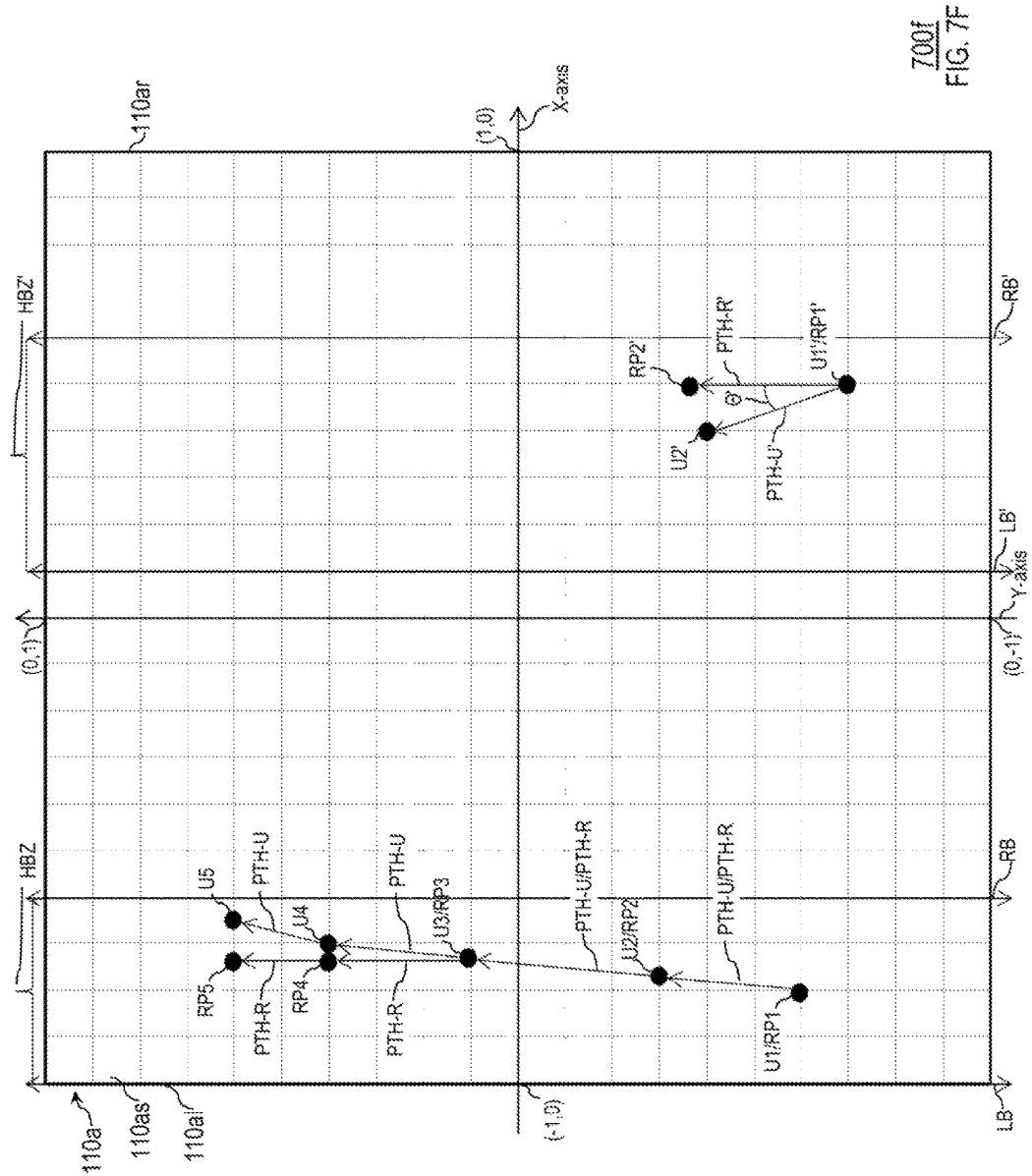

| INPUT(S) | DEVICE 100 | DEVICE 200 | ACTION(S) | EVENT(S) | EVENT(S) DESCRIPTION | |
|---|---|---|---|---|---|---|
| IC #1 | XXX | IC 210a | shoot taser | Event #1 | player facing enemy | }–1091-1 |
| IC #2 | XXX | IC 210b | hold up shield | Event #1 | player facing enemy | }–1091-2 |
| IC #3 | XXX | IC 210c | extend right arm | Events #1 + #7 | player facing enemy + sky | }–1091-3 |
| IC #4 | XXX | IC 210d | extend left arm | Event #1 or #7 | player facing enemy or sky | }–1091-4 |
| IC #5 | XXX | IC 210e | kneel | Event #12 or #15 | player facing ally or wall | }–1091-5 |
| IC #6 | IC 110c | IC 210f | jump | Event #6 | player approaching ledge | }–1091-6 |
| IC #7 | IC 110d | IC 210g | kick | Event #7 | player adjacent door | }–1091-7 |
| IC #8 (required) | IC 110e | IC 210h | punch | Event #8 | player adjacent window | }–1091-8 |
| IC #9 | XXX | IC 210i | freeze | Event #10 | enemy in audible range | }–1091-9 |
| IC #10 | XXX | IC 210j | lay down | Event #11 | player adjacent bed | }–1091-10 |
| IC #11 | XXX | IC 210k | drop taser | Event #13 | enemy tasered | }–1091-11 |
| IC #12 | XXX | IC 210l | drop shield | Event #14 | enemy unarmed | }–1091-12 |
| IC #13 (required) | IC 110a | IC 210m | move player | Event #16 | player in open area | }–1091-13 |
| IC #14 | XXX | IC 210n | turn player to face enemy | Event #9 | enemy in taser range | }–1091-14 |
| IC #15 (required) | IC 110b | IC 210o | pause gameplay | Any Event | any situation | }–1091-15 |
| IC #16 | IC 110f | IC 210p | head fake | Event #2 | enemy running to player | }–1091-16 |
| IC #11 + #12 | XXX + XXX | ICs 210k + 210l | drop all accessories | Event #17 | player surrounded | }–1091-17 |
| ICs #6 + #7 | ICs 110c + 110d | ICs 210f + 210g | roundhouse kick | Event #5 | enemy touching player | }–1091-18 |
| ICs #8 + #11 | ICs 110e + XXX | ICs 210h + 210k | headbutt | Event #4 | enemy holding player | }–1091-19 |
| IC #14 | XXX | IC 210n | turn player to face ally | Event #3 | ally in contact range | }–1091-20 |

1099
FIG. 10

ENHANCED HANDLING OF REMOTE CONTROLLER TOUCHPAD INPUT DATA

TECHNICAL FIELD

This can relate to systems, methods, and computer-readable media for enabling efficient control of a media application at a media electronic device by a user electronic device.

BACKGROUND

Some systems are configured to receive control data from one or more controller devices for use in controlling a media application. However, the manner in which such control data is generated by a controller device, communicated to a media application, and/or handled by a media application in such systems is often inefficient.

SUMMARY

Systems, methods, and computer-readable media for enabling efficient control of a media application at a media electronic device by a user electronic device are provided.

In some embodiments, there is provided a system for enabling interaction between a media application processing module running a media application, a device application processing module running a device application, and a controller application processing module running a controller application. The system may include a media electronic device including a processor including the device application processing module, and a communications component, wherein the device application processing module is operative to receive a media control data request from the media application processing module, process the received media control data request to identify a subset of input component types of a plurality of input component types, generate a user control data request based on the identified subset of input component types, and transmit the user control data request, via the communications component, to the controller application processing module.

In other embodiments, there is provided a method for enabling interaction between a media application processing module running a user interface media application, a device application processing module running a device application on a media electronic device, and a controller application processing module running a controller application on a user electronic device that is remote from the media electronic device. The method may include receiving, at the device application processing module, a media control data request from the media application processing module, processing, with the device application processing module, the received media control data request, generating, with the device application processing module, a user control data request based on the processed media control data request, and transmitting, from the device application processing module, the user control data request to the controller application processing module, wherein the generating the user control data request includes generating the user control data request to include an instruction operative to instruct the controller application processing module to adjust a functionality of an input component of the user electronic device in a particular manner based on the processed media control data request.

In yet other embodiments, there is provided a non-transitory computer-readable medium including computer-readable instructions recorded thereon that, when executed by a processor of a media electronic device communicatively coupled to a user electronic device including a plurality of input components, cause the processor to perform the following operations: receiving a media control data request from a user interface application; processing the received media control data request; identifying a subset of input component types of a plurality of input component types based on the processed media control data request; generating a user control data request based on the identified subset; and transmitting the user control data request to the user electronic device, wherein the generating the user control data request includes generating the user control data request to include an instruction operative to instruct the user electronic device to share input component data only from each input component of the plurality of input components of the user electronic device that is associated with any input component type of the identified subset.

In still yet other embodiments, there is provided a method for utilizing data from a user electronic device at a media electronic device. At the media electronic device, the method includes receiving first user control data generated by a user electronic device, determining a first user touch position based on the received first user control data, after receiving the first user control data, receiving second user control data generated by the user electronic device, determining a second user touch position based on the received second user control data, after receiving the second user control data, receiving third user control data generated by the user electronic device, determining a third user touch position based on the received third user control data, calculating a current user touch acceleration vector based on the determined third user touch position, the determined second user touch position, and the determined first user touch position, after receiving the third user control data, computing a current system latency, predicting a future user touch distance vector based on the calculated current user touch acceleration vector and the computed current system latency, and predicting a future user touch position based on the predicted future user touch distance vector and the determined third user touch position.

In still yet other embodiments, there is provided a system for enabling interaction between a media application processing module running a media application, a device application processing module running a device application, and a controller application processing module running a controller application on a controller electronic device that includes a touch input component, the system including a media electronic device including a processor that includes the device application processing module, and a communications component, wherein the device application processing module is operative to receive, via the communications component, a plurality of instances of user control data transmitted from the controller application processing module, wherein each particular instance of the plurality of instances of user control data is indicative of a respective particular position of a respective particular user touch event along a user touch path on the touch input component, calculate a second derivative of the user touch path based on the received plurality of instances of user control data, compute a latency associated with a most recently received instance of the plurality of instances of user control data, predict a future position of a future user touch event along the user touch path based on the calculated second derivative, the computed latency, and the particular position indicated by the most recently received instance of the plurality of instances of user control data, and share the predicted future position of the future user touch event with the media application processing module for controlling the media application.

In still yet other embodiments, there is provided a non-transitory computer-readable medium including computer-readable instructions recorded thereon that, when executed by a processor of a media electronic device communicatively coupled to a user electronic device, cause the processor to perform the following operations: serially receiving from the user electronic device each instance of a plurality of instances of user control data, calculating a current acceleration vector based on the received plurality of instances of user control data, computing a duration of time associated with a most recently received instance of the plurality of instances of user control data, and predicting a future distance vector based on the calculated current acceleration vector and the computed duration of time.

In still yet other embodiments, there is provided a method for a media electronic device enabling a user electronic device to control a media application processing module. At the media electronic device, the method includes receiving from the user electronic device first user control data indicative of a first user position of a first user touch event of a user touch path along a touch sensitive surface of a touch input component of the user electronic device, defining a first actual device position based on the first user position of the received first user control data relative to the bounds of the touch sensitive surface, centering a virtual window within the bounds of the touch sensitive surface as close as possible to the first actual device position, after the centering, defining a first reportable device position based on the first actual device position relative to the bounds of the centered virtual window, and sharing the first reportable device position with the media application processing module.

In still yet other embodiments, there is provided a method for a media electronic device enabling a user electronic device to control a media application processing module. At the media electronic device, the method includes receiving from the user electronic device a particular instance of user control data indicative of a particular user position of a particular user touch event of a particular user touch path along a touch sensitive surface of a touch input component of the user electronic device, determining whether the particular user touch event is the initial touch down event of the particular user touch path, when the particular user touch event is determined to be the initial touch down event of the particular user touch path: defining an initial actual device position of the particular user touch path based on the particular user position of the received particular instance of user control data relative to the bounds of the touch sensitive surface; defining an initial reportable device position of the particular user touch path to be the initial actual device position; and sharing the initial reportable device position with the media application processing module, and, when the particular user touch event is determined to not be the initial touch down event of the particular user touch path: defining a non-initial actual device position of the particular user touch path based on the particular user position of the received particular instance of user control data relative to the bounds of the touch sensitive surface; determining whether each requirement of a plurality of requirements is satisfied; when at least one requirement of the plurality of requirements is not satisfied: defining a non-initial reportable device position of the particular user touch path to be the non-initial actual device position; and sharing the non-initial reportable device position with the media application processing module; and, when each requirement of the plurality of requirements is satisfied: defining the non-initial reportable device position of the particular user touch path to include a horizontal component of the non-initial actual device position and a vertical component of the most recently shared reportable device position of the particular user touch path; and sharing the non-initial reportable device position with the media application processing module, wherein the plurality of requirements includes at least two of the following requirements: when the particular instance of user control data is also indicative of a particular force applied by the particular user touch event on the touch sensitive surface, the particular force is no greater than a force applied by any user touch event of the particular user touch path that is prior to the particular user touch event; when the particular instance of user control data is not also indicative of the particular force applied by the particular user touch event on the touch sensitive surface, the distance between the non-initial actual device position and the initial actual device position is greater than a particular threshold percentage of the horizontal width of the bounds of the touch sensitive surface; each point along a line segment extending between the non-initial actual device position and the initial actual device position is not higher than any actual device position of the particular user touch path that is vertically linear with that point; the ratio of the length of the line segment extending between the non-initial actual device position and the initial actual device position to a length of any line segment extending perpendicularly from the line segment extending between the non-initial actual device position and the initial actual device position to any actual device position of the particular user touch path is more than a particular threshold ratio; and an absolute value of an angle formed by any horizontal axis of the touch sensitive surface and the line segment extending between the non-initial actual device position and the initial actual device position is less than a particular threshold angle.

In still yet other embodiments, there is provided a method for a media electronic device enabling a user electronic device to control a media application processing module. At the media electronic device, the method may include receiving from the user electronic device a particular instance of user control data indicative of a particular user position of a particular user touch event of a particular user touch path along a touch sensitive surface of a touch input component of the user electronic device, determining whether the particular user touch event is the initial touch down event of the particular user touch path, when the particular user touch event is determined to be the initial touch down event of the particular user touch path: defining an initial actual device position of the particular user touch path based on the particular user position of the received particular instance of user control data relative to the bounds of the touch sensitive surface; defining a horizontal buffer zone of the particular user touch path that is about the initial actual device position of the particular user touch path and within the bounds of the touch sensitive surface; defining an initial reportable device position of the particular user touch path to be the initial actual device position; and sharing the initial reportable device position with the media application processing module, and, when the particular user touch event is determined to not be the initial touch down event of the particular user touch path: defining a non-initial actual device position of the particular user touch path based on the particular user position of the received particular instance of user control data relative to the bounds of the touch sensitive surface; determining whether each requirement of a plurality of requirements is satisfied; when at least one requirement of the plurality of requirements is not satisfied: defining a non-initial reportable device position of the particular user touch path to be the non-initial actual device position; and sharing the non-initial reportable device position with the media application processing module, and, when each requirement of the plurality of requirements is satisfied: defining the non-initial reportable device position of the particular user touch path to include a horizontal component of the most recently shared reportable device position of the particular user touch path and a vertical component of the non-initial actual device position; and sharing the non-initial reportable device position with the media application processing module, wherein the plurality of requirements includes at least two of the following requirements: when the particular instance of user control data is also indicative of a particular force applied by the particular user touch event on the touch sensitive surface, the particular force is no greater than a force applied by any user touch event of the particular user touch path that is prior to the particular user touch event; when the particular instance of user control data is not also indicative of the particular force applied by the particular user touch event on the touch sensitive surface, the distance between the non-initial actual device position and the initial actual device position is greater than a particular threshold percentage of the vertical height of the bounds of the touch sensitive surface; and the non-initial actual device position is within the horizontal buffer zone of the particular user touch path.

In still yet other embodiments, there is provided a method for a media electronic device enabling a user electronic device to control a media application processing module running a media application, wherein the user electronic device includes a plurality of enabled input components, wherein the media application is associated with a plurality of input component types and a rule system including a plurality of rules, and wherein each rule of the plurality of rules is associated with at least one input component type of the plurality of input component types and at least one event of a plurality of events. At the media electronic device, the method includes mapping each enabled input component of the user electronic device to a respective input component type of a proper subset of input component types of the plurality of input component types, such that each input component type of the proper subset is mapped to a particular enabled input component, and such that each input component type of the plurality of input component types not of the proper subset is not mapped to any enabled input component, after the mapping, receiving from the user electronic device new user control data indicative of any new input component data from each enabled input component of the plurality of enabled input components, after the mapping, receiving from the media application processing module new media event system notification data indicative of at least one new event of the media application, identifying a particular rule of the plurality of rules, wherein each event of the at least one event associated with the identified particular rule is indicated by the at least one new event of the received new media event system notification data, and wherein at least one input component type of the at least one input component type associated with the identified particular rule is not mapped to any enabled input component of the plurality of enabled input components, supplementing the received new user control data with simulated new input component data for each one of the at least one input component type of the at least one input component type associated with the identified particular rule that is not mapped to any enabled input component of the plurality of enabled input components, and sharing the supplemented new user control data with the media application processing module.

In still yet other embodiments, there is provided a system for enabling interaction between a media application processing module running a media application that defines a rule system including a plurality of rules, a device application processing module running a device application, and a controller application processing module running a controller application on a controller electronic device including at least one enabled input component. The system includes a media electronic device including a processor including the device application processing module, and a communications component, wherein the device application processing module is operative to receive media event system notification data from the media application processing module, wherein the received media event system notification data is indicative of a new state of the media application, identify a particular rule of the plurality of rules of the rule system, wherein the identified particular rule is associated with a particular input component type that is not correlated with an enabled input component of the at least one enabled input component, and wherein each event associated with the identified particular rule is satisfied by the received media event system notification data, and simulate new input component data for the particular input component type associated with the identified particular rule.

In still yet other embodiments, there is provided a method for developing a media application. The method includes defining a plurality of optimal input component types, defining a plurality of events, and defining a rule system including a plurality of rules, wherein each rule of the plurality of rules is defined to be associated with at least one event of the plurality of events, and wherein each rule of the plurality of rules is defined to be associated with at least one input component type of the plurality of input component types.

This Summary is provided to summarize some example embodiments, so as to provide a basic understanding of some aspects of the subject matter described in this document. Accordingly, it will be appreciated that the features described in this Summary are merely examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The above and other aspects of the disclosure, its nature, and various features will become more apparent upon consideration of the following detailed description, taken in conjunction with the accompanying drawings, in which like reference characters may refer to like parts throughout, and in which:

FIGS 3A-3C, 4A-4D, 5A-5D, and 6A-6D are flowcharts of illustrative processes for enabling efficient control of a media application at a media electronic device by a user electronic device, in accordance with some embodiments;

FIGS. 7A-7F are top views of an input component of a user electronic device illustrating various situations that may be enabled by various processes of FIGS. 4A-5D, in accordance with some embodiments;

FIG. 10 shows an illustrative data structure that can be implemented by a media electronic device for enabling efficient control of a media application, in accordance with some embodiments.

DETAILED DESCRIPTION

Systems, methods, and computer-readable media for enabling efficient control of a media application at a media electronic device by a user electronic device are provided and described with reference to FIGS. 1-10.

Figure 1:
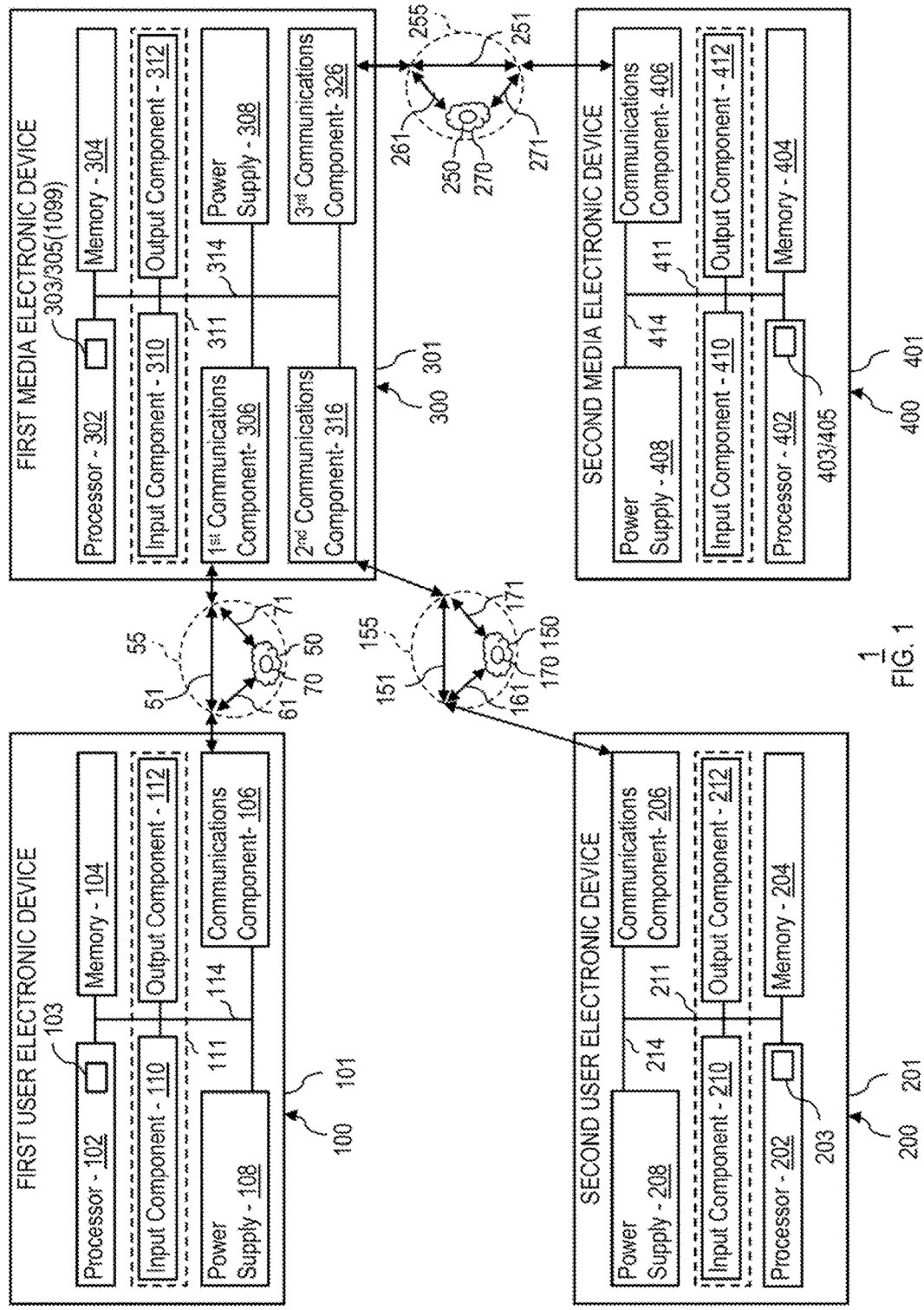
FIG. 1 is a schematic view of an illustrative system for enabling efficient control of a media application at a media electronic device by a user electronic device, in accordance with some embodiments.

Description of FIG. 1

FIG. 1 is a schematic view of an illustrative system 1 for enabling efficient control of a media application at a media electronic device by a user electronic device in accordance with some embodiments. System 1 may include a first user electronic device 100 and a first media electronic device 300. System 1 may also include a communications set-up 55, through which first user electronic device 100 and first media electronic device 300 may communicate with one another. Such communication may facilitate efficient control of a media application at first media electronic device 300 by first user electronic device 100 (e.g., a remote controller utilized by a user of system 1).

For example, in some embodiments, as shown in FIG. 1, either one or both of first user electronic device 100 and first media electronic device 300 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet, server, etc.), monitor, television, stereo equipment, set up box, set-top box, boom box, modem, router, printer, or any combination thereof. In some embodiments, either one or both of first user electronic device 100 and first media electronic device 300 may perform a single function (e.g., a device dedicated to controlling or playing back media) and, in other embodiments, either one or both of first user electronic device 100 and first media electronic device 300 may perform multiple functions (e.g., a device that plays back media, and receives and transmits telephone calls).

Either one or both of first user electronic device 100 and first media electronic device 300 may be any portable, mobile, hand-held, or miniature electronic device that may be configured to control and/or playback media wherever a user travels. Some miniature electronic devices may have a form factor that is smaller than that of hand-held electronic devices, such as an iPod™. Illustrative miniature electronic devices can be integrated into various objects that may include, but are not limited to, watches, rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, either one or both of first user electronic device 100 and first media electronic device 300 may not be portable at all, but may instead be generally stationary.

As shown in FIG. 1, for example, first user electronic device 100 may include a processor 102, memory 104, communications component 106, power supply 108, input component 110, and output component 112. Electronic device 100 may also include a bus 114 that may provide one or more wired or wireless communications links or paths for transferring data and/or power to, from, or between various other components of electronic device 100. In some embodiments, one or more components of electronic device 100 may be combined or omitted. Moreover, electronic device 100 may include other components not combined or included in FIG. 1 and/or several instances of the components shown in FIG. 1. For the sake of simplicity, only one of each of the components of electronic device 100 is shown in FIG. 1.

Memory 104 of first electronic device 100 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on electronic device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable electronic device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 of first electronic device 100 may be provided to allow first electronic device 100 to communicate with one or more other electronic subsystems, electronic devices, or servers (e.g., electronic device 300 and/or a server 70 of a communications network 50 of communications set-up 55) using any suitable wired or wireless communications protocol. For example, first communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoWPAN") module, any other communications protocol, or any combination thereof. Communications component 106 may be configured to enable first electronic device 100 to be electrically coupled to one or more other electronic subsystems, electronic devices, or servers (e.g., electronic device 300 and/or server 70 of communications network 50) and to communicate with that other entity, either wirelessly or via a wired connection.

Power supply 108 of first electronic device 100 may provide power to one or more of the components of first electronic device 100. In some embodiments, power supply 108 can be coupled to a power grid (e.g., when first electronic device 100 is not a portable device, such as a desktop computer). In some embodiments, power supply 108 can include one or more batteries for providing power (e.g., when first electronic device 100 is a portable device, such as a wireless remote controller). As another example, power supply 108 can be configured to generate power from a natural source (e.g., solar power using solar cells).

One or more input components 110 of first electronic device 100 may be provided to permit a user to interact or interface with first electronic device 100. For example, input component 110 can take a variety of forms, including, but not limited to, a touchpad, trackpad, dial, click wheel, scroll wheel, touch screen, one or more buttons (e.g., a keyboard), mouse, joy stick, track ball, microphone, camera, inertia/motion sensor, proximity sensor, light detector, and combinations thereof. Each input component 110 can be configured to provide one or more dedicated control functions for making selections or issuing commands associated with operating first electronic device 100.

First electronic device 100 may also include one or more output components 112 that may present information (e.g., visual, audible, and/or tactile information) to a user of first electronic device 100. Output component 112 of first electronic device 100 may take various forms, including, but not limited to, audio speakers, headphones, audio lines-out, visual displays, video lines-out, antennas, infrared ports, rumblers, vibrators, or combinations thereof.

It should be noted that one or more input components 110 and one or more output components 112 may sometimes be referred to collectively herein as an input/output ("I/O") component or I/O interface (e.g., input component 110 and output component 112 as I/O component or I/O interface 111). For example, input component 110 and output component 112 may sometimes be a single I/O component 111, such as a touch screen, that may receive input information through a user's touch of a display screen and that may also provide visual information to a user via that same display screen.

Processor 102 of first electronic device 100 may include any processing circuitry that may be operative to control the operations and performance of one or more components of first electronic device 100. For example, processor 102 may receive input signals from input component 110 and/or drive output signals through output component 112. In some embodiments, as shown in FIG. 1, processor 102 may be used to run one or more applications, such as a controller application 103. Application 103 may include, but is not limited to, one or more operating system applications, firmware applications, media playback or remote control applications, media editing applications, or any other suitable applications. For example, processor 102 may load application 103 as a user interface program to determine how instructions or data received via an input component 110 and/or communications component 106 and/or any other suitable component of device 100 may manipulate the way in which information may be stored and/or provided to the user via an output component 112 and/or transmitted via communications component 106. Application 103 may be accessed by processor 102 from any suitable source, such as from memory 104 (e.g., via bus 114), from electronic device 300 (e.g., via communications set-up 55 and first communications component 106) or from server 70 of communications network 50 (e.g., via first communications component 106), or from any other suitable source.

First electronic device 100 may also be provided with a housing 101 that may at least partially enclose one or more of the components of first electronic device 100 for protection from debris and other degrading forces external to first electronic device 100. In some embodiments, one or more of the components of first electronic device 100 may be provided within its own housing (e.g., input component 110 may be an independent keyboard or mouse within its own housing that may wirelessly or through a wire communicate with processor 102, which may be provided within its own housing).

As also shown in FIG. 1, for example, first media electronic device 300 may include a processor 302, memory 304, first communications component 306, second communications component 316, third communications component 326, power supply 308, input component 310, and output component 312. In some embodiments, input component 310 and output component 312 of first media electronic device 300 may sometimes be a single I/O interface or I/O component 311. First media electronic device 300 may also include a housing 301 as well as a bus 314 that may provide one or more wired or wireless communications links or paths for transferring data and/or power to, from, or between various other components of first media electronic device 300. As also shown in FIG. 1, processor 302 may be used to run an application 303 (e.g., a device application) that may include, but is not limited to, one or more operating system applications, firmware applications, media playback applications, media editing applications, any other suitable applications, combinations thereof, and the like. As also shown in FIG. 1, processor 302 may be used to control and/or playback electronic media 305 (e.g., a media application) that may include, but is not limited to, one or more audio media files, video media files, video game media files, text files, graphical object files, various other multimedia files, various applications (e.g., a media playback application, such as a media library interface application or media center interface application or any other suitable user interface application), various types of metadata or playback control data, combinations thereof, and the like. Device application 303 and/or media application 305 may be accessed by processor 302 from any suitable source, such as from memory 304 (e.g., via bus 314), from first user electronic device 100 or from server 70 of communications network 50 (e.g., via communications set-up 55 and first communications component 306), or from any other suitable source (e.g., from a second user electronic device 200 or from a server 170 of a communications network 150 (e.g., via a communications set-up 155 and second communications component 316) and/or from a second media electronic device 400 or from a server 270 of a communications network 250 (e.g., via a communications set-up 255 and third communications component 326)). In some embodiments, one or more components of first media electronic device 300 may be combined or omitted. Moreover, first media electronic device 300 may include other components not combined or included in FIG. 1 and/or several instances of the components shown in FIG. 1. For the sake of simplicity, only one of each of the components of first media electronic device 300 is shown in FIG. 1.

Each one of housing 301, processor 302, application 303, memory 304, communications components 306/316/326, power supply 308, input component 310, I/O component 311, output component 312, and bus 314 of first media electronic device 300 may be the same as or substantially similar to a respective one of housing 101, processor 102, application 103, memory 104, communications component 106, power supply 108, input component 110, I/O component 111, output component 112, and bus 114 of first user electronic device 100 and, therefore, may not be independently described in greater detail. While, in some embodiments, first user electronic device 100 and first media electronic device 300 may be the same or substantially similar devices, in other embodiments, first user electronic device 100 may have one or more different and/or additional components that first media electronic device 300 does not have, and vice versa (e.g., as described below with respect to FIG. 2).

In some embodiments, communications component 106 of first electronic device 100 and first communications component 306 of first media electronic device 300 may communicate with one another directly, such as, for example, via a shared communications link 51 of communications set-up 55. Shared communications link 51 may include one or more wired and/or wireless communications links or paths for transferring any suitable data and/or power between electronic device 100 and electronic device 300. Alternatively or additionally, in some embodiments, system 1 may include communications network 50, with which one or both of electronic device 100 and electronic device 300 may communicate. For example, a first electronic device communications link 61 of communications set-up 55 may include one or more wired and/or wireless communications links or paths for transferring any suitable data and/or power between communications component 106 of first user electronic device 100 and communications network 50. Similarly, a second electronic device communications link 71 of communications set-up 55 may include one or more wired and/or wireless communications links or paths for transferring any suitable data and/or power between first communications component 306 of first media electronic device 300 and communications network 50. In some embodiments, as an alternative or in addition to communicating with one another directly via shared communications link 51, first user electronic device 100 and first media electronic device 300 may communicate with one another via communications network 50 and communications links 61 and 71.

Any suitable circuitry, device, system, or combination of these (e.g., a wireless communications infrastructure including one or more communications towers, telecommunications servers, or the like) operative to create a communications network may be used to provide communications network 50. Communications network 50 may be capable of providing communications using any suitable wired or wireless communications protocol. For example, communications network 50 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof.

Moreover, in some embodiments, communications network 50 may include one or more servers 70 or any other suitable components (e.g., any suitable cloud computing components) that may communicate with first user electronic device 100 and/or first media electronic device 300 via communications network 50. In some embodiments, server 70 may be a source of one or more files, applications, media, or any other suitable resource (e.g., application 103 and/or application 303) that may be provided to and/or utilized by electronic device 100 and/or electronic device 200. For example, server 70 may be configured as a media store that may provide electronic device 100 and/or electronic device 200 with various resources or media items including, but not limited to, audio media files, video media files, video game media files, text files, graphical object files, various other multimedia files, various applications (e.g., a media playback application), various types of metadata or playback control data (e.g., data that may at least partially dictate the effect of specific control data from device 100 on media data of device 300), and the like. An example of such a media store that may be provided by server 70 may be the iTunes™ Store and/or the App Store™, each of which is made available by Apple Inc. of Cupertino, Calif.

It should be noted that any mechanism or combination of mechanisms for enabling communication between communications component 106 of electronic device 100 and first communications component 306 of electronic device 300 may sometimes be referred to collectively herein as a communications set-up. For example, as shown in FIG. 1, shared communications link 51, first electronic device communications link 61, second electronic device communications link 71, communications network 50, and/or server 70 may be referred to individually and/or collectively as communications set-up 55.

System 1 may be configured in various ways and may include various combinations of various devices while still enabling efficient control of a media application at a media electronic device by a user electronic device (e.g., while still facilitating efficient control of media application 305 at first media electronic device 300 by first user electronic device 100 (e.g., a remote controller utilized by a user of system 1)). For example, in some embodiments, system 1 may only include first user electronic device 100 without any additional user electronic devices (e.g., without second user electronic device 200, described in more detail below) and/or system 1 may only include first media electronic device 200 without any additional media electronic devices (e.g., without second media electronic device 400, described in more detail below). However, in other embodiments, system 1 may include devices 100, 200, 300, and 400, where, for example, first media electronic device 300 may be operative to receive control signals from each one of first user electronic device 100 and second user electronic device 200 for controlling the playback of electronic media 305 via first media electronic device 300 and second media electronic device 400 (e.g., whereby each one of devices 100 and 200 may be controllers for use by different players of a video game 305 that may be running on device 300 and that may be presented to the different players via device 400, as may be described below with respect to system 1' of FIG. 2).

In some embodiments, device application 303 and media application 305 may be run by the same processor 302 of media electronic device 300 (e.g., as shown in FIGS. 1 and 3). In some other embodiments, device application 303 may be run by a first processor of media electronic device 300 and media application 305 may be run by a second processor of media electronic device 300 that may be different than the first processor of media electronic device 300 and that may be communicatively coupled to the first processor of media electronic device 300 by bus 314 of media electronic device 300. In some other embodiments, device application 303 may be run by a processor of a first media electronic device and media application 305 may be run by a processor of a second media electronic device and the first media electronic device may be communicatively coupled to the second media electronic device by a communications set-up. Therefore, device application 303 may be operative to be run or otherwise executed by a "device application processing module" while media application 305 may be operative to be run or otherwise executed by a "media application processing module," where such a device application processing module and such a media application processing module may be provided by the same processor of a single electronic device (e.g., processor 302 of device 300 may include a device application processing module 303 and a media application processing module 305, for example, as shown in FIGS. 1 and 3), by different respective processors of the same electronic device, or by different respective processors of different respective electronic devices.

In some embodiments, device application 303 may be run by processor 302 of media electronic device 300 and controller application 103 may be run by processor 102 of user controller electronic device 100 that may be communicatively coupled by communications set-up 55 (e.g., as shown in FIGS. 1 and 3). In some other embodiments, device application 303 and controller application 103 may be run by the same processor of a single electronic device. In some other embodiments, device application 303 may be run by a first processor of an electronic device and controller application 103 may be run by a second processor of that same electronic device that may be different than the first processor and that may be communicatively coupled to the first processor by a bus of the electronic device. Therefore, device application 303 may be operative to be run or otherwise executed by a "device application processing module" while controller application 103 may be operative to be run or otherwise executed by a "controller application processing module," where such a device application processing module and such a controller application processing module may be provided by the same processor of a single electronic device, by different respective processors of the same electronic device, or by different respective processors of different respective electronic devices (e.g., processor 302 of device 300 may include a device application processing module 303 and processor 102 of device 100 may include a controller application processing module 103, for example, as shown in FIGS. 1 and 3). Similarly, media application 305 may be operative to be run or otherwise executed by a "media application processing module" while controller application 103 may be operative to be run or otherwise executed by a "controller application processing module," where such a media application processing module and such a controller application processing module may be provided by the same processor of a single electronic device, by different respective processors of the same electronic device, or by different respective processors of different respective electronic devices (e.g., processor 302 of device 300 may include a media application processing module 305 and processor 102 of device 100 may include a controller application processing module 103, for example, as shown in FIGS. 1 and 3). In some embodiments, a controller application processing module and a device application processing module and a media application processing module may be provided by the same processor of a single electronic device, by different respective processors of the same electronic device, or by different respective processors of different respective electronic devices.

Figure 2:
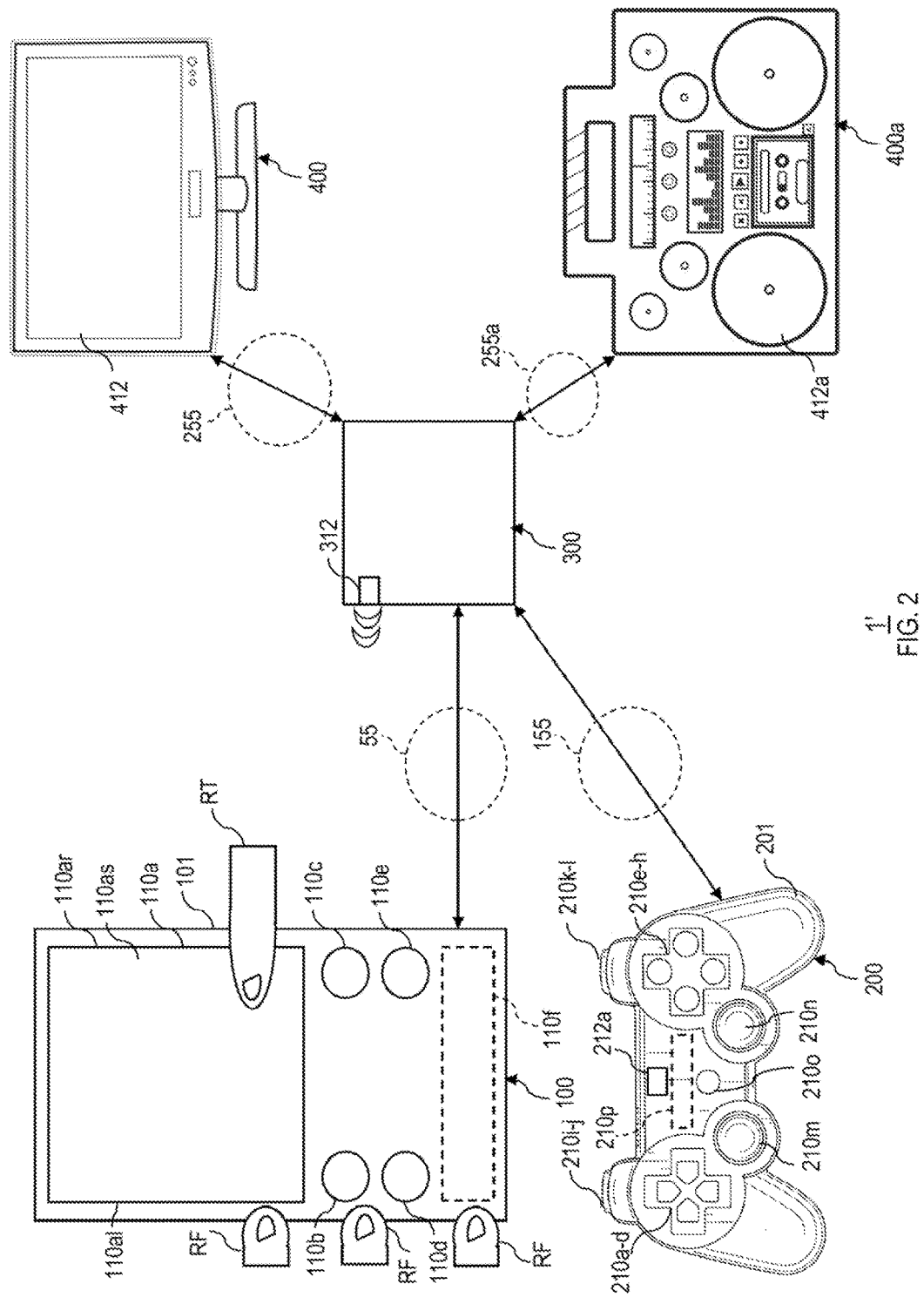
FIG. 2 is a schematic view of a specific implementation of an illustrative system similar to the system of FIG. 1, in accordance with some embodiments.

In some embodiments, as shown in FIGS. 1 and 2, a system may include second user device 200 and a communications set-up 155 through which second user device 200 and first media electronic device 300 may communicate with one another, while, alternatively or additionally, a system may include a second media electronic device 400 and a communications set-up 255 through which first media electronic device 300 and second media electronic device 400 may communicate with one another. Either one or both of second user electronic device 200 and second media electronic device 400 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), monitor, television, stereo equipment, set up box, set-top box, boom box, modem, router, printer, or any combination thereof. Either one or both of second user electronic device 200 and second media electronic device 400 may be any portable, mobile, hand-held, or miniature electronic device that may be configured for use wherever a user travels. Alternatively, either one or both of second user electronic device 200 and second media electronic device 400 may not be portable at all, but may instead be generally stationary.

Second user electronic device 200 may be any suitable device that may be used simultaneously with or as an alternative to first user electronic device 100 for controlling electronic media at first media electronic device 300. For example, second user electronic device 200 may be a game controller that may generate and transmit control commands to first media electronic device 300 via communications set-up 155. Second media electronic device 400 may be any suitable device that may be used in conjunction with first media electronic device 300 to enrich or enhance the capabilities of the system (e.g., a set of headphones or loudspeakers, and/or a display to present at least a portion of electronic media).

As shown in FIG. 1, for example, second user electronic device 200 may include a processor 202, memory 204, communications component 206, power supply 208, input component 210, and output component 212. In some embodiments, input component 210 and output component 212 of second user electronic device 200 may sometimes be a single I/O interface or I/O component 211. Second user electronic device 200 may also include a housing 201 and a bus 214 that may provide one or more wired or wireless communications links or paths for transferring data and/or power to, from, or between various other components of second user electronic device 200. As also shown in FIG. 1, processor 202 may be used to run an application 203 that may include, but is not limited to, one or more operating system applications, firmware applications, media playback applications, media editing applications, or any other suitable applications. Application 203 may be accessed by processor 202 from any suitable source, such as from memory 204 (e.g., via bus 214), from first media electronic device 300 or from a server of communications set-up 155 (e.g., via communications component 206), or from any other suitable source. In some embodiments, one or more components of second user electronic device 200 may be combined or omitted. Moreover, second user electronic device 200 may include other components not combined or included in FIG. 1 and/or several instances of the components shown in FIG. 1. For the sake of simplicity, only one of each of the components of second user electronic device 200 is shown in FIG. 1.

Each one of housing 201, processor 202, application 203, memory 204, communications component 206, power supply 208, input component 210, I/O component 211, output component 212, and bus 214 of second user electronic device 200 may be the same as or substantially similar to a respective one of housing 101, processor 102, application 103, memory 104, communications component 106, power supply 108, input component 110, I/O component 111, output component 112, and bus 114 of first user electronic device 100 and, therefore, may not be independently described in greater detail. While, in some embodiments, first user electronic device 100 and second user electronic device 200 may be the same or substantially similar devices, in other embodiments, first user electronic device 100 may have one or more different and/or additional components that second user electronic device 200 does not have, and vice versa (e.g., as described below with respect to FIG. 2).

In some embodiments, communications component 206 of second user electronic device 200 and second communications component 316 of first media electronic device 300 may communicate with one another directly, such as, for example, via a shared communications link 151 of communications set-up 155 that may include one or more wired and/or wireless communications links or paths for transferring any suitable data and/or power between electronic device 200 and electronic device 300. Alternatively or additionally, in some embodiments, communications set-up 155 may include a communications network 150, with which one or both of electronic device 200 and electronic device 300 may communicate (e.g., via respective communications links 161 and 171). Communications network 150 may include a server 170, which may be similar to server 70. Therefore, in some embodiments, communications set-up 155 may be substantially similar to communications set-up 55.

As also shown in FIG. 1, for example, second media electronic device 400 may include a processor 402, memory 404, communications component 406, power supply 408, input component 410, and output component 412. In some embodiments, input component 410 and output component 412 of second media electronic device 400 may sometimes be a single I/O interface or I/O component 411. Second media electronic device 400 may also include a housing 401 and a bus 414 that may provide one or more wired or wireless communications links or paths for transferring data and/or power to, from, or between various other components of second media electronic device 400. As also shown in FIG. 1, processor 402 may be used to run an application 403 (e.g., a device application) that may include, but is not limited to, one or more operating system applications, firmware applications, media playback applications, media editing applications, or any other suitable applications. As also shown in FIG. 1, processor 402 may be used to control and/or playback electronic media 405 (e.g., a media application) that may include, but is not limited to, one or more audio media files, video media files, video game media files, text files, graphical object files, various other multimedia files, various applications (e.g., a media playback application), various types of metadata or playback control data, combinations thereof, and the like. In some embodiments, application 405 may be loaded for use by processor 302 of device 300 in addition to or as an alternative to application 305. Application 403 and/or application 405 may be accessed by processor 402 from any suitable source, such as from memory 404 (e.g., via bus 414), from first media electronic device 300 or from a server of communications set-up 255 (e.g., via communications component 206), or from any other suitable source. In some embodiments, one or more components of second media electronic device 400 may be combined or omitted. Moreover, second media electronic device 400 may include other components not combined or included in FIG. 1 and/or several instances of the components shown in FIG. 1. For the sake of simplicity, only one of each of the components of second media electronic device 400 is shown in FIG. 1.

Each one of housing 401, processor 402, application 403, memory 404, media 405, communications component 406, power supply 408, input component 410, I/O component 411, output component 412, and bus 414 of second media electronic device 400 may be the same as or substantially similar to a respective one of housing 301, processor 302, application 303, memory 304, media 305, third communications component 326, power supply 308, input component 310, I/O component 311, output component 312, and bus 314 of first media electronic device 300 and, therefore, may not be independently described in greater detail. While, in some embodiments, first media electronic device 300 and second media electronic device 400 may be the same or substantially similar devices, in other embodiments, first media electronic device 300 may have one or more different and/or additional components that second media electronic device 400 does not have, and vice versa (e.g., as described below with respect to FIG. 2).

In some embodiments, third communications component 326 of first media electronic device 300 and communications component 406 of second media electronic device 400 may communicate with one another directly, such as, for example, via a shared communications link 251 of communications set-up 255 that may include one or more wired and/or wireless communications links or paths for transferring any suitable data and/or power between electronic device 300 and electronic device 400. Alternatively or additionally, in some embodiments, communications set-up 255 may include a communications network 250, with which one or both of electronic device 300 and electronic device 400 may communicate (e.g., via respective communications links 261 and 271). Communications network 250 may include a server 270, which may be similar to server 70. Therefore, in some embodiments, communications set-up 255 may be substantially similar to communications set-up 55.

Description of FIG. 2

As mentioned, system 1 may be configured in various ways and may include various combinations of various devices while still enabling efficient control of a media application at a media electronic device by a user electronic device (e.g., while still facilitating efficient control of media application 305 at first media electronic device 300 by first user electronic device 100 (e.g., a remote controller utilized by a user of system 1)). For example, in some embodiments, system 1 may only include first user electronic device 100 without any additional user electronic devices (e.g., without second user electronic device 200, described in more detail below) and/or system 1 may only include first media electronic device 300 without any additional media electronic devices (e.g., without second media electronic device 400, described in more detail below). However, in other embodiments, system 1 may include devices 100, 200, 300, and 400, where, for example, first media electronic device 300 may be operative to receive control signals from each one of first user electronic device 100 and second user electronic device 200 for controlling the playback of electronic media 305 via first media electronic device 300 at second media electronic device 400 (e.g., whereby each one of devices 100 and 200 may be controllers for use by different players of a video game 305 that may be running on device 300 and that may be presented to the different players via device 400, as may be described below with respect to system 1' of FIG. 2).

For example, as shown in FIG. 2, a particular implementation of a system 1' may include first user electronic device 100, second user electronic device 200, first media electronic device 300, and second media electronic device 400. As shown, in the particular embodiment of system 1', first user electronic device 100 may be provided by a first type of media controller and second user electronic device 200 may be provided by a second type of media controller that may be different than the first type of media controller, where each one of first and second user electronic devices 100 and 200 may be operative to be communicatively coupled with first media electronic device 300 for controlling at least a portion of electronic media 305 at device 300, while second media electronic device 400 may be communicatively coupled to first media electronic device 300 for presenting at least a portion of that controlled electronic media 305 to a user of system 1' (e.g., a first user using first user electronic device 100 and/or a second user using second user electronic device 200). For example, first user electronic device 100 may include a first input component 110a, which may be a touchpad or any suitable touch input component, second, third, fourth, and fifth input components 110b-110e, each of which may be a button, and a sixth input component 110f, which may be any suitable motion or inertia sensor or combination of such sensors (e.g., for detecting motion of device 100 along at least one, some or each axis of freedom in space (e.g., along perpendicular X-, Y-, and Z-axes)), each of which may be at least partially enclosed by housing 101.

For example, touch input component 110a of first user electronic device 100 may include a touch sensitive panel, which may be wholly or partially transparent, semitransparent, non-transparent, opaque, or any combination thereof. Touch input component 110a may be embodied as a touch screen, touchpad, trackpad, a touch screen functioning as a touchpad (e.g., a touch screen replacing the touchpad of a laptop), a touch screen or touchpad combined or incorporated with any other input device (e.g., a touch screen or touchpad disposed on a keyboard), or any multi-dimensional object having a touch sensitive surface for receiving touch input. In some embodiments, touch input component 110a embodied as a touch screen may include a transparent and/or semitransparent touch sensitive panel partially or wholly positioned over at least a portion of a display (e.g., a display output component 112 to form a touch screen I/O component 111). In other embodiments, touch input component 110a may be embodied as an integrated touch screen where touch sensitive components/devices are integral with display components/devices. In still other embodiments, touch input component 110a may be used as a supplemental or additional display screen for displaying supplemental or the same graphical data as a primary display and to receive touch input. However, in the particular embodiment of FIG. 2, touch input component 110a of system 1' may be a touchpad with no underlying display. Touch input component 110a may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to touch input component 110a. Software, hardware, firmware, or any combination thereof may be used to process the measurements of the detected touches to identify and track one or more gestures. A gesture may correspond to stationary or non-stationary, single or multiple, touches or near touches on touch input component 110a (e.g., a single point of touch or multi-touch may be supported). A gesture may be performed by moving one or more fingers or other objects in a particular manner on touch input component 110a, such as by tapping, pressing, rocking, scrubbing, twisting, changing orientation, pressing with varying pressure, and the like at essentially the same time, contiguously, or consecutively. A gesture may be characterized by, but is not limited to, a pinching, sliding, swiping, rotating, flexing, dragging, or tapping motion between or with any other finger or fingers. A single gesture may be performed with one or more hands, by one or more users, or any combination thereof.

Motion sensor input component 110f of first user electronic device 100 may include any suitable motion sensor operative to detect movements of housing 101 of electronic device 100 (e.g., in space). For example, motion sensor input component 110f may be operative to detect a user's movements of electronic device 100. In some embodiments, motion sensor input component 110f may include one or more three-axes acceleration motion sensors (e.g., an accelerometer) that may be operative to detect linear acceleration in three directions (e.g., the x- or left/right direction or tipping motion, the y- or up/down direction or tilting motion, and the z- or forward/backward direction or user acceleration, etc.). As another example, motion sensor input component 110f may include one or more two-axis acceleration motion sensors that may be operative to detect linear acceleration only along each of x- and y-directions (or any other pair of directions). In some embodiments, motion sensor input component 110f may include an electrostatic capacitance (e.g., capacitance-coupling) accelerometer that may be based on silicon micro-machined MEMS (Micro Electro Mechanical Systems) technology, a piezoelectric type accelerometer, a piezo-resistance type accelerometer, or any other suitable accelerometer. In some embodiments, motion sensor input component 110f may be operative to directly detect rotation, rotational movement, angular displacement, tilt, position, orientation, motion along a non-linear (e.g., arcuate) path, or any other non-linear motions. For example, if motion sensor input component 110f is a linear motion sensor, additional processing may be used to indirectly detect some or all of the non-linear motions. For example, by comparing the linear output of motion sensor input component 110*f* with a gravity vector (i.e., a static acceleration), motion sensor input component 110*f* may be operative to calculate or at least generate information useful to calculate the tilt of electronic device 100 with respect to an axis. Additionally or alternatively, motion sensor input component 110*f* may include one or more angular rate, inertial, and/or gyro-motion sensors or gyroscopes for detecting rotational movement. For example, motion sensor input component 110*f* may include one or more rotating or vibrating elements, optical gyroscopes, vibrating gyroscopes, gas rate gyroscopes, ring gyroscopes, magnetometers (e.g., scalar or vector magnetometers), compasses, and the like. Using motion sensor input component 110*f*, electronic device 100 may be configured to determine a velocity, acceleration, orientation, and/or any other suitable motion attribute of electronic device 100.

On the other hand, second user electronic device 200 may be a conventional game controller (e.g., an extended game controller) that may include an analog directional pad with up, down, left, and right input components 210*a*-210*d*, four analog face buttons as input components 210*e*-210*h*, two left analog shoulder buttons as input components 210*i* and 210*j*, two right analog shoulder buttons as input components 210*k* and 210*l*, a left analog thumbstick as input component 210*m*, a right analog thumbstick as input component 210*n*, a pause/resume gameplay button as input component 2100*o*, a motion sensor input component 210*p*, and a light emitting array as an output component 212*a*, each of which may be at least partially enclosed by housing 201. Although not shown, second user electronic device 200 may also include a touchpad input component, which may be similar to first input component 110*a* of electronic device 100, and/or any other suitable input components and/or output components. Second user electronic device 200 may be the same as or similar to the DualShock 4 Wireless Controller for PlayStation 4 made available by Sony Corporation of Tokyo, Japan and/or the Xbox One Wireless Controller for Xbox One made available by Microsoft Corporation of Redmond, Wash. It is to be appreciated that second user electronic device 200 may include at least one input component (e.g., shoulder input components and/or thumbstick input components, etc.) that may not be provided by first user electronic device 100, whereby second user electronic device 200 may be referred to herein as an extended or fully-equipped or fully-enabled controller while first user electronic device 100 may be referred to herein as a limited or partially-equipped controller.

First media electronic device 300 may be a "limited smart" media playback device or residential gateway or any other suitable gateway or media receiver (e.g., an AirPort Express™, an AirPort Extreme™, or an Apple TV™ made available by Apple Inc.) that may include first communications component 306 for receiving information from first user electronic device 100 and/or second communications component 316 for receiving information from second user electronic device 200, but also third communications component 326 for communicating with second media electronic device 400, where first media electronic device 300 may not have or use an output component 312 that actually outputs media to a user of system 1' (e.g., a user of device 100 and/or 200). In such embodiments, output component 312 may be a simple light emitting component that may be operative to emit light when device 300 is powered on, but not operative to present electronic media (e.g., a video game electronic media 305) to a user of system 1'. Instead, first media electronic device 300 may be configured to control at least a portion of the playback of such media (e.g., based on control information from one or both of devices 100 and 200) and may be configured to instruct second media electronic device 400 (e.g., via communications set-up 255) to present the playback of such controlled media by output component 412 of second media electronic device 400. As shown in system 1' of FIG. 2, such a second media electronic device 400 may include any media playback device, such as a television or display monitor or stereo (e.g., one media electronic device 400 may include a display output component 412 (e.g., for presenting video information provided from device 300 over communications set-up 255) and/or another media electronic device 400*a* may include a stereo audio output component 412*a* (e.g., for presenting audio information provided from device 300 over communications set-up 255*a*)). That is, although in some embodiments, first media electronic device 300 may include at least one speaker and/or display media playback output component 312 that may output media in a presentation form to a user of system 1 (e.g., first media electronic device 300 may be a laptop computer with its own display output component 312), alternatively, in some embodiments, as shown in FIG. 2, media playback component 312 may not be configured to output any media capable of being detected by a system user, but, instead, first media electronic device 300 may be an AirPlay™ receiver, such as an AirPort Express™ made available by Apple Inc., that may include an audio output connector media playback component that may not be able to output audible audio waves but that may only be able to communicate audio signals to a loudspeaker device (e.g., media electronic device 400*a*) that may be configured to convert those audio signals to audible audio waves that may be output to and heard by a user (e.g., via media playback component 412*a*) and/or first media electronic device 300 may be an AirPlay™ receiver, such as Apple TV™ made available by Apple Inc., that may include an audio/video output connector media playback component that may not be able to output audible audio waves and visible video waves but that may only be able to communicate audio/video signals to a television device (e.g., media electronic device 400) that may be configured to convert those audio/video signals to audible audio waves and visible video waves that may be output to and experienced by a user (e.g., via media playback component 412). In such embodiments, media data may be communicated from device 300 to device 400 using any suitable wired or wireless communications set-up 255 (e.g., a high-definition multimedia interface ("HDMI") cable).

Description of FIGS. 3A-7F

To facilitate the following discussion regarding the operation of system 1 and/or system 1' for enabling efficient control of a media application at a media electronic device by a user electronic device, reference is made to one or more processes of one or more flowcharts of FIGS. 3A-6D, to various situations of FIGS. 7A-7F, and to various components of system 1 and/or system 1' of the schematic diagrams of FIGS. 1 and 2.

Description of FIG. 3C

FIG. 3C is a flowchart of an illustrative process 330 for enabling efficient use of a user electronic device that may be providing control data for a media application running on a media electronic device. Process 330 is shown being implemented by first user electronic device 100 (e.g., one or more input components 110 (e.g., touchpad input component 110a, one or more button input components 110b-110e, and/or one or more motion sensors of motion sensor input component 110f), application 103 running on processor 102, communications component 106, and bus 114), first media electronic device 300 (e.g., device application 303 and media application 305 running on processor 302, communications component 306, and bus 314), and communications set-up 55. However, it is to be understood that process 330 may be implemented using any other suitable components or subsystems.

Process 330 may enable efficient use of user electronic device 100 as a remote controller for providing control data for media application 305 running on media electronic device 300. A user control data request may be generated by a device application of a media electronic device based on a media control data request received from a media application, where such a user control data request may be utilized by a controller application of a user electronic device to efficiently update the status of one or more components of the user electronic device (e.g., to reduce the power consumption of the user electronic device) and/or to efficiently communicate user control data back to the device application (e.g., to reduce the latency of such communication), whereby such user control data may be utilized by the device application to generate corresponding media control data for use by the media application (e.g., responsive to the media control data request (e.g., to control game play of a video game media application)). For example, a user may be holding or otherwise proximate user electronic device 100 for manipulating one or more input components 110, whereby data indicative of such manipulation (or lack thereof) may be collected by processor 102 using application 103 (e.g., a controller application) and may be communicated by user electronic device 100 as user control data via communications component 106 and communications set-up 55 to communications component 306 of media electronic device 300, whereby such user control data may be analyzed by processor 302 using device application 303 (e.g., a game controller framework) to generate game control data or media control data, and whereby such media control data may be accessed by game or media application 305 for controlling playback of game or media application 305 (e.g., a video game), which may then be presented to the user via any suitable output component (e.g., an output component 312 of media electronic device 300 and/or output component 412 of media electronic device 400, as described above). As a player user manipulates one or more input components 110 of user electronic device 100, such inputs may be communicated as user control data (e.g., as hardware signals) to device application 303, which may be operative to normalize and/or compute a consistent value for each input component 110 represented by the user control data and to update media control data (e.g., to update the values of various elements of a current user device control state), where such media control data may then be accessed by game or media application 305 for use in controlling its playback. As such, at least a portion of device application 303 may provide a game controller framework that may be operative to receive user control data from one or more game controllers (e.g., user electronic device 100 and/or user electronic device 200) and may define one or more functions operative to transform such collected user control data into any suitable data objects or structs for generating any suitable media control data that may be utilized by media application 305. Moreover, at least a portion of device application 303 may be operative to receive and process a media control data request from media application 305 and then to generate an appropriate user control data request that may be utilized by user electronic device 100 for efficiently providing new user control data.

As described in more detail with respect to FIGS. 8 and 9, one or more Application Programming Interfaces ("APIs") may be used by system 1 and/or system 1', where an API may be an interface implemented by a program code component or hardware component or any other suitable module (hereinafter an "API-implementing component") that may allow a different program code component or hardware component or any other suitable module (hereinafter an "API-calling component") to access and use one or more functions, methods, procedures, data structures, classes, and/or other services provided by the API-implementing component, and where an API can define one or more parameters that may be passed between the API-calling component and the API-implementing component. For example, as shown in FIG. 3C, a first API, API-U, may be used for communication between controller application 103 of user electronic device 100 and device application 303 of media electronic device 300 (e.g., via communications set-up 55 and communication components 106 and 306), while a second API, API-M, may be used for communication between device application 303 and media application 305 (e.g., on processor 302 of media electronic device 300). In some embodiments, controller application 103 of user electronic device 100 may be operative as an API-implementing component of API-U and device application 303 of media electronic device 300 may be operative as an API-calling component of API-U (e.g., for accessing user control data from controller application 103 of user electronic device 100 at device application 303 of media electronic device 300). Additionally or alternatively, in some embodiments, device application 303 of media electronic device 300 may be operative as an API-implementing component of API-M and media application 305 of media electronic device 300 may be operative as an API-calling component of API-M (e.g., for accessing media control data from device application 303 of media electronic device 300 at media application 305 of media electronic device 300). With respect to media application 305 accessing or reading media control data (e.g., the values of various elements of a current user device control state) from device application 303 (e.g., via API-M), various strategies may be utilized, such as (i) reading an element's values directly (e.g., in a game loop of a game media application, the values of the elements that the game is interested in may be polled), (ii) registering to be called when an element changes (e.g., a game media application may register a block to be called when values change for a single element or all elements), or (iii) using snapshots to serialize controller inputs (e.g., a game media application may use snapshots to save a current user device control state). Device application 303 of media electronic device 300 may provide a game controller framework that may be an API provider to the one or more developers of one or more media applications 305, which may enable the media applications 305 to be developed to interface with different user electronic devices as game controllers (e.g., user electronic device 100 and/or user electronic device 200).

A path from communications set-up 55 to device application 303 via communications component 306 may include any suitable modules. For example, media electronic device 300 may include a kernel that may process and propagate data packets received from communications component 106 of device 100 via communications set-up 55 at communications component 306 to one or more suitable universal asynchronous receiver/transmitters ("UARTs"), such as a BTE UART for BTE communications, where such communications may be transformed by the UARTs into one or more events of a human interface device ("HID") of device 300, and where such HID events may be propagated to device application 303 (e.g., a game controller framework). A core motion framework may also be available along this path (e.g., between communications set-up 55 and device application 303) that may provide one or more motion modules that may support accessing both raw and processed motion data (e.g., using one or more block-based interfaces). Likewise, a path from device application 303 to communications set-up 55 via communications component 306 may include a core motion framework and/or a HID, one or more UARTs, and one or more kernels. Any other suitable modules may be provided along such a path. One or more similar modules may be provided at electronic device 100 between application 103 and communications set-up 55.

At step 332 of process 330, a media control data request 333 may be transferred from media application 305 to device application 303 or otherwise accessed at device application 303. Such a media control data request 333 may be any suitable call (e.g., an API call of API-M) or other suitable type of request for any suitable media control data that may be made available by device application 303 to media application 305. Such a request may be made at any suitable moment, such as whenever media application 305 would like a most recent value for one, some, or all of the various elements of a user device control state (e.g., the most recent value for one, some, or all input component types, each of which may be mapped or otherwise associated with a particular input component of one or more user controller electronic devices that may be communicatively coupled to device application 303), or at any suitable frequency, such as 30 Hz or 60 Hz. For example, in one instance, a particular media control data request 333 may include a request for a most recent value for each one of input components 110b, 110c, and 110d, but not for any one of input components 110a, 110e, and 110f of device 100 (e.g., a request for a value from each input component of a proper subset or a strict subset of all input components of device 100). However, in another instance, another particular media control data request 333 may include a request for a most recent value for each one of input components 110a-110f (e.g., a non-strict subset of all input components of device 100). In addition to or as an alternative to requesting the most recent value for one or more input components of one or more user electronic devices that may be communicatively coupled to device application 303, a particular media control data request 333 may include information indicative of a current game state or a current media state of media application 305 (e.g., information indicative of whether a video game 305 has been paused or whether main game play of the video game is active). In some embodiments, such game state information may be provided as one or more event notifications, as described with respect to media event system notification data 623 of FIG. 6D, which may be provided independently or along with a media control data request.

At step 334 of process 330, device application 303 may process at least a portion of the most recently received media control data request (e.g., media control data request 333 of step 332). Such processing of step 334 may include any suitable number of components that may be operative to enable device application 303 to generate an appropriate user control data request 337 that may then be transferred from device application 303 to controller application 103 of user electronic device 100 at step 336, where such a user control data request 337 may be handled by user electronic device 100 at one or more of steps 338-344 to adjust the functionality of user electronic device 100 in one or more ways for increasing the efficiency of user electronic device 100 as a remote controller for generating and transmitting user control data 347 to device application 303 at step 346, which may be utilized by device application 303 at steps 348 and 350 for generating and transmitting media control data 351 to media application 305 for use in controlling media application 305. The processing of the most recently received media control data request 333 at step 334 may include one or more of the following sub-processing steps: (i) storing at least a portion of the most recently received media control data request 333 in a memory accessible to device application 303 (e.g., a portion of memory 304); (ii) accessing at least a portion of one or more previously received media control data requests; (iii) accessing any current control data incremental elements or timers (e.g., timers available to device 300); (iv) accessing the known state of any input components of user electronic device 100 (e.g., from portions of previously received user control data 347 and/or from values of local timers and other suitable features or API usage); (v) determining from which input components of user electronic device 100 input component data ought to be collected based on the most recently received media control data request 333; (vi) adjusting the status of one or more control data timers based on the most recently received media control data request 333; (vii) determining which input components of user electronic device 100 ought to have its state updated based on the most recently received media control data request 333 and/or based on the status of one or more control data timers; and (viii) defining user control data request 337 based on one or more of these other sub-processing steps. User control data request 337 may be any suitable request, which may be communicated in any suitable way to controller application 103 (e.g., as a call of API-U). User control data request 337 may be embodied as a HID report (e.g., a feature report or a special HID feature report) or in any other suitable manner. Both button input response and motion input response of user electronic device 100 may be combined into a single API (e.g., API-U) for use by device application 303 and/or application 103.

Such a user control data request 337 may be defined for providing any suitable instructions to user electronic device 100 for more efficiently operating as a controller for media application 305. For example, as described below (e.g., with respect to steps 338-344 of process 330), user control data request 337 may be operative to adjust the state or functionality of one or more components of user electronic device 100 (e.g., to turn on (e.g., power up) a component of device 100, to turn off (e.g., power down) a component of device 100, to adjust an operating characteristic of a component of device 100 (e.g., the frequency with which a component generates new data), to request that a specific type of user control data be generated, and the like). As such, user control data request 337 may be operative to increase the battery life of user electronic device 100 (e.g., to reduce the amount of power that may be required by the operation of user electronic device 100 (e.g., by turning off or throttling the use of certain components)) and/or to reduce the latency of user control data communicated from user electronic device 100 to media electronic device 300 (e.g., to reduce the size of one or more packets of information that may be sent from device 100 to device 300 (e.g., by only requesting that certain data be included in new user control data)).

The processing of media control data request 333 at step 334 may enable device application 303 to generate a user control data request 337 that may be operative to request that user electronic device 100 include only certain input component data from user electronic device 100 as user control data to be communicated from user electronic device 100 to media electronic device 300 (e.g., as user control data 347 at step 346 described below), which may thereby decrease the size of such user control data and/or the latency of the communication of such user control data. By generating a user control data request 337 that may be operative to request input component data from only a particular subset of input components of user electronic device 100 based on analysis of a recent media control data request 333 at step 334, device application 303 may be operative to reduce the latency of any user control data communicated back to device application 303 from user electronic device 100 in response to processing such a user control data request 337 (e.g., as described below with respect to steps 338-344 of process 330). For example, rather than defining a user control data request that may be operative to request the current status of all input components of user electronic device 100, device application 303 may be operative to analyze most recently received media control data request 333 at step 334 to determine a list of input components of user electronic device 100 from which a most recent value of input component data is currently being sought by media application 305 and then to define a user control data request 337 that may be operative to request input component data from only the input components of that determined list. As just one particular example, device application 303 may be operative to analyze media control data request 333 to determine that media application 305 is currently requesting control data for the current state of input component 110b of user electronic device 100 but not for the current state of any other input component of user electronic device 100 (e.g., media control data request 333 may specifically include a request for the current status of input component 110b, or media control data request 333 may be operative to indicate to device application 303 that the current game state of media application 305 is a "paused" game state and device application 303 may be operative to determine that input component 110b (e.g., a pause button) may be the only input component whose status may be operative to alter such a paused game state), and device application 303 may then generate user control data request 337 that may be indicative of a request to collect input component data from only input component 110b. As one other particular example, device application 303 may be operative to analyze media control data request 333 to determine that media application 305 is currently requesting control data for the current state of each one of input component 110a and input component 110f of user electronic device 100 but not for the current state of any of input components 110b-110e, and device application 303 may then generate user control data request 337 that may be indicative of a request to collect input component data from input component 110a and input component 110f but not from any one of input components 110b-110e.

Additionally or alternatively, the processing of media control data request 333 at step 334 may enable device application 303 to generate a user control data request 337 that may be operative to instruct user electronic device 100 to alter the functioning state of one or more components of device 100 (e.g. to turn a user device component on or off) and/or to adjust a functional characteristic of one or more components of device 100 (e.g., to adjust the frequency with which a user device component generates new data), which may thereby decrease the amount of power consumed by user electronic device 100. By generating a user control data request 337 that may be operative to instruct user electronic device 100 to adjust the functionality of one or more components of user electronic device 100 based on analysis of a recent media control data request 333 at step 334, device application 303 may be operative to help maximize the battery life of user electronic device 100 by only utilizing the components of user electronic device 100 that may be useful for providing user control data of interest to media application 305. For example, rather than defining a user control data request that may be operative to instruct user electronic device 100 to fully power each one of input components 110a-110f for generating input component data at its maximum frequency for use in defining user control data, device application 303 may be operative to analyze most recently received media control data request 333 at step 334 in conjunction with any other suitable data, such as any number of previously received media control data requests, any current control data timers, and/or the known state of any input components of user electronic device 100, to determine which functionality or functionalities of which component or components of user electronic device 100 may be adjusted to increase the efficiency of user electronic device 100 while still maintaining the effectiveness of the user control data provided by user electronic device 100, and then to define a user control data request 337 that may be operative to instruct electronic device 100 to make such determined functionality adjustment(s).

User control data request 337 may be operative to instruct user electronic device 100 to ensure that each input component of user electronic device 100 from which data is sought by most recent media control data request 333 is functioning in a particular way. For example, in some embodiments, in response to determining a list of input components of user electronic device 100 from which a most recent value of input component data is currently being sought by media application 305 (e.g., based on analysis of most recently received media control data request 333 at step 334), device application 303 may generate user control data request 337 that may include an instruction for user electronic device 100 to turn on each one of those particular input components if not already on and/or to adjust a functional characteristic (e.g., increase an output frequency) of each one of those particular input components to a particular threshold (e.g., to a maximum output frequency) if not already at that threshold. Continuing with such an example, although user electronic device 100 may be operative to initially configure motion sensor input component 110f in an off state (e.g., a state in which minimal to no power may be drawn by component 110f), when user control data request 337 includes an instruction to set motion sensor input component 110f to its maximum output frequency or merely includes a request to collect input component data from input component 110f, user electronic device 100 may be operative to process such a user control data request 337 (e.g., at steps 338, 340, and 341) to turn on motion sensor input component 110f such that it may output motion sensor input component data at a maximum output frequency (e.g., at 60 Hertz). Therefore, despite a certain user device input component having been turned off or having a functional characteristic currently in a decreased state (e.g., as a default or based on an earlier user control data request), in response to receiving a new media control data request 333 that may seek data from that certain user device input component, device application 303 may be operative to generate a new user control data request 337 that may be operative to instruct user electronic device 100 to turn on or increase the functional characteristic of that user device input component.

As another example, in some embodiments, in response to determining a current game state of media application (e.g., based on analysis of most recently received media control data request 333 at step 334), device application 303 may generate user control data request 337 that may include an instruction for user electronic device 100 to adjust the functionality of one or more particular input components (e.g., to adjust a debounce time of an input component) based on that determined game state. Continuing with such an example, although user electronic device 100 may be operative to initially configure a particular input component (e.g., a click button integrated under touchpad input component 110a or button input component 110b) to be used with a first particular debounce time (e.g., a duration during which an initial input detection must be confirmed prior to utilization as control data), when device application 303 has determined that a current game state of media application 305 is an active game state, user control data request 337 may include an instruction to adjust the debounce time for that particular input component (e.g., from 12 milliseconds to zero debounce time), user electronic device 100 may be operative to process such a user control data request 337 (e.g., at steps 338-346) to reduce the debounce time associated with that particular input component, thereby reducing the latency of data communication between device 100 and device 300.

User control data request 337 may be operative to instruct user electronic device 100 to decrease the functionality of an input component of user electronic device 100 from which data has not been sought by at least the most recent media control data request 333, if not from which data has also not been sought during any suitable threshold event (e.g., any suitable amount of time and/or by any suitable number of consecutive media control data requests prior to the most recent media control data request 333). For example, in some embodiments, in response to determining that a most recent value of input component data from a particular input component of user electronic device 100 is not currently being sought by media application 305 (e.g., based on analysis of most recently received media control data request 333 at step 334), device application 303 may be operative to determine how many consecutive media control data requests have been received since the last media control data request that did seek input component data from that particular input component of user electronic device 100 (e.g., by accessing and analyzing any suitable number of previously received media control data requests at step 334). If that number of consecutive media control data requests meets any suitable threshold, device application 303 may be operative to generate a user control data request 337 that may include an instruction for user electronic device 100 to decrease the functionality of that particular input component. Such an instruction may be operative to instruct device 100 to reduce any suitable functional characteristic of the input component (e.g., to reduce the output update frequency of the input component) or to turn off the input component, either of which may reduce the power consumption of device 100 and/or increase the efficiency of device 100.

Alternatively or additionally, user control data request 337 may be operative to instruct user electronic device 100 to decrease the functionality of an input component of user electronic device 100 from which data has not been sought by any media control data request since a particular duration of time. For example, in some embodiments, in response to determining that a most recent value of input component data from a particular input component of user electronic device 100 is not currently being sought by media application 305 (e.g., based on analysis of most recently received media control data request 333 at step 334), device application 303 may be operative to determine how much time has elapsed since the receipt of the last media control data request that did seek input component data from that particular input component of user electronic device 100 (e.g., by accessing and analyzing the value of a particular microtimer or clock at step 334). Device application 303 may be operative to initially start or reset a clock for a particular user device input component each time device application 303 determines that a most recent value of input component data from that particular user device input of user electronic device 100 is currently being sought by media application 305 (e.g., based on analysis of a most recently received media control data request 333 at a particular iteration of step 334), such that the value of such a clock may be accessed at any suitable later moment (e.g., at any suitable later iteration of step 334) to determine how long it has been since input component data from the particular user device input component associated with that clock was last sought by a media control data request of media application 305. If the duration value of that clock meets any suitable threshold, device application 303 may be operative to generate user control data request 337 that may include an instruction for user electronic device 100 to decrease the functionality of that particular input component. Such an instruction may be operative to instruct device 100 to reduce any suitable functional characteristic of the input component (e.g., to reduce the output update frequency of the input component) or to turn off the input component, either of which may reduce the power consumption of device 100 and/or increase the efficiency of device 100. In some embodiments, such use of a clock or timer may be less time consuming and more efficient than accessing and analyzing a large number of previously received media control data requests at step 334. In some embodiments, rather than accessing a large number of previously received media control data requests at step 334, the number of consecutive media control data requests since a request indicative of a particular input component may be tracked via a register that may be cleared and/or initiated each time that input component is indicated in a media control data request and that may be incremented each that input component is not indicated in a media control data request such that the register may be used similarly to a timer but for tracking consecutive media control data requests rather than elapsed time.

Different thresholds may be defined for different types of decrease in functionality. For example, if the duration of time or the number of consecutively received media control data requests not seeking input component data from a particular input component of user electronic device 100 since the last media control data request that did seek such input component data reaches a first particular threshold (e.g., a duration of 30 seconds or 2,000 consecutively received requests, or any other suitable threshold), then device application 303 may be operative to generate a user control data request 337 that may include an instruction for user electronic device 100 to reduce any suitable functional characteristic of the input component (e.g., to reduce the output update frequency of the input component) by 50%

(e.g., to reduce the frequency with which motion sensor output component 110*f* generates motion sensor data from 60 Hz to 30 Hz) or any other suitable amount, and, if that duration of time or that number of consecutively received media control data requests reaches a higher second particular threshold (e.g., a duration of 45 seconds or 3,000 consecutively received requests, or any other suitable threshold), then device application 303 may be operative to generate user control data request 337 that may include an instruction for user electronic device 100 to reduce any suitable functional characteristic of the input component (e.g., to reduce the output update frequency of the input component) by another 50% (e.g., to reduce the frequency with which motion sensor output component 110*f* generates motion sensor data from 30 Hz to 15 Hz) or any other suitable amount, and, if that duration of time or that number of consecutively received media control data requests reaches an even higher third particular threshold (e.g., a duration of 60 seconds or 4,000 consecutively received requests, or any other suitable threshold), then device application 303 may be operative to generate user control data request 337 that may include an instruction for user electronic device 100 to turn off the input component (e.g., to prevent the input component from generating output data). Additionally or alternatively, different thresholds may be defined for different types of input components of device 100. For example, device application 303 may be operative to generate user control data request 337 that may include an instruction for user electronic device 100 to turn off a first particular input component (e.g., motion sensor input component 110*f*) if the duration of time or the number of consecutively received media control data requests not seeking input component data from that first particular input component since the last media control data request that did seek such input component data reaches a first particular threshold (e.g., a duration of 60 seconds or 4,000 consecutively received requests, or any other suitable threshold), yet device application 303 may be operative to generate user control data request 337 that may include an instruction for user electronic device 100 to turn off a second particular input component (e.g., touchpad input component 110*a*) if the duration of time or the number of consecutively received media control data requests not seeking input component data from that second particular input component since the last media control data request that did seek such input component data reaches a second higher particular threshold (e.g., a duration of 120 seconds or 8,000 consecutively received requests, or any other suitable threshold).

Once a most recently received media control data request 333 has been analyzed at step 334, any appropriate new user control data request 337 may be generated and transmitted to user device 100 at step 336, where such new user control data request 337 may include any suitable information, such as information that may be operative to request that user electronic device 100 include only certain input component data as user control data to be communicated from user electronic device 100 to media electronic device 300 and/or such as information that may be operative to instruct user electronic device 100 to alter the functioning state of one or more components of device 100. Such a user control data request 337 may be any suitable call (e.g., an API call of API-U) or other suitable type of request for any suitable user control data that may be made available by controller application 103 of user electronic device 100 to media application 303 of media electronic device 300. Such a request may be made at any suitable moment, such as after a new media control data request 333 has been processed, or at any suitable frequency, such as 30 Hz or 60 Hz, or when such new user control data request 337 may be different than a previous user control data request sent by application 303 to application 103.

At step 338 of process 330, controller application 103 may process at least a portion of the most recently received user control data request (e.g., user control data request 337 of step 336). Such processing of step 338 may include any suitable number of components that may be operative to enable controller application 103 to generate one or more appropriate I/O control requests 339 (e.g., at step 340) and/or to collect and process input component data 343 (e.g., at step 344) for generating and transmitting appropriate user control data 347 (e.g., at step 346). For example, as mentioned, user control data request 337 may be handled by user electronic device 100 at one or more of steps 338-344 to adjust the functionality of user electronic device 100 in one or more ways for increasing the efficiency of user electronic device 100 as a remote controller for generating and transmitting user control data 347 to device application 303 at step 346, which may be utilized by device application 303 at steps 348 and 350 for generating and transmitting media control data 351 to media application 305 for use in controlling media application 305. The processing of the most recently received user control data request 337 at step 338 may include one or more of the following sub-processing steps: (i) storing at least a portion of the most recently received user control data request 337 in a memory accessible to controller application 103 (e.g., a portion of memory 104); (ii) accessing at least a portion of one or more previously received user control data requests; (iii) accessing any current control data timers (e.g., timers available to device 100); (iv) accessing the known state of any components (e.g., input component(s) 110) of user electronic device 100; (v) determining from which input components of user electronic device 100 input component data ought to be collected based on the most recently received user control data request 337; (vi) adjusting the status of one or more control data timers based on the most recently received user control data request 337; (vii) determining which input components of user electronic device 100 ought to have its functionality updated based on the most recently received user control data request 337 and/or based on the status of one or more control data timers; (viii) defining one or more I/O control requests 339 (e.g., for use at step 340) based on one or more of these other sub-processing steps; and (ix) defining user control data 347 (e.g., for use at step 346) based on one or more of these other sub-processing steps.

One or more particular I/O control requests 339 may be generated by controller application 103 at step 338 (e.g., based on any suitable processing of step 338) and then leveraged by controller application 103 at step 340 with respect to one or more particular I/O components 110/112 of user device 100 for adjusting the functionality of those particular I/O components 110/112 for more efficiently operating as a controller for media application 305. For example, as mentioned, in some embodiments, user control data request 337 may be operative to instruct user electronic device 100 to adjust the state or functionality of one or more components of user electronic device 100 (e.g., to turn on a component of device 100, to turn off a component of device 100, to adjust an operating characteristic of a component of device 100 (e.g., the frequency with which a component generates new data), to request a specific type of user control data be generated, and the like). In such embodiments, controller application 103 may be operative to process such a user control data request 337 for generating one or more applicable I/O control requests 339 at step 338 and then utilizing each I/O control request 339 at step 340 for instructing one or more applicable components of device 100 (e.g., input components 110) to make a functional adjustment. For example, if user control data request 337 includes an instruction for user electronic device 100 to turn off motion sensor input component 110f, controller application 103 may be operative to process such a user control data request and to generate an appropriate I/O control request 339 at step 338, and then to transmit that I/O control request 339 to the applicable device component (e.g., to motion sensor input component 110f, as shown in FIG. 3C), whereby that I/O control request 339 may then be processed (e.g., at step 341) to make the appropriate functional adjustment to the applicable component (e.g., to turn off motion sensor input component 110f). An I/O control request 339 may include any suitable instruction to any suitable component to adjust the functionality of any suitable component in any suitable manner. Additionally or alternatively, rather than relying on device application 303 to generate and transmit user control data request 337 that may include an instruction for user electronic device 100 to adjust the state or functionality of one or more components of user electronic device 100 (e.g., an instruction to generate one or more appropriate I/O control requests 339), controller device 103 may be operative to generate such an instruction or make such a determination for generating one or more I/O control requests 339 (e.g., at step 338) based on other suitable information that may be at least partially included in user control data request 337. For example, controller application 103 may be operative to analyze from which input components of device 100 data is being requested by the most recently received user control data request 337 and to determine that an I/O control request 339 may need to be generated to turn on any of such components that may be off and/or to otherwise determine whether the functionality of any other components of device 100 ought to be altered (e.g., turned off or ramped down). For example, similarly to but rather than device application 303 with respect to media control data request(s) 333 at step 334, controller application 103 may be operative to determine the length of time or the number of consecutive user control data requests 337 that have been received since data from a particular component of device 100 has been requested by device 300 with respect to one or more applicable thresholds that may be available to application 103 at step 338, and then may be accordingly operative to generate a particular I/O control request 339 for use with that particular component (e.g., to ramp down a functional characteristic of that component or to turn off that component).

Controller application 103 may also be operative to collect input component data 343 at step 342 from any or all input components 110 that may be generating output data and/or to collect any other suitable data from any other suitable components (e.g., the status of output components of device 100 for sharing as status information with device 300). Controller application 103 may be operative to collect such available input component data 343 at step 342 and then to process such collected component data at step 344 in conjunction with any suitable information from user control data request 337 to generate user control data 347 for transmission to device application 303 of media electronic device 300 at step 346. The component data 343 that may be collected at step 342 may include more than just the component data that may be requested by user control data request 337, but controller application 103 may be operative to process user control data request 337 at step 344 to filter such collected component data such that only the component data collected from input components indicated to be of interest to media application 305 by user control data request 337 may be utilized for generating user control data 347. Therefore, for example, even if user control data request 337 is processed by controller application 303 at step 338 to determine that no component data from motion sensor input component 110f is of interest to media application 305 and an I/O control request 339 is consequentially generated and provided to input components 110 for turning off or at least throttling down motion sensor input component 110f (e.g., at steps 340 and 341), certain component data 343 collected by controller application 103 at step 342 may still include component data from motion sensor input component 110f (e.g., because motion sensor input component 110f generated that data before being shut down or because motion sensor input component 110f was only throttled down but still happened to generate that data 343 for the current cycle, etc.), but controller application 103 may still be operative to not include such collected data 343 from motion sensor input component 110f in user control data 347 due to user control data request 337 being processed by controller application 303 at step 338 and/or step 344 to indicate that such data from motion sensor input component 110f is not of interest to media application 305. Therefore, despite whatever component data 343 may be currently collected or otherwise available to controller application 103 at step 342, controller application 103 may be operative to generate and transmit user control data 347 that includes only component data 343 from the one or more components that have been indicated to be of interest to media device application 305 by user control data request 337. Controller application 103 may be operative to packetize the component data of interest into the fewest number of packets according to the communication protocol to be used (e.g., BTE for a wireless communications set-up 55 supporting the BTE protocol), such that the size of user control data 347 may be minimized and the latency of such communication may be minimized. That is, following an example where component data from each one of touchpad input component 110a and button components 110b-110e, but not component data from motion sensor input component 110f, have been indicated as of interest through processing of user control data request 337 (e.g., at step 338 and/or step 344), the total size of the one or more packets that may be required to communicate such desired component data for input components 110a-110e as user control data 347 at step 346 (e.g., 1 packet of a 20 byte packet size) may be less than the total size of the one or more packets that may be required to communicate component data for each one of input components 110a-110f as user control data 347 at step 346 (e.g., 2 packets each of a 20 byte packet size), despite component data for input component data 110f not being of interest. For example, component data from each one of input components 110a-110f may be unable to fit in a single data packet according to a BTE protocol and may require multiple packet transmissions, thereby incurring additional latency, which may be avoided if data from one or more of input components 110a-110f may be ignored when constructing new user control data for communication to media electronic device 300 (e.g., to reduce the number of packets required to communicate such data).

Such user control data 347 may be communicated from controller application 103 of user electronic device 100 to device application 303 of media electronic device 300 using any suitable protocol and may be a return via API-U. Device application 303 may be operative to receive and to process any user control data 347 from controller application 103 at step 348 for generating and making available media control data 351 to media application 305 at step 350 (e.g., via API-M), which may then be processed by media application 305 at step 352 for controlling playback of media application 305 (e.g., a video game application or any other suitable media construct), which may dictate the data presented by the system to the user (e.g., via output components 412, and/or 412a of system 1'). Media control data 351 may be an updated user device control status state, which may be updated based on received new user control data 347 and processing of step 348. Although not shown in FIG. 3C, it is to be understood that media control data that may be older than media control data 351 may be made accessible to media application 305 by device application 303 in response to receipt of media control data request 333 at step 332 (e.g., prior to, concurrently with, or after one or more of steps 334-348, but prior to step 350), where such older media control data may be made available to media application 305 prior to media control data 351 of step 350 but such older media control data may not include data for each user device component indicated in media control data request 333.

Therefore, device application 303 may be operative to analyze the information requested by a media control data request in order to generate and transmit a user control data request that may be utilized by user electronic device 100 to efficiently generate and communicate appropriate user control data to media electronic device 300. Device application 303 may be operative to access or otherwise take into account one or more characteristics of user electronic device 100 (e.g., at step 334) when generating user control data requests such that the functionality of one or more user device components may be adjusted to increase efficiency of device 100 while still maintaining sufficient effectiveness with respect to generating timely user control data of interest to media application 305. Various factors may be considered when determining when/how to vary the functionality of one or more components of user electronic device 100 (e.g., at step 334 and/or at step 338), such as the remaining power supply of user electronic device 100, which may be communicated to application 303 from application 103 as a portion of user control data or otherwise, the power requirements and power drain of various user device components at different levels of use (e.g., at different output frequencies), the length of time it takes to ramp up or down and/or on or off various user device components, the length of time and/or number of cycles (e.g., number of media control data requests) since a previous request indicative of data from a particular user device input component, various heuristics, and the like, which may be leveraged for defining and/or dynamically adjusting various thresholds that may be considered when instructing user electronic device 100 to adjust one or more functionalities of one or more user device components. Process 330 may be operative to dynamically throttle the update rate of any input component (e.g., the update rate of motion sensor input component 110f) to match but not exceed the update rate of media application 305. As mentioned, motion sensor input component 110f may include multiple discrete motion sensors, each of which may be independently powered on/off or throttled in any suitable manner. Alternatively, all motion sensors of a collection of motions sensors provided by motion sensor input component 110f may be limited to collectively being powered on or off, yet component data 343 from each motion sensor may still be independently selectively used or not used in new user control data 347 (e.g., based on processing at step 338/344). For example, in some embodiments, device orientation motion sensor data may be included in new user control data 347 but not gravity motion sensor data or acceleration motion sensor data (e.g., through leveraging a core motion framework of device 100 and/or device 300). If a mode of media application 305 is detected to switch from an active game mode that may be actively requesting motion sensor component data from motion sensor input component 110f to a pause mode that may only be interested in mechanical button data from input component 110b, process 330 may be operative to immediately turn off or in some way throttle down the functionality of motion sensor input component 110f and not include any motion sensor data in new user control data, but one or more of device application 303 and/or controller application 103 may store a previous user device component applicability mode information setting that may be associated with the active game mode prior to the transitioning to the pause mode, such that once the mode of media application 305 is detected to switch back from the pause mode to the active game mode, that previous user device component applicability mode information setting may be accessed and utilized to immediately restore the previous functionality of motion sensor input component 110f that had existed prior to the mode change.

Device application 303 (e.g., a game controller framework) may monitor the request rate of certain user device component data of certain user device components (e.g., motion sensor data of motion sensor input component 110f) made by media application 305 and may be operative to adjust the frequency of such user device components to match, thereby, for example, dynamically optimizing the battery life and user input responsiveness. Therefore, process 330 may be operative to control whether any suitable user device component is on or off, to control an update frequency or any other suitable functional characteristic of any suitable user device component, and/or control the amount and type of user device component data that may be shared, based on analysis of current and/or previous media control data requests, game states, any incremental elements (e.g., clocks, counters, etc.), component status, and/or the like, for improving the efficiency with which any suitable user device components may be leveraged for providing effective user control data for use by a media application. Developers of media application 305 may not be operative to communicate directly with controller application 103, let alone be operative to know the types of input components of device 100, let alone the status of such input components. Instead, device application 303 may be provided as an intermediary that may communicate with both media application 305 (e.g., via a first API-M) and with controller application 103 (e.g., via a second API-U, which may be different than API-M), whereby media application 305 may be developed and/or may run agnostic to the limitations of one or more user electronic devices 100/200 that may be communicatively coupled to device application 303 for controlling media application 305. Similarly, controller application 103 may be developed and/or may run agnostic to the limitations or requirements of media application 305. Media application 305 may therefore have a single origin API (e.g., API-M with device application 303), which may be publicly visible, but media application 305 may be prevented from interacting with the HID or core motion framework of device 300 and/or of device 100, while potentially being a system level provider of both.

It is to be understood that the steps shown in process 330 of FIG. 3C are merely illustrative and that existing steps may be modified or omitted, additional steps may be added, and the order of certain steps may be altered.

Description of FIG. 3A

FIG. 3A is a flowchart of an illustrative process 330a for enabling interaction between a media application processing module running a user interface media application, a device application processing module running a device application on a media electronic device, and a controller application processing module running a controller application on a user electronic device that is remote from the media electronic device. At step 361 of process 330a, the device application processing module may receive a media control data request from the media application processing module (e.g., as described with respect to step 332 of process 330). At step 362 of process 330a, the device application processing module may process the received media control data request (e.g., as described with respect to step 334 of process 330). At step 363 of process 330a, the device application processing module may generate a user control data request based on the processed media control data request (e.g., as described with respect to steps 334 and 336 of process 330). At step 364 of process 330a, the device application processing module may transmit the user control data request to the controller application processing module (e.g., as described with respect to step 336 of process 330). The generating of step 363 of process 330a may include the device application processing module generating the user control data request to include an instruction operative to instruct the controller application processing module to adjust a functionality of an input component of the user electronic device in a particular manner based on the processed media control data request (e.g., as described with respect to application 103 processing user control data request 337 of process 330 to adjust the functionality of at least one input component 110 of device 100).

It is to be understood that the steps shown in process 330a of FIG. 3A are merely illustrative and that existing steps may be modified or omitted, additional steps may be added, and the order of certain steps may be altered.

Description of FIG. 3B

FIG. 3B is a flowchart of an illustrative process 330b for enabling interaction between a media electronic device and a user electronic device that includes a plurality of input components. At step 371 of process 330b, the media electronic device may receive a media control data request from a user interface application (e.g., as described with respect to step 332 of process 330). At step 372 of process 330b, the media electronic device may process the received media control data request (e.g., as described with respect to step 334 of process 330). At step 373 of process 330b, the media electronic device may identify a subset of input component types of a plurality of input component types based on the processed media control data request (e.g., as described with respect to step 334 of process 330). At step 374 of process 330b, the media electronic device may generate a user control data request based on the identified subset (e.g., as described with respect to steps 334 and 336 of process 330). At step 375 of process 330b, the media electronic device may transmit the user control data request to the user electronic device (e.g., as described with respect to step 336 of process 330). The generating of step 374 of process 330b may include generating the user control data request to include an instruction operative to instruct the user electronic device to share input component data only from each input component of a plurality of input components of the user electronic device that is associated with any input component type of the identified subset (e.g., as described with respect to application 103 processing user control data request 337 of process 330 to share input component data (e.g., at step 346) only from each input component 110 of device 100 that may be identified by user control data request 337).

It is to be understood that the steps shown in process 330b of FIG. 3B are merely illustrative and that existing steps may be modified or omitted, additional steps may be added, and the order of certain steps may be altered.

Figure 4A:
Figure 4B:
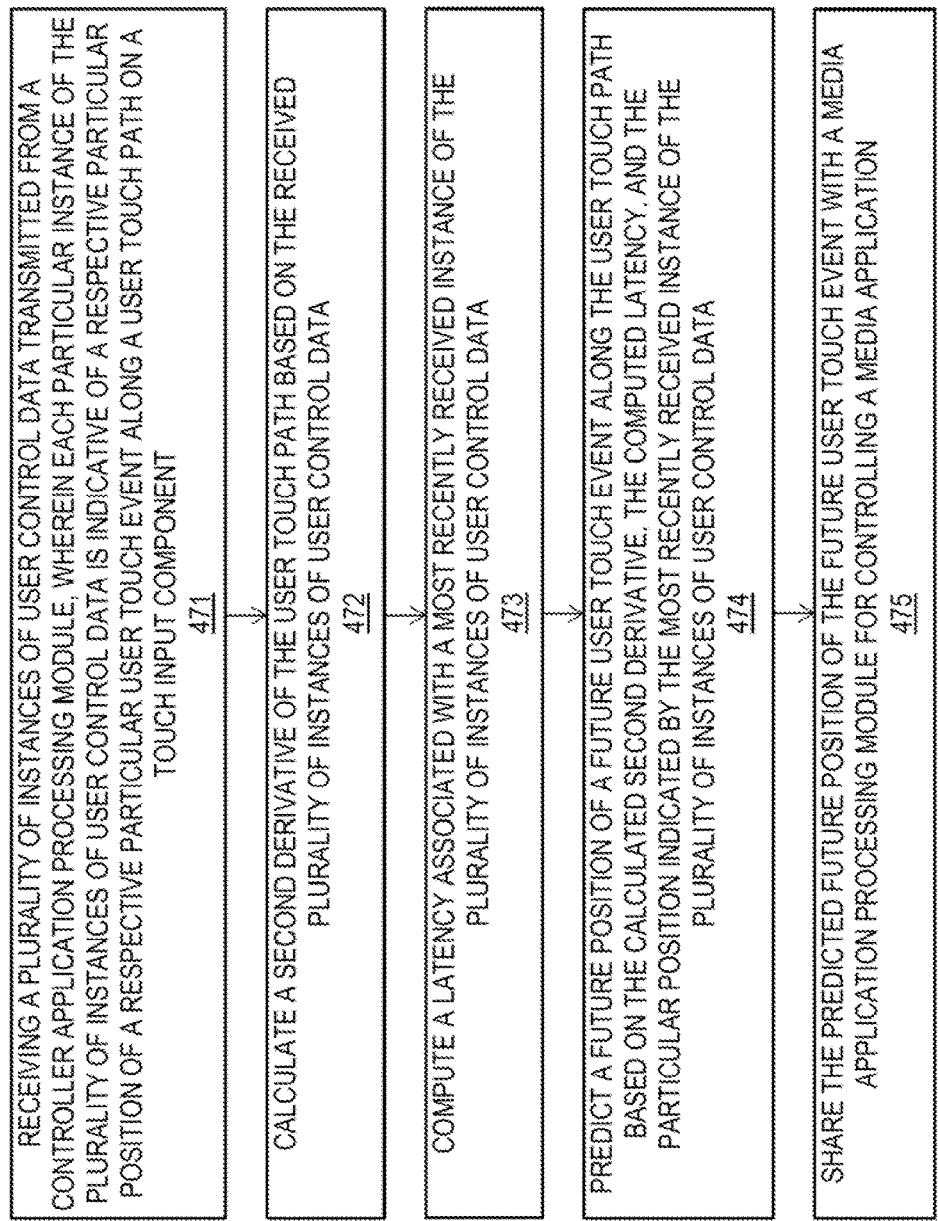
Figure 4D:
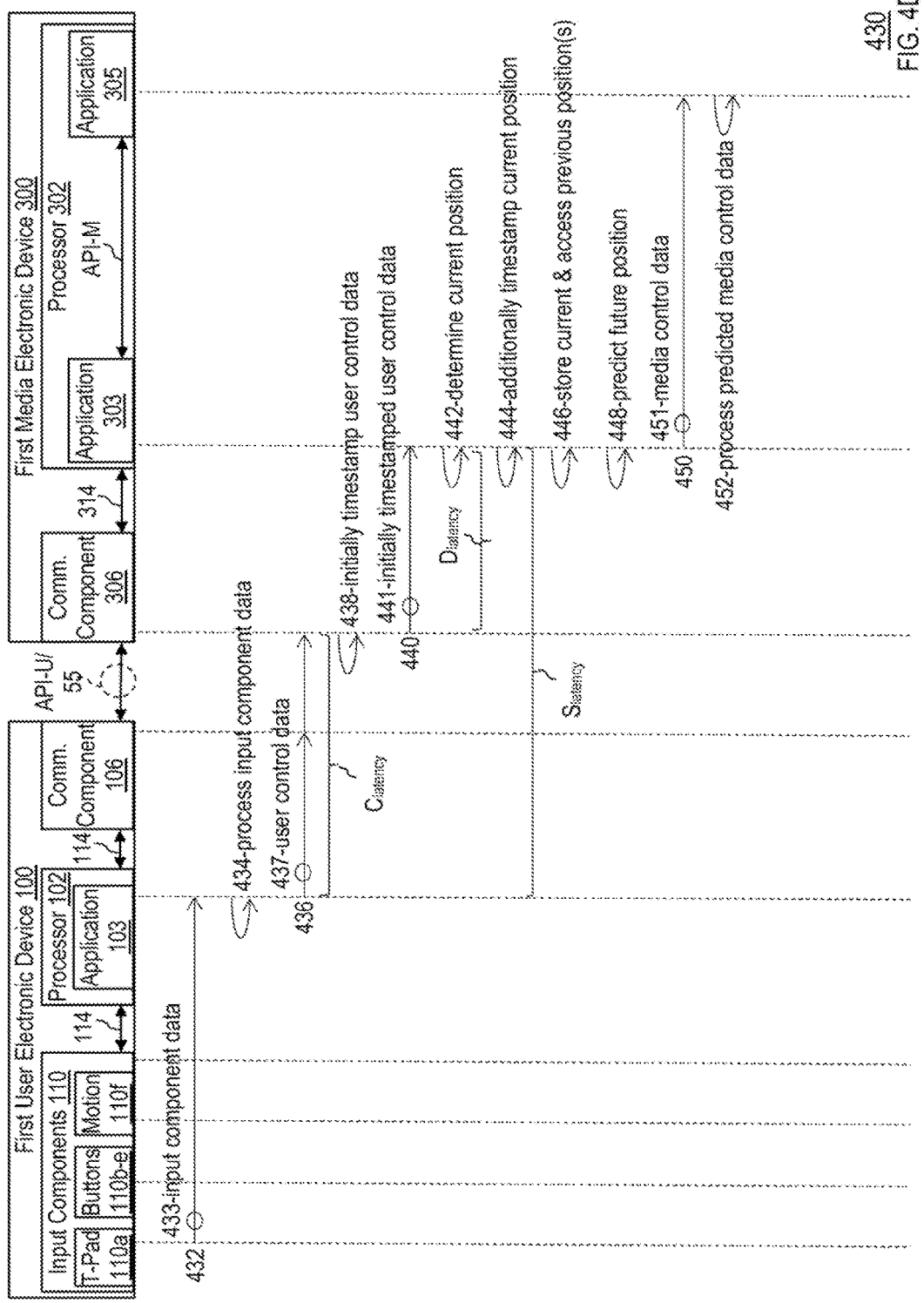

Description of FIG. 4D and FIG. 7A

FIG. 4D is a flowchart of an illustrative process 430 for reducing perceived latency of and/or input response time to control data that may be provided by a user electronic device for a media application running on a media electronic device. Process 430 is shown being implemented by first user electronic device 100 (e.g., one or more input components 110 (e.g., touchpad input component 110a, one or more button input components 110b-110e, and/or one or more motion sensors of motion sensor input component 110f), controller application 103 running on processor 102, communications component 106, and bus 114), first media electronic device 300 (e.g., device application 303 and media application 305 running on processor 302, communications component 306, and bus 314), and communications set-up 55. However, it is to be understood that process 430 may be implemented using any other suitable components or subsystems.

Process 430 may reduce perceived latency of and/or input response time to control data that may be provided by user electronic device 100 as a remote controller for media application 305 running on media electronic device 300. Current user control data may be received from a controller application of a user electronic device by a media electronic device via a communications set-up, whereby such received current user control data may be utilized by a device application of the media electronic device to predict future user control data for generating corresponding predicted media control data for use by a media application (e.g., to control playback of the media application (e.g., to control game play of a video game media application)). For example, as described above with respect to FIG. 3C, a user may be holding or otherwise proximate user electronic device 100 for manipulating one or more input components 110, whereby data indicative of such manipulation (or lack thereof) may be collected by processor 102 using application 103 (e.g., a controller application) and may be communicated by user electronic device 100 as user control data via communications component 106 and communications set-up 55 to communications component 306 of media electronic device 300, whereby such user control data may be analyzed by processor 302 using device application 303 (e.g., a game controller framework) to generate game control data or media control data, and whereby such media control data may be accessed by game or media application 305 for controlling playback of game or media application 305 (e.g., a video game), which may then be presented to the user via any suitable output component (e.g., an output component 312 of media electronic device 300 and/or output component 412 of media electronic device 400, as described above).

At step 432 of process 430, controller application 103 of user electronic device 100 may be operative to collect input component data 433 from any or all input components 110 that may be generating output data and/or to collect any other suitable data from any other suitable components (e.g., the status of output components of device 100 for sharing as status information with device 300). Controller application 103 may be operative to collect such available input component data 433 at step 432 and then to process such collected component data at step 434 of process 430 in conjunction with any suitable information from any suitable user control data request (e.g., user control data request 337 of process 330) to generate user control data 437 for transmission to media electronic device 300 (e.g., to device application 303) at step 436 of process 430. As shown in FIG. 4D, for a particular example described herein with respect to process 430, input component data 433 that may be collected at step 432 may include output data from touchpad input component 110a, where such data may include any suitable touch position data that may be indicative of a position of a current user touch point or current user touch event on a touch surface of input component 110a (e.g., on surface 110as of FIGS. 7A-7F that may be provided in an X-Y plane), and where such touch position input component data 433 may also be included in user control data 437 (e.g., as a touch position user control data portion of user control data 437). In some embodiments, such input component data 433 may also include any suitable touch force data that may be indicative of a force or pressure (e.g., from motion sensor input component 110f or a force sensing portion of input component 110a itself) that may be associated with such a current user touch event (e.g., a force applied by the user touch event onto surface 110as (e.g., along a Z-axis)), where such touch force input component data 433 may also be included in user control data 437 (e.g., as a touch force user control data portion of user control data 437).

As shown in FIG. 7A, for example, touch surface 110as of touchpad input component 110a may be provided as a planar surface that may extend in an X-Y plane, although it is to be understood that touch surface 110as may be curved or any other suitable shape. Additionally or alternatively, as shown in FIG. 7A, for example, touch surface 110as of touchpad input component 110a may be represented by a Cartesian coordinate system defined by X-axis and Y-axis coordinate axes. While such a coordinate system of touch surface 110as may be shown in FIG. 7A to extend from a −1 to 1 range along each one of the X-axis and the Y-axis, touch surface 110as may be any suitable shape (e.g., square, rectangular, circular, etc.) and any suitable size (e.g., the units of length of the coordinate system may be associated with any suitable physical length with respect to surface 110as). It is to be understood that such a coordinate system may be a useful mechanism with which to discuss the handling by system 1' of certain user touch events on a touch surface of input component 110a but may not limit the implementation of system 1' or any associated processes thereof in any way. In some embodiments, controller application 103 may be operative to process any suitable touch position data 433 from touchpad input component 110a and normalize such data into any suitable pair of numerical coordinates between −1 and 1 (e.g., ([−1 to 1],[−1 to 1])) as a touch position that may be represented by at least a touch position user control data portion of user control data 437.

Such user control data 437 may be communicated from controller application 103 of user electronic device 100 to device application 303 of media electronic device 300 using any suitable protocol and may be a return via API-U. Device application 303 may be operative to receive and to process (e.g., at one or more of steps 442-448 of process 430) any user control data from controller application 103 for generating and making available media control data 451 to media application 305 at step 450 (e.g., via API-M), which may then be processed by media application 305 at step 452 for controlling playback of media application 305 (e.g., a video game application or any other suitable media construct), which may dictate the data presented by the system to the user (e.g., via output components 412, and/or 412a of system 1'). Media control data 451 may be an updated user device control status state, which may be updated based on received new user control data 437 and processing of steps 438-448.

Process 430 may be operative to reduce perceived latency and/or improve response time of user control data 437 for controlling media application 305. In some embodiments, device application 303 may be operative to process most recently received or new or current user control data 437 so as to predict future user control data that may be utilized for generating corresponding predicted media control data for use by a media application (e.g., to control playback of the media application (e.g., to control game play of a video game media application)). For example, device application 303 may be operative not only to process at least a touch position user control data portion of current user control data 437 to determine the current user touch position (e.g., at step 442, which may be the same position as reported by device 100 or which may be an adjusted position adjusted in some way by any suitable processing of device application 303 (e.g., as described below in more detail with respect to one or more of FIGS. 5A-5D and 7B-7F)) but also to utilize that determined current user touch position for predicting a future user touch position (e.g., at step 448), whereby device application 303 may then utilize such a predicted future user touch position (e.g., rather than such a determined current user touch position) to generate corresponding media control data 451 (e.g., at step 450) for use by media application 305 (e.g., to control playback of media application 305 based on the predicted future touch position rather than the determined current user touch position).

Such prediction of a future user touch position may be accomplished using any suitable processing. For example, based on analysis of the most recent or current user touch position in conjunction with any suitable data indicative of one or more previous user touch positions (e.g., as determined by device application 303 (e.g., based on user control data 437)), at least a portion of a user's touch path may be determined. A second derivative of such a touch path (e.g., an acceleration vector of the user's touch path) may be leveraged in combination with a calculated latency of data between controller application 103 and device application 303 to determine a distance vector of the touch path, and such a distance vector may be combined with the current user touch position to predict a future touch position (e.g., at step 448) for use in generating new media control data (e.g., at step 450).

For each determination of a current user touch position (e.g., based on analysis of new user control data 437), device application 303 may be operative to calculate a system latency $S_{latency}$ of that process (e.g., the length of time for new user control data 437 to be communicated to device application 303 and then utilized by device application 303 to determine the current user touch position), which may then be leveraged to predict the future user touch position. As shown in FIG. 4D, for example, $S_{latency}$ may be indicative of the time it takes for particular user control data 437 to be transmitted from user electronic device 100, received by media electronic device 300, and processed such that a current user touch position may be determined based on that processed user control data 437. In some embodiments, $S_{latency}$ may include a first latency component $C_{latency}$ that may be indicative of the time it takes for particular user control data 437 as transmitted from user electronic device 100 to be initially received by media electronic device 300. Such a "communication latency component" $C_{latency}$ may be at least partially limited by a communication protocol being utilized for such a communication (e.g., a BTE communication protocol may require 15 milliseconds to communicate user control data 437 from device 100 to device 300). The duration of time for $C_{latency}$ may therefore be a fixed system limitation, such that the value of $C_{latency}$ may be a stored value accessible by device application 303 (e.g., via memory 304).

Additionally, $S_{latency}$ may include a second latency component $D_{latency}$ that may be indicative of the time it takes for particular user control data 437 as initially received by media electronic device 300 to be processed by device application 303 such that a current user touch position may be determined based on that processed user control data 437 (e.g., at step 442). Such a "device latency component" $D_{latency}$ may be determined by calculating the difference between a first instance in time $T_{receive}$ when particular user control data 437 is first received at media electronic device 300 and a second instance in time $T_{process}$ when the current user touch position has been determined based on processing of that particular user control data 437 (e.g., at any suitable instance just before a future user touch position is to be predicted at step 448). First instance $T_{receive}$ may be determined by any suitable component of device 300, such as by a kernel (e.g., using ktrace or dtrace) that may process and propagate data packets received from communications component 106 of device 100 via communications set-up 55 at communications component 306 to one or more suitable UARTs, such as a BTE UART for BTE communications, where such communications may be transformed by the UARTs into one or more events of a HID of device 300, and where such HID events may be propagated to device application 303 (e.g., a game controller framework) for use in determining the current user position (e.g., at step 442). For example, at step 438 of process 430, a kernel (e.g., using ktrace or dtrace) or any other suitable component or mechanism or module of media electronic device 300 may generate a first initial timestamp for most recently received user control data 437 at first instance $T_{receive}$ (e.g., a current value of any suitable clock accessible to device 300) and may then pass that initially timestamped user control data 441 to device application 303 at step 440 of process 430. Such a first initial timestamp may be embedded or otherwise associated with user control data 437 such that initially timestamped user control data 441 (e.g., a HID report) may be received and utilized by device application 303 not only for processing certain data of user control data 437 (e.g., a touch position user control data portion and any potential touch force user control data portion of user control data 437) but also for leveraging the value of that first initial timestamp (e.g., first instance in time $T_{receive}$).

Second instance $T_{process}$ may be determined by any suitable component of device 300, such as by device application 303, at any suitable instance after first instance $T_{receive}$, such as after the current user touch position has been determined at step 442 and/or just before a future user touch position is to be predicted at step 448 (e.g., any suitable time after step 438 and before the completion of step 448). For example, as shown in FIG. 4D, process 430 may include processing initially timestamped user control data 441 with device application 303 at step 442 to determine the current user touch position, and then, at step 444, device application 303 may be operative to generate a second additional timestamp for most recently received initially timestamped user control data 441 at second instance $T_{process}$ (e.g., a current value of any suitable clock accessible to device 300), after which device application 303 may be operative to then store that additionally timestamped user control data with determined current position data at step 446. Such a second additional initial timestamp may be embedded or otherwise associated with user control data 437 and/or the determined current user touch position as well as with the first initial timestamp, and such data may then be stored for later use (e.g., not only for the immediately following iteration of step 448 but for any suitable number of future iterations of step 448 (e.g., after even more recent user control data 437 has been received by device application 303). For example, not only may device application 303 be operative to store the most recently determined current user touch position along with its associated first and second timestamps at step 446, but device application 303 may also be operative to access at step 446 any number of earlier stored versions of such data that may be associated with earlier prior determined user touch positions and/or any other suitable data that may have been computed during earlier iterations of prediction step 448. Second instance $T_{process}$ may be the moment when device application 303 has finished processing all new user control data (e.g., motion sensor data, mechanical button data, touchpad data, etc.) and is ready to share such processed data to media application 305.

Therefore, a most recently determined current user touch position may be associated with a value of a first initial timestamp (e.g., first instance in time $T_{receive}$) and a value of a second additional timestamp (e.g., second instance in time $T_{process}$), such that the value of $D_{latency}$ for that determined current user touch position may be calculated (e.g., by subtracting the value of $T_{receive}$ from the value of $T_{process}$), and such that the value of $S_{latency}$ for that determined current user touch position may be calculated (e.g., by adding the value of that calculated $D_{latency}$ to the value of $C_{latency}$). Such a value of $S_{latency}$ may be calculated for each particular determined current user touch position of step 442 (e.g., each iteration of steps 438-448 may determine a new particular value of $S_{latency}$ that may be particular to the most recently determined current user touch position of step 442, as the value of $S_{latency}$ may vary based on the specific processing time required to determine that particular current user touch position). As described below, such a calculated value of $S_{latency}$ for one or more particular determined user touch positions may be leveraged by device application 303 at step 448 for predicting a future user touch position.

Such prediction of a future user touch position may be accomplished using any suitable processing. The following discussion of a particular prediction processing technique may make reference to particular user touch positions, that may be illustrated by FIG. 7A. As shown by situation illustration 700a of FIG. 7A, a user of device 100 may have provided a number of user touches U1-U4 at the following user touch positions, which may be associated with the following timestamp data (e.g., as determined at multiple iterations of steps 432-442), summarized by the below table:

TABLE 1

(FIG. 7A)

| User Touch | Touch Position | Initial Timestamp | Additional Timestamp | Current System Latency |
|---|---|---|---|---|
| U1 | P1 (−.8, −.8) | Tr1 | Tp1 | L1 (Tp1 − Tr1 + $C_{latency}$) |

TABLE 1-continued (FIG. 7A)

| User Touch | Touch Position | Initial Timestamp | Additional Timestamp | Current System Latency |
|---|---|---|---|---|
| U2 | P2 (−.6, −.6) | Tr2 | Tp2 | L2 (Tp2 − Tr2 + $C_{latency}$) |
| U3 | P3 (−.2, −.4) | Tr3 | Tp3 | L3 (Tp3 − Tr3 + $C_{latency}$) |
| U4 | P4 (0, −.2) | Tr4 | Tp4 | L4 (Tp4 − Tr4 + $C_{latency}$) | where, for first user control data 437 associated with first user touch event U1 at touch component 110a, associated initial timestamp Tr1 may be determined at a first iteration of step 438, touch position P1 may be determined at a first iteration of step 442, and associated additional timestamp Tp1 may be determined at a first iteration of step 444 for calculating latency L1. Similarly, for second user control data 437 associated with second user touch event U1 at touch component 110a, associated initial timestamp Tr2 may be determined at a second iteration of step 438, touch position P2 may be determined at a second iteration of step 442, and associated additional timestamp Tp2 may be determined at a second iteration of step 444 for calculating latency L2, while, for third user control data 437 associated with third user touch event U1 at touch component 110a, associated initial timestamp Tr3 may be determined at a third iteration of step 438, touch position P3 may be determined at a third iteration of step 442, and associated additional timestamp Tp2 may be determined at a third iteration of step 444 for calculating latency L3.

Following the above example, where first user touch event U1 may be an initial touchdown event with no preceding touch events in a single user touch path PTH along surface 110as, there may be no previous touch event data for device application 303 to leverage with respect to predicting a future touch position, so process 430 may be operative to bypass step 448 such that first media control data 451 may be generated based on actual current touch position P1 as determined at step 442 (e.g., such that a first media position M1 received by media application 305 via media control data 451 at a first iteration of step 450 may be the same as position P1 of touch event U1, as shown in FIG. 7A). Similarly, in such an example, once second user control data 437 associated with second user touch event U2 has been processed by device application 303, despite there now being a single set of previous touch event data (e.g., with respect to first user touch event U1) that may be available to device application 303, process 430 may be operative to bypass step 448 once again such that second media control data 451 may be generated based on actual current touch position P2 as determined at step 442 (e.g., such that a second media position M2 received by media application 305 via media control data 451 at a second iteration of step 450 may be the same as position P2 of touch event U2, as shown in FIG. 7A). However, after first and second iterations of steps 436-450, when third user control data 437 associated with third user touch event U3 may be received by device 300, process 430 may be operative to access the data of the above table associated with both first user touch event U1 and second user touch event U2 as well as such data associated with recent third user touch event U3 (e.g., at a third iteration of step 446), such that a future current position may be predicted at a third iteration of step 448 based on any suitable data associated with both first user touch event U1, second user touch event U2, and third user touch event U3. However, in some embodiments, prior to such a third iteration of step 448, it may first be determined that each one of first user touch event U1 and second user touch event U2 and third user touch event U3 is part of a single user touch path (e.g., that neither second user touch event U2 nor third user touch event U3 is an initial touch down event for a new user touch path). For example, based on the above-listed table data that may be accessible to device application 303 with respect to first user touch event U1, second user touch event U2, and third user touch event U3 (e.g., of a single user touch path) at a third iteration of step 448 (e.g., prior to any fourth user control data 437 associated with fourth user touch event U4 being generated by device 100, received by device 300, and/or processed by device application 303), the following calculations may be made by device application 303 for calculating a predicted future position, after which new media control data 451 may then be generated based on that new predicted future position rather than based on actual current touch position P3:

(1) a distance $D_{1-2}$ between touch position P1 and touch position P2 may be calculated (e.g., distance $D_{1-2}$=P2−P1);

(2) a distance $D_{2-3}$ between touch position P2 and touch position P3 may be calculated (e.g., distance $D_{2-3}$=P3−P2);

(3) a current velocity vector $V_{current}$ of the touch path PTH may be calculated (e.g., current velocity vector $V_{current}$=distance $D_{2-3}/\Delta$Time=(P3−P2)/(Tp3−Tp2));

(4) a previous velocity vector $V_{previous}$ of the touch path PTH may be calculated (e.g., previous velocity vector $V_{previous}$=distance $D_{1-2}/\Delta$Time=(P2−P1)/(Tp2−Tp1));

(5) a current acceleration vector $A_{current}$ of the touch path PTH may be calculated (e.g., current acceleration vector $A_{current}=\Delta$Velocity/$\Delta$Time=($V_{current}-V_{previous}$)/(Tp3−Tp2)=[[(P3−P2)/(Tp3−Tp2)]−[(P2−P1)/(Tp2−Tp1))]/(Tp3−Tp2)]);

(6) a predicted future distance vector $D_{future}$ of the touch path PTH may be calculated by assuming that a future acceleration vector will be the same as the current acceleration vector $A_{current}$ and by assuming that a future $\Delta$Time will be the same as the current latency L3 (e.g., predicted future distance vector $D_{future}$=current acceleration vector $A_{current}*L3^2$=[[(P3−P2)/(Tp3−Tp2)]−[(P2−P1)/(Tp2−Tp1))]/(Tp3−Tp2)]*(Tp3−Tr3+$C_{latency})^2$); and/or (7) a predicted future touch position $P_{future}$ of the touch path PTH may be calculated (e.g., predicted future touch position $P_{future}$=determined current touch position+predicted future distance vector $D_{future}$=P3+[[(P3−P2)/(Tp3−Tp2)]−[(P2−P1)/(Tp2−Tp1))]/(Tp3−Tp2)]*(Tp3−Tr3+$C_{latency})^2$).

Therefore, based on the above-listed table data that may be accessible to device application 303 with respect to first user touch event U1, second user touch event U2, and third user touch event U3 at a third iteration of step 448 (e.g., prior to any fourth user control data 437 associated with fourth user touch event U4 being generated by device 100, received by device 300, and/or processed by device application 303), device application 303 may be operative to calculate predicted future touch position $P_{future}$ (e.g., P3+[[(P3−P2)/(Tp3−Tp2)]−[(P2−P1)/(Tp2−Tp1))]/(Tp3−Tp2)]*(Tp3−Tr3+$C_{latency})^2$) at step 448, and may then be operative to generate media control data 451 at step 450 that may be indicative of that predicted future touch position $P_{future}$ rather than of actual current touch position P3 (e.g., such that a third media position M3 received by media application 305 via media control data 451 at a third iteration of step 450 may be a predicted future position that may or may not be the same as eventually discovered position P4 of touch event U4, as shown in FIG. 7A).

It is to be understood that the above-described calculations may be repeated for every new iteration of steps 436-452, such that each time new user touch event data has been determined by device application, a new future touch position may be predicted and leveraged by media application 305 (e.g., once the above-listed table data with respect to fourth user touch event U4 may be accessible to device application 303 after a fourth iteration of steps 436-446, a new future touch position may be predicted, such that a fourth media position M4 received by media application 305 via media control data 451 at a fourth iteration of step 450 may be based on such a predicted future position that may or may not be the same as an eventually discovered position of a fifth user touch event). In some embodiments, a predicted future distance vector $D_{future}$ of the touch path may be calculated by assuming that a future acceleration vector will be the same as any suitable average, running average, or moving average of any number of previous acceleration vectors and the current acceleration vector (e.g., if more than two previous data points are available, as may be accessed at step 446) rather than assuming that a future acceleration vector will be the same as the current acceleration vector $A_{current}$. Additionally or alternatively, a predicted future distance vector $D_{future}$ of the touch path may be calculated by assuming that a future ΔTime will be the same as any suitable average, running average, or moving average of any number of previous latencies (e.g., as may be accessed at step 446) and the current latency rather than assuming that a future ΔTime will be the same as the current latency L3. For example, after first, second, and third iterations of steps 436-450, when fourth user control data 437 associated with fourth user touch event U4 may be received by device 300, process 430 may be operative to access the data of the above table associated with first user touch event U1, second user touch event U2, and third user touch event U3, as well as such data associated with recent fourth user touch event U4 (e.g., at a fourth iteration of step 446), such that a future current position may be predicted at a fourth iteration of step 448 based on any suitable data associated with first user touch event U1, second user touch event U2, third user touch event U3, and fourth user touch event U4. For example, based on the above-listed table data that may be accessible to device application 303 with respect to first user touch event U1, second user touch event U2, third user touch event U3, and fourth user touch event U4 at a fourth iteration of step 448 (e.g., prior to any fifth user control data 437 associated with a fifth user touch event being generated by device 100, received by device 300, and/or processed by device application 303), the following calculations may be made by device application 303 for calculating a new predicted future position, after which new media control data 451 may then be generated based on that new predicted future position rather than based on actual current touch position P4:

(1) a distance $D_{1-2}$ between touch position P1 and touch position P2 may be calculated (e.g., distance $D_{1-2}$=P2−P1);

(2) a distance $D_{2-3}$ between touch position P2 and touch position P3 may be calculated (e.g., distance $D_{2-3}$=P3−P2);

(3) a distance $D_{3-4}$ between touch position P3 and touch position P4 may be calculated (e.g., distance $D_{3-4}$=P4−P3);

(4) a current velocity vector $V_{current}$ of the touch path PTH may be calculated (e.g., current velocity vector $V_{current}$=distance $D_{3-4}$/ΔTime=(P4−P3)/(Tp4−Tp3));

(5) a first previous velocity vector $V_{previous-1}$ of the touch path PTH may be calculated (e.g., first previous velocity vector $V_{previous-1}$=distance $D_{2-3}$/ΔTime=(P3−P2)/(Tp3−Tp2));

(6) a second previous velocity vector $V_{previous-2}$ of the touch path PTH may be calculated (e.g., second previous velocity vector $V_{previous-2}$=distance $D_{1-2}$/ΔTime=(P2−P1)/(Tp2−Tp1));

(7) a current acceleration vector $A_{current}$ of the touch path PTH may be calculated (e.g., current acceleration vector $A_{current}$=ΔVelocity/ΔTime=($V_{current}$−$V_{previous-1}$)/(Tp4−Tp3)=[[(P4−P3)/(Tp4−Tp3)]−[(P3−P2)/(Tp3−Tp2))]/(Tp4−Tp3)]);

(8) a previous acceleration vector $A_{previous}$ of the touch path PTH may be calculated (e.g., previous acceleration vector $A_{previous}$=ΔVelocity/ΔTime=($V_{previous-1}$−$V_{previous-2}$)/(Tp3−Tp2)=[[(P3−P2)/(Tp3−Tp2)]−[(P2−P1)/(Tp2−Tp1))]/(Tp3−Tp2)]);

(9) a predicted future distance vector $D_{future}$ of the touch path PTH may be calculated by assuming that a future acceleration vector will be the same as an average of the current acceleration vector $A_{current}$ and a previous acceleration vector $A_{previous}$, and by assuming that a future ΔTime will be the same as an average of the current latency L4 and any previous latencies L1-L3 (e.g., predicted future distance vector $D_{future}$=[(current acceleration vector $A_{current}$+previous acceleration vector $A_{previous}$)/2]*[(L4+L3+L2+L1)/4]$^2$); and/or

(10) a predicted future touch position $P_{future}$ of the touch path PTH may be calculated (e.g., predicted future touch position $P_{future}$=determined current touch position+predicted future distance vector $D_{future}$).

Therefore, based on the above-listed table data that may be accessible to device application 303 with respect to first user touch event U1, second user touch event U2, third user touch event U3, and fourth user touch event U4 at a fourth iteration of step 448 (e.g., prior to any fifth user control data 437 associated with a fourth user touch event being generated by device 100, received by device 300, and/or processed by device application 303), device application 303 may be operative to calculate predicted future touch position $P_{future}$ at step 448, and may then be operative to generate media control data 451 at step 450 that may be indicative of that predicted future touch position $P_{future}$ rather than of actual current touch position P4 (e.g., such that fourth media position M4 received by media application 305 via media control data 451 at a fourth iteration of step 450 may be a predicted future position that may or may not be the same as an eventually discovered fifth position of a fifth touch event).

Therefore, process 430 of FIG. 4D may be operative to enable device application 303 to determine an amount of delay (e.g., $S_{latency}$) in a packet pipe (e.g., a BTE-enabled communications path for user control data between controller application 103 and device application 303) and to predict where a future touch pad input along a partially known user touch path will be in a future distant from the present by that determined amount of delay, which may compensate for such delay and/or may enable media application 305 to respond to such a predicted future input for compensating for such delay. System latency (e.g., $S_{latency}$) may be continuously calculated (e.g., using ktrace and/or dtrace) at device 300 and a second derivative (e.g., acceleration vector) of a user's touch path may be calculated and analyzed with respect to a current system latency to predict where a user is likely to be touching touch input component 110a at a future instance that may be removed from the present instance by the current system latency, which may reduce perceived latency (e.g., by providing a best prediction of the next future user touch position to media application 305 rather than providing the determined current user touch position to media application, due to the fact that the "current user touch position" is known to include the current system latency). The above described prediction algorithm(s) for prediction step 448 of process 430 may therefore predict, based on what a user's recent movements have been, what the user's next movement likely will be (e.g., by projecting into future, which may have some error but is effective in overcoming a significant portion if not all system latency). Once a new current position may be determined (e.g., at a new iteration of step 442), rather than generating new media control data for media application 305 based on that new determined current position, device application 303 may then instead be operative to predict a next future position by adding a calculated predicted future distance vector $D_{future}$ to that new determined current position and then to generate new media control data 451 for media application 305 based on that predicted next future position, which, if correct, may remove the entire latency of the system. Such a look-ahead prediction may be a tradeoff between accuracy and time by always fast-forwarding to the future by making an educated guess based on all known previous user touch positions. In such embodiments, each new media control data provided to media application 305 may be a best guess, such that playback of media application 305 based on such new media control data may feel ultra-responsive, if not also ultra-accurate.

It is to be understood that the steps shown in process 430 of FIG. 4D are merely illustrative and that existing steps may be modified or omitted, additional steps may be added, and the order of certain steps may be altered.

FIG. 4A is a flowchart of an illustrative process 430a for utilizing data from a user electronic device at a media electronic device. At step 460 of process 430a, the media electronic device may receive first user control data generated by the user electronic device (e.g., at a first instance of step 438 of process 430, as described with respect to FIG. 4D). At step 461 of process 430a, the media electronic device may determine a first user touch position based on the received first user control data (e.g., at a first instance of step 442 of process 430, as described with respect to FIG. 4D). At step 462 of process 430a, after receiving the first user control data at step 460, the media electronic device may receive second user control data generated by the user electronic device (e.g., at a second instance of step 438 of process 430, as described with respect to FIG. 4D). At step 463 of process 430a, the media electronic device may determine a second user touch position based on the received second user control data (e.g., at a second instance of step 442 of process 430, as described with respect to FIG. 4D). At step 464 of process 430a, after receiving the second user control data at step 462, the media electronic device may receive third user control data generated by the user electronic device (e.g., at a third instance of step 438 of process 430, as described with respect to FIG. 4D). At step 465 of process 430a, the media electronic device may determine a third user touch position based on the received third user control data (e.g., at a third instance of step 442 of process 430, as described with respect to FIG. 4D). At step 466 of process 430a, the media electronic device may calculate a current user touch acceleration vector based on the first, second, and third user touch positions determined at steps 461, 463, and 465 (e.g., at a portion of an instance of step 448 of process 430, as described with respect to FIG. 4D). At step 467 of process 430a, after receiving the third user control data at step 464, the media electronic device may compute a current system latency (e.g., at a portion of an instance of step 448 of process 430, as described with respect to FIG. 4D). At step 468 of process 430a, the media electronic device may predict a future user touch distance vector based on the current user touch acceleration vector calculated at step 466 and the current system latency computed at step 467 (e.g., at a portion of an instance of step 448 of process 430, as described with respect to FIG. 4D). At step 469 of process 430a, the media electronic device may predict a future user touch position based on the future user touch distance vector predicted at step 468 and the third user touch position determined at step 465 (e.g., at a portion of an instance of step 448 of process 430, as described with respect to FIG. 4D).

It is to be understood that the steps shown in process 430a of FIG. 4A are merely illustrative and that existing steps may be modified or omitted, additional steps may be added, and the order of certain steps may be altered.

Description of FIG. 4B

FIG. 4B is a flowchart of an illustrative process 430b for enabling interaction between a media application processing module running a media application, a device application processing module running a device application, and a controller application processing module running a controller application on a controller electronic device that includes a touch input component. At step 471 of process 430b, the device application processing module may receive a plurality of instances of user control data transmitted from the controller application processing module, wherein each particular instance of the plurality of instances of user control data may be indicative of a respective particular position of a respective particular user touch event along a user touch path on the touch input component (e.g., at a plurality of instances of step 440 of process 430, as described with respect to FIG. 4D). At step 472 of process 430b, the device application processing module may calculate a second derivative of the user touch path based on the received plurality of instances of user control data (e.g., at a portion of an instance of step 448 of process 430, as described with respect to FIG. 4D). At step 473 of process 430b, the device application processing module may compute a latency associated with a most recently received instance of the plurality of instances of user control data (e.g., at a portion of an instance of step 448 of process 430, as described with respect to FIG. 4D). At step 474 of process 430b, the device application processing module may predict a future position of a future user touch event along the user touch path based on the second derivative calculated at step 472, the latency computed at step 473, and the particular position indicated by the most recently received instance (e.g., at an instance of step 438 of process 430, as described with respect to FIG. 4D) of the plurality of instances of user control data (e.g., at a portion of an instance of step 448 of process 430, as described with respect to FIG. 4D). At step 475 of process 430b, the device application processing module may share the future position of the future user touch event predicted at step 474 with the media application processing module for controlling the media application (e.g., at an instance of step 450 of process 430, as described with respect to FIG. 4D).

It is to be understood that the steps shown in process 430b of FIG. 4B are merely illustrative and that existing steps may be modified or omitted, additional steps may be added, and the order of certain steps may be altered.

Description of FIG. 4C

FIG. 4C is a flowchart of an illustrative process 430c for enabling interaction between a media electronic device and a user electronic device. At step 481 of process 430c, the media electronic device may serially receive from the user electronic device each instance of a plurality of instances of user control data (e.g., at a plurality of instances of step 440 of process 430, as described with respect to FIG. 4D). At step 482 of process 430c, the media electronic device may calculate a current acceleration vector based on the plurality of instances of user control data received at step 481 (e.g., at a portion of an instance of step 448 of process 430, as described with respect to FIG. 4D). At step 483 of process 430c, the media electronic device may compute a duration of time associated with a most recently received instance of the plurality of instances of user control data (e.g., at a portion of an instance of step 448 of process 430, as described with respect to FIG. 4D). At step 484 of process 430c, the media electronic device may predict a future distance vector based on the calculated current acceleration vector and the computed duration of time (e.g., at a portion of an instance of step 448 of process 430, as described with respect to FIG. 4D).

It is to be understood that the steps shown in process 430c of FIG. 4C are merely illustrative and that existing steps may be modified or omitted, additional steps may be added, and the order of certain steps may be altered.

Description of FIG. 5D and FIGS. 7B-7F

FIG. 5D is a flowchart of an illustrative process 500 for increasing the practicality and/or the accuracy of control data that may be provided by a user electronic device for a media application running on a media electronic device. Process 500 is shown being implemented by first user electronic device 100 (e.g., one or more input components 110 (e.g., touchpad input component 110a, one or more button input components 110b-110e, and/or one or more motion sensors of motion sensor input component 110f), controller application 103 running on processor 102, communications component 106, and bus 114), first media electronic device 300 (e.g., device application 303 and media application 305 running on processor 302, communications component 306, and bus 314), and communications set-up 55. However, it is to be understood that process 500 may be implemented using any other suitable components or subsystems.

Process 500 may increase the practicality and/or the accuracy of control data that may be provided by user electronic device 100 as a remote controller for media application 305 running on media electronic device 300. Current user control data may be received from a controller application of a user electronic device by a media electronic device via a communications set-up, whereby such received current user control data may be processed and utilized by a device application of the media electronic device to generate more practical user control data for generating corresponding practical media control data for use by a media application (e.g., to control playback of the media application (e.g., to control game play of a video game media application)). For example, as described above with respect to FIG. 3C, a user may be holding or otherwise proximate user electronic device 100 for manipulating one or more input components 110, whereby data indicative of such manipulation (or lack thereof) may be collected by processor 102 using application 103 (e.g., a controller application) and may be communicated by user electronic device 100 as user control data via communications component 106 and communications set-up 55 to communications component 306 of media electronic device 300, whereby such user control data may be analyzed by processor 302 using device application 303 (e.g., a game controller framework) to generate game control data or media control data, and whereby such media control data may be accessed by game or media application 305 for controlling playback of game or media application 305 (e.g., a video game), which may then be presented to the user via any suitable output component (e.g., an output component 312 of media electronic device 300 and/or output component 412 of media electronic device 400, as described above).

At step 502 of process 500, controller application 103 of user electronic device 100 may be operative to collect input component data 522 from any or all input components 110 that may be generating output data and/or to collect any other suitable data from any other suitable components (e.g., the status of output components of device 100 for sharing as status information with device 300). Controller application 103 may be operative to collect such available input component data 522 at step 502 and then to process such collected component data at step 504 of process 500 in conjunction with any suitable information from any suitable user control data request (e.g., user control data request 337 of process 330) to generate user control data 526 for transmission to media electronic device 300 (e.g., to device application 303) at step 506 of process 500. As shown in FIG. 5D, for a particular example described herein with respect to process 500, input component data 522 that may be collected at step 502 may include output data from touchpad input component 110a, where such data may include any suitable touch position data that may be indicative of a position of a current user touch event on a touch surface of input component 110a (e.g., on surface 110as of FIGS. 7A-7F that may be provided or at least conceptualized in an X-Y plane), and where such touch position input component data 522 may also be included in user control data 526 (e.g., as a touch position user control data portion of user control data 526). In some embodiments, such input component data 522 may also include any suitable touch force data that may be indicative of a force or pressure (e.g., from motion sensor input component 110f or a force sensing portion of input component 110a itself) that may be associated with such a current user touch event (e.g., a force applied by the user touch event onto surface 110as (e.g., along a Z-axis)), where such touch force input component data 522 may also be included in user control data 526 (e.g., as a touch force user control data portion of user control data 526).

As shown in FIGS. 7B-7F, for example, and as described above with respect to FIG. 7A, touch surface 110as of touchpad input component 110a may be provided as a planar surface that may extend in an X-Y plane, although it is to be understood that touch surface 110as may be curved or any other suitable shape. Additionally or alternatively, as shown in FIGS. 7B-7F, for example, touch surface 110as of touchpad input component 110a may be represented by a Cartesian coordinate system defined by X-axis and Y-axis coordinate axes. While such a coordinate system of touch surface 110as may be shown in FIGS. 7B-7F to extend from a −1 to 1 range along each one of the X-axis and the Y-axis, touch surface 110*as* may be any suitable shape (e.g., square, rectangular, circular, etc.) and any suitable size (e.g., the units of length of the coordinate system may be associated with any suitable physical length with respect to surface 110*as*). It is to be understood that such a coordinate system may be a useful mechanism with which to discuss the handling by system 1' of certain user touch events on a touch surface of input component 110*a* but may not limit the implementation of system 1' or any associated processes thereof in any way. In some embodiments, controller application 103 may be operative to process any suitable touch position data 522 from touchpad input component 110*a* and normalize such data into any suitable pair of numerical coordinates between −1 and 1 (e.g., ([−1 to 1], [−1 to 1])) as a touch position that may be represented by at least a touch position user control data portion of user control data 526.

Such user control data 526 may be communicated from controller application 103 of user electronic device 100 to device application 303 of media electronic device 300 using any suitable protocol and may be a return via API-U. Device application 303 may be operative to receive and to process (e.g., at one or more of steps 508-512 of process 500) any user control data 526 from controller application 103 for generating and making available media control data 528 to media application 305 at step 514 (e.g., via API-M), which may then be processed by media application 305 at step 516 for controlling playback of media application 305 (e.g., a video game application or any other suitable media construct), which may dictate the data presented by the system to the user (e.g., via output components 412, and/or 412*a* of system 1'). Media control data 528 may be an updated user device control status state, which may be updated based on received new user control data 526 and processing of steps 508-512.

It is to be understood that the steps shown in process 500 of FIG. 5D are merely illustrative and that existing steps may be modified or omitted, additional steps may be added, and the order of certain steps may be altered.

Process 500 may be operative to increase the practicality and/or the accuracy of user control data 526 for controlling media application 305 in any suitable situation. However, at least certain embodiments of process 500 may be especially useful in situations where system 1' may be operative to enable touch input component 110*a* for use as a directional controller, such as a directional pad ("D-pad") or control pad (e.g., D-pad input component 210*a*-210*d* of user electronic device 200) or thumbstick or control stick (e.g., thumbstick 210*m* and/or thumbstick 210*n* of user electronic device 200). Conventional directional controllers, such as D-pad input component 210*a*-210*d*, thumbstick 210*m*, and/or thumbstick 210*m* of user electronic device 200, may often be configured to naturally rest in a default "center" position, whereby no input component data or input component data indicative of an origin position (e.g., (0,0)) may be generated unless a user manipulates such a directional controller away from its default position. Moreover, such conventional directional controllers often include mechanical features that are operative to physically guide a user (e.g., a user's fingertip) to initially interact the directional controller at its default position (e.g., without the user having to look at the controller). However, it may be difficult for a user of first user electronic device 100 to accurately provide an initial touch event at an exact origin position (e.g., at (0,0)) on touch surface 110*as* of touch input component 110*a*, so as to mimic a user's initial interaction with a conventional directional controller at its default position (e.g., because touch surface 110*as* may not include any physical or visual features for enabling a user to accurately interact with such an exact origin position). Additionally or alternatively, conventional directional controllers may be operative to easily enable a user to manipulate the directional controller for generating input component data indicative of a desired particular control direction (e.g., up, down, left, or right) through discrete directional features of the directional controller. However, it may be difficult for a user of first user electronic device 100 to accurately provide a series of touch events along touch surface 110*as* of touch input component 110*a* for providing a perfectly linear single user touch path PTH in a desired particular control direction (e.g., up, down, left, or right) so as to mimic a user's specific directional manipulation of a conventional directional controller (e.g., because touch surface 110*as* may not include any physical or visual features for enabling a user to accurately interact in a perfectly linear fashion (e.g., due to a user's fingertip moving on a pivot of the finger's joint)). Therefore, in some embodiments, device application 303 may be operative to process most recently received or new or current user control data 526 to determine an actual current position of a user touch event and to selectively adjust that determined actual current position to a more practical current position that may be utilized for generating corresponding practical media control data for use by a media application (e.g., to control playback of the media application (e.g., to control game play of a video game media application)), such that user control data 526 based on input component data 522 from touch input component 110*a* may be more accurately used as a directional controller. For example, device application 303 may be operative not only to process at least a touch position user control data portion of current user control data 526 to determine the current actual user touch position (e.g., at step 508, which may be the same as or substantially related to the position as reported by device 100) but also to utilize that determined actual current user touch position for selectively adjusting that determined actual current user touch position to determine a more practical or reportable current user touch position (e.g., at step 512), whereby device application 303 may then utilize such a determined reportable current user touch position (e.g., rather than such a determined actual current user touch position) to generate corresponding media control data 528 (e.g., at step 514) for use by media application 305 (e.g., to control playback of media application 305 based on the determined reportable current user touch position rather than the determined actual current user touch position).

Such determination of a reportable current user touch position may be accomplished using any suitable processing. For example, based on analysis (e.g., at step 512) of the most recent or new current actual user touch position (e.g., as may be determined at step 508) in conjunction with any suitable data indicative of one or more previous user touch positions (e.g., as may have been previously determined by device application 303 and later accessed at a current iteration of step 510) and/or in conjunction with any suitable thresholds or characteristics related to the configuration of touch input component 110*a* and/or of any other suitable component of the system, at least a portion of data indicative of a user's actual touch path may be adjusted by device application 303 prior to use by media application 305. In some embodiments, processing step 512 of process 500 may be at least partially utilized by device application 303 for more practically handling initial and subsequent user touch events on surface 110*as* of touchpad input component 110*a* for use as an effective directional controller for media application 305, such as for more accurately handling initial user touch events with respect to a potentially intended default center position, and/or for more accurately enabling full saturation of a particular directional control, and/or for more accurately enabling linear control.

Description of FIG. 5A and FIGS. 7B-7D

Figure 5A:
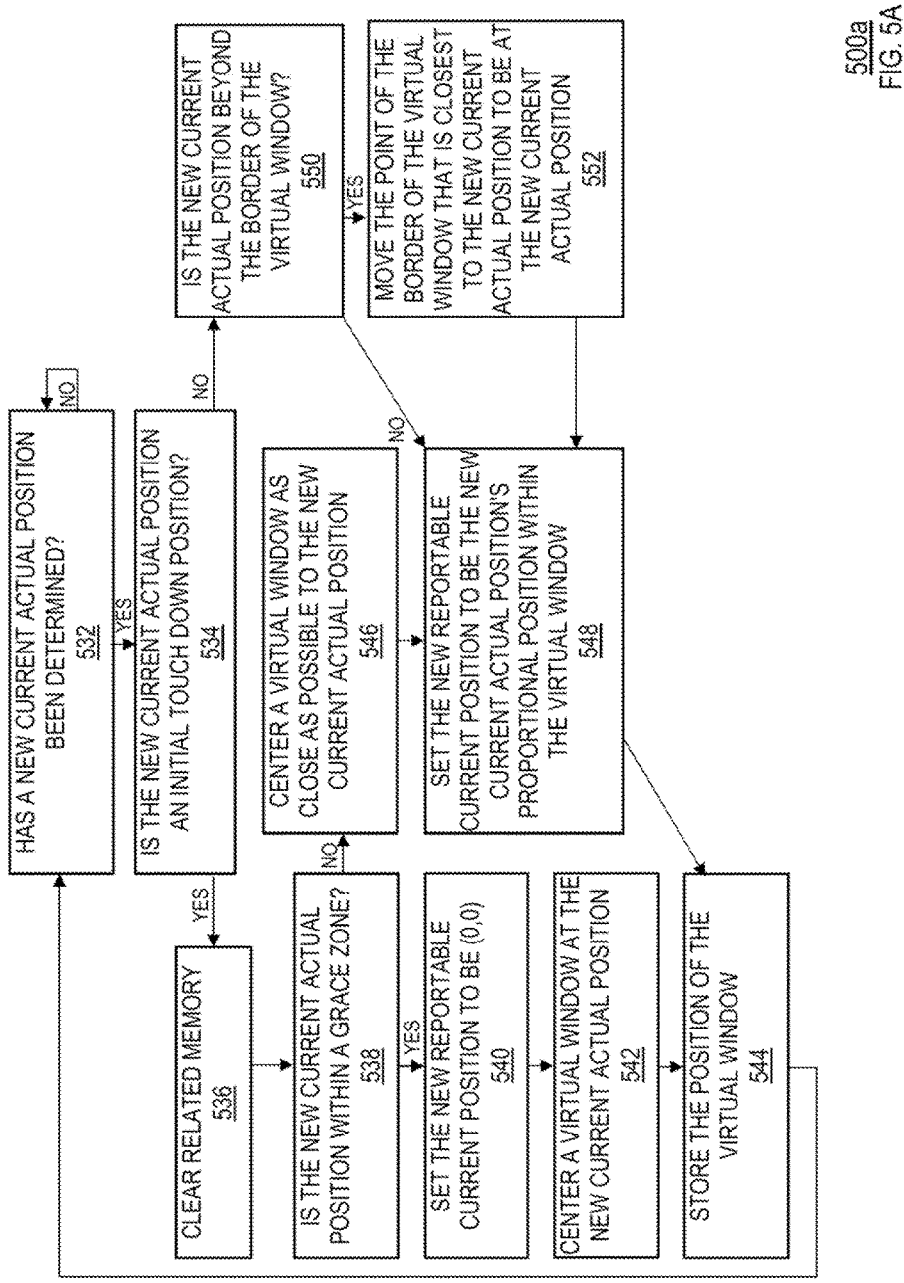

A particular processing sub-routine of step 512 of process 500 may be shown by a process 500a of FIG. 5A, which may be utilized by device application 303 for more practically handling initial and subsequent user touch events on surface 110as of touchpad input component 110a with respect to a potentially intended default center position and/or for more accurately enabling full saturation of a particular directional control. The following discussion of process 500a of FIG. 5A may make reference to particular user touch positions, that may be illustrated by one or more of FIGS. 7B-7D. As shown, at step 532, process 500a may include detecting whether a new current actual user touch position has been determined (e.g., determined at step 508 of process 500). If a determination of a new current actual user touch position is not detected at step 532, then step 532 may be repeated until such a determination is detected or until any suitable interrupt of process 500a may be received. However, if a determination of a new current actual user touch position is detected at step 532, process 500a may advance to step 534, where it may be determined whether or not the new current actual user touch position is an initial touch down position. For example, at step 534, process 500a may analyze the new current actual user touch position in conjunction with any other suitable data, such as any number of previous actual touch positions that may have been previously determined (e.g., as may be accessed by device application 303 at step 510) and/or any other suitable data that may be indicative of whether any user control data was recently received that did not include a touch position user control data portion, such that device application 303 may be operative to determine whether the determined new current actual user touch position is a new initial user touch down event for a new user path along touch surface 110as or whether the determined new current actual user touch position is not an initial touch down event of a new user path along touch surface 110as but is rather another user touch down event of an existing user path along touch surface 110as.

If it is determined at step 534 that the determined new current actual user touch position is a new initial user touch down event for a new user path along touch surface 110as, process 500a may advance to step 536, whereby any suitable data associated with a previous user path (e.g., previously determined actual positions, previously determined reportable positions, previously determined virtual window positions, and the like) may be cleared from any suitable portion of memory accessible to device application 303 (e.g., for creating more available storage). Then, process 500a may advance from step 536 to step 538, where it may be determined whether or not the new current actual user touch position is within any suitable area or grace zone ("GZ"). Such a grace zone may be an artificial construct that may be leveraged by device application 303 to determine whether the determined new current actual user touch position for a new initial user touch down event ought to be practically handled as if intended to be made by a user at a default center position of touch surface 110as, whereby no initial active directional control is intended to be utilized for actively directionally controlling media application 305, or whether the determined new current actual user touch position for a new initial user touch down event ought to be practically handled as if intended to be made by a user away from a default center position of touch surface 110as, whereby an initial active directional control is intended to be utilized for actively directionally controlling media application 305.

Such a grace zone may be defined to be of any suitable shape or size with respect to the overall geometry of touch surface 110as and may have any suitable position with respect to touch surface 110as. As shown by situation illustration 700b of FIG. 7B and/or situation illustration 700d of FIG. 7D, a particular exemplary grace zone GZ may be a similar shape as touch surface 110as (e.g., a square) but may be 4% of the size of touch surface 110as. As also shown, the grace zone GZ may be centered with respect to the center of touch surface 110as (e.g., the origin of touch surface 110as (e.g., at (0,0) on touch surface 110as). However, in other embodiments, the size, shape, and/or orientation of the grace zone with respect to touch surface 110as may be any suitable configuration. For example, the center of the grace zone may be offset with respect to the center of touch surface 110as by any suitable amount (e.g., to account for the tendencies of a left-handed or a right-handed user of device 100).

If it is determined at step 538 that the determined new current actual user touch position as a new initial user touch down event for a new user path along touch surface 110as is within a grace zone, process 500a may advance to step 540, whereby a new reportable current user touch position may be set to be equal to the origin of touch surface 110as (e.g., position (0,0)). Such a setting of a new reportable current user touch position at step 540 of process 500a (e.g., a portion of step 512 of process 500) may then be utilized by device application 303 for generating and sharing new media control data with media application 305 (e.g., new media control data 528 may be shared at step 514 of process 500, where such new media control data may be indicative of that new reportable current position as set at step 540 (e.g., position (0,0))). Therefore, process 500a may be operable to adjust any actual touch position of an initial touch down event that is determined to be within a suitable grace zone to a reportable touch position that may be equal to the origin of touch surface 110as, such that media application 305 may interpret such an actual touch position as a touch event at a resting default position of touch surface 110as, whereby media application 305 may be operative to handle such control data similarly to a conventional directional controller being at its default center position. Therefore, as shown in FIG. 7B, even if initial user touch event U1 may be at an actual touch position other than the origin of touch surface 110as (e.g., at position (−0.1,0.1)), such an actual touch position may be reportable to media application 305 as if it were at the origin.

Prior to, after, or concurrently with step 540, step 542 of process 500a may be operative to center a sliding virtual window ("VW") at the new current actual touch position. Such a virtual window may be an artificial construct that may be leveraged by device application 303 to dictate the determination of future reportable positions. A virtual window may be useful for more accurately enabling full saturation of a particular directional control as it may be difficult or inconvenient for a user to provide a touch event exactly at an edge of touch surface 110as for indicating a maximum directional control that may be commonly associated with that edge (e.g., at the center of the right-most edge of touch surface 110as that may be associated with actual position (1,0)). Such a virtual window may be defined to be of any suitable shape or size with respect to the overall geometry of touch surface 110as and may have any suitable position with respect to touch surface 110as. As shown by situation illustrations 700b-700d of FIGS. 7B-7D, a particular exemplary virtual window VW may be a similar shape as touch surface 110as (e.g., a square) but may be 64% of the size of touch surface 110as. As also shown in FIG. 7B, in accordance with step 542, the virtual window VW may be centered at the new current actual position (e.g., the virtual window center ("VWC") of the virtual window VW may be positioned at the same position as initial user touch event U1 (e.g., actual position (−0.1,0.1)). However, in other embodiments, the size, shape, and/or orientation of the virtual window with respect to touch surface 110as may be any suitable configuration. For example, the virtual window may be any suitable size with respect to the size of touch surface 110as, such as in the range of 50%-75% of the size of touch surface 110as. Next, after steps 540 and 542, process 500a may advance to step 544, where the current position of the virtual window (e.g., centered with respect to the actual position of the initial user touch event) may be stored or otherwise made accessible in the future to device application 303 (e.g., for later steps of process 500a). Then, process 500a may advance from step 544 to step 532 to detect when a next new current actual position has been determined.

If it is determined at step 538 that the determined new current actual user touch position as a new initial user touch down event for a new user path along touch surface 110as is not within a grace zone, process 500a may advance to step 546, whereby a virtual window may be centered as close as possible to the new current actual touch position of the new initial user touch down event while also ensuring that the entirety of the virtual window is aligned with touch surface 110as. For example, as shown in FIG. 7D, in accordance with step 546, when an initial user touch event U1' may be determined (e.g., at step 538) to be at an actual touch position outside of the grace zone GZ (e.g., at actual position (−0.6,0.6)), the virtual window may be centered (e.g., at step 546) as close as possible to that actual position (e.g., the distance between that actual position and center VWC of the virtual window may be minimized while still retaining the entirety of the virtual window aligned with touch surface 110as). After step 546, process 500a may advance to step 548, where a new reportable current user touch position may be set to be equal to the new current actual user touch position's proportional position with respect to the virtual window (e.g., with respect to the coordinate system of the virtual window and not with respect to the coordinate system of the larger touch surface 110as). For example, continuing with the example of FIG. 7D, the reportable current user touch position may be set based on the relationship between the actual touch position of initial user touch event U1' (e.g., actual position (−0.6,0.6)) with respect to the size of the virtual window (e.g., ([−0.8 to 0.8],[−0.8 to 0.8])) and not with respect to the size of the larger touch surface 110as (e.g., ([−1 to 1],[−1 to 1])). That is, rather than setting the new reportable current position to be the same as the new current actual position of initial touch event U1' of FIG. 7D (e.g., (−0.6,0.6)), process 500a may be operative to set the new reportable current position to be (−0.5,0.5), as the new current actual position may be positioned halfway between the origin and the upper-left corner of the virtual window VW of FIG. 7D (see, e.g., TABLE 2 below). After step 548, process 500a may advance to step 544, where the current position of the virtual table (e.g., the position after the centering of step 546) may be stored, and then process 500a may return to step 532.

If a determined new current actual user touch position is detected at step 532 but then it is determined at step 534 that the determined new current actual user touch position is not a new initial touch down event of a new user path along touch surface 110as but is rather another user touch down event of an existing user path along touch surface 110as, process 500a may advance to step 550, where it may be determined whether the new current actual user touch position is beyond the border of the virtual window (e.g., the previously centered and/or stored virtual window for the existing user path). If the new current actual user touch position is determined not to be beyond the border of the virtual window (e.g., if the new current actual user touch position is determined to be on or within the border of the virtual window) at step 550, then process 500a may advance to step 548 (e.g., where a reportable current position may be set but the position of the virtual window may not be changed). However, if the new current actual user touch position is determined to be beyond the border of the virtual window (e.g., if the new current actual user touch position is determined to not be on or within the border of the virtual window) at step 550, then process 500a may advance to step 552, where the virtual window may be moved by moving the point of the border of the virtual window that is closest to the new current actual user touch position to be at the new current actual touch position, after which process 500a may advance to step 548. The following examples may be described to illustrate certain features of such a process 500a. Various touch events, actual touch positions, virtual positions with respect to a virtual window, reportable touch positions, grace zones, and virtual windows of various particular embodiments of process 500a may be shown by one or more of situation illustrations 700b-700d of FIGS. 7B-7D and may be summarized by the below table:

TABLE 2

(FIGS. 7B-7D)

| User Touch Event | Actual Touch Position | Virtual Position With Respect To Virtual Window | Reportable Touch Position |
|---|---|---|---|
| U1 | AP1 (−.1, .1) | VP1 (0, 0) | RP1 (0, 0) |
| U2 | AP2 (.3, .5) | VP2 (4/8, 4/8) | RP2 (.5, .5) |
| U3 | AP3 (.7, .5) | VP3 (8/8, 4/8) | RP3 (1, .5) |
| U4 | AP4 (1, .5) | VP4 (8/8, 4/8) | RP4 (1, .5) |
| U5 | AP5 (.7, .5) | VP5 (5/8, 4/8) | RP5 (.625, .5) |
| U1' | AP1' (−.6, −.6) | VP1' (−4/8, 4/8) | RP1' (−.5, .5) |
| U2' | AP2' (.3, .5) | VP2' (5/8, 3/8) | RP2' (.625, .375) |

Following a first example of FIGS. 7B and 7C, if a first new current actual position AP1 is detected at step 532 for a first user touch event U1 and is determined to be an initial touch down position of a new user touch path PTH at step 534, any suitable data associated with a previous touch path of process 500a may be cleared at step 536 and it may then be determined that first new current actual position AP1 (−0.1,0.1) of event U1 is within the grace zone GZ at step 538 (e.g., as shown in FIG. 7B). Then, the first reportable touch position RP1 for that first new current actual position AP1 of event U1 may be set as position (0,0) at step 540 and the virtual window VW may be centered at first new current actual position AP1 of event U1 at step 542 (e.g., VWC may be set to AP1) and that position of the virtual window (e.g., the position of VWC of FIG. 7B) may be stored or maintained as accessible before returning to step 532. Continuing with the first example of FIGS. 7B and 7C, when a second new current actual position AP2 is detected at step 532 for a new user touch event U2 determined not to be an initial touch down position but a new position of existing user touch path PTH at step 534, it may then be determined at step 550 that second new current actual position AP2 (0.3,0.5) of event U2 is not beyond the border of the virtual window VW (e.g., as shown in FIG. 7B). Then the second reportable touch position RP2 for that second new current actual position AP2 of event U2 may be set at step 548 to be indicative of the proportional relationship of that second new current actual position AP2 of event U2 with respect to the virtual window (e.g., reportable position (0.5,0.5) as position AP2 of event U2 may be ⁴⁄₈ths of the way removed from the origin VWC of the virtual window VW in the positive direction of each one of the X-axis and Y-axis), after which process 500a may return to step 532 via step 544. It is to be noted that this second reportable position RP2 may be different than the second actual position AP2 (e.g., due to the initial difference between AP1 and the origin of touch surface 110as and/or due to the difference in size between the virtual window VW and touch surface 110as). Continuing with the first example of FIGS. 7B and 7C, when a third new current actual position AP3 is detected at step 532 for a new user touch event U3 determined not to be an initial touch down position but a new position of existing user touch path PTH at step 534, it may then be determined at step 550 that third new current actual position AP3 (0.7,0.5) of event U3 is not beyond the border of the virtual window VW (e.g., as shown in FIG. 7B, current actual position AP3 of event U3 may instead be on the border of the virtual window VW). Then the third reportable touch position RP3 for that third new current actual position AP3 of event U3 may be set at step 548 to be indicative of the proportional relationship of that third new current actual position AP3 of event U3 with respect to the virtual window VW (e.g., reportable position (1,0.5) as position AP3 of event U3 may be on the edge of the virtual window VW aligned with the positive direction of the X-axis (e.g., ⁸⁄₈ths of the way removed from the origin VWC of the virtual window VW in the positive direction of the X-axis) and still ⁴⁄₈ths of the way removed from the origin VWC of the virtual window VW in the positive direction of the Y-axis), after which process 500a may return to step 532 via step 544. It is to be noted that this third reportable position RP3 may be different than the third actual position AP3 (e.g., due to the initial difference between AP1 and the origin of touch surface 110as and/or due to the difference in size between the virtual window and touch surface 110as). Continuing with the first example of FIGS. 7B and 7C, when a fourth new current actual position AP4 is detected at step 532 for a new user touch event U4 determined not to be an initial touch down position but a new position of existing user touch path PTH at step 534, it may then be determined at step 550 that fourth new current actual position AP4 (1,0.5) of event U4 is indeed beyond the border of the virtual window VW (e.g., as shown in FIG. 7B, current actual position AP4 of event U4 may be beyond the border of the current position of the virtual window VW (e.g., as stored at the previous iteration of step 544)). Then, due to this determination at step 550, the position of the virtual window VW may be moved at step 552 such that the point of the border of the virtual window VW that is closest to the new current actual position AP4 of event U4 (e.g., the same point as previous position AP3 of event U3) may be moved to be at the new current actual position AP4 of event U4 (e.g., the position of the virtual window VW may be moved from the position of FIG. 7B to the position of FIG. 7C), and then, after such a step 552, the fourth reportable touch position RP4 for that fourth new current actual position AP4 of event U4 may be set at step 548 to be indicative of the proportional relationship of that fourth new current actual position AP4 of event U4 with respect to the recently moved virtual window (e.g., reportable position (1,0.5) as position AP4 of event U4 may be on the edge of the recently moved virtual window aligned with the positive direction of the X-axis and ⁴⁄₈ths of the way removed from the origin VWC of the virtual window in the positive direction of the Y-axis), after which process 500a may return to step 532 via step 544. It is to be noted that this fourth reportable position RP4 may be the same as the third reportable position RP3, despite the actual position changing from AP3 to AP4, as the relative position of each one of AP3 and AP4 with respect to the position of the virtual window at step 548 may be the same. Therefore, once a user's actual touch position reaches an edge of a virtual window, a maximum (e.g., fully saturated) reportable touch position may be set with respect to at least one axis associated with that edge and may be maintained even as the actual touch position advances beyond that edge of the virtual window and towards an actual edge of touch surface 110as. This may enable a reportable touch position representative of a maximum directional control input (e.g., full bore towards the right (e.g., in the positive direction along the X-axis)) to be generated prior to a user actually touching at an exact edge of touch surface 110as, which may be difficult for a user to achieve and/or maintain. Continuing with the first example of FIGS. 7B and 7C, when a fifth new current actual position AP5 is detected at step 532 for a fifth new user touch event U5 determined not to be an initial touch down position but a new position of existing user touch path PTH at step 534, it may then be determined at step 550 that fifth new current actual position AP5 (0.7,0.5) of event U5 is not beyond the border of the virtual window VW (e.g., as shown in FIG. 7C, current actual position AP5 of event U5 may instead be within the border of the virtual window VW). Then the fifth reportable touch position RP5 for that fifth new current actual position AP5 of event U5 may be set at step 548 to be indicative of the proportional relationship of that fifth new current actual position AP5 of event U5 with respect to the virtual window (e.g., reportable position (0.625,0.5) as position AP5 of event U5 may be ⁵⁄₈ths of the way removed from the origin VWC of the virtual window VW in the positive direction of the X-axis of FIG. 7C and still ⁴⁄₈ths of the way removed from the origin VWC of the virtual window VW in the positive direction of the Y-axis of FIG. 7C), after which process 500a may return to step 532 via step 544. It is to be noted that this fifth reportable position RP5 may be different than the third reportable position RP3 despite actual position AP5 of event U5 being the same as actual position AP3 of event U3 (e.g., due to the fact that the position of the virtual window may have changed between when the third reportable position RP3 was set and when the fifth reportable position RP5 was set (e.g., due to the movement of the virtual window between its position of FIG. 7B and its position of FIG. 7C)).

As mentioned, with respect to FIG. 7D, if it is determined at step 538 that the determined new current actual user touch position AP1' as a new initial user touch down event U1' for a new user path PTH' along touch surface 110as is not within a grace zone GZ, process 500a may advance to step 546, whereby a virtual window may be centered as close as possible to the new current actual touch position AP1' of the new initial user touch down event U1' while also ensuring that the entirety of the virtual window VW is aligned with touch surface 110as. For example, as shown in FIG. 7D, in accordance with step 546, when an initial user touch event U1' may be determined (e.g., at step 538) to be at an actual touch position AP1' outside of the grace zone GZ (e.g., at actual position (−0.6,0.6)), the virtual window VW may be centered (e.g., at step 546) as close as possible to that actual position AP1' of event U1' (e.g., the distance between that actual position AP1' of event U1' and center VWC of the virtual window VW may be minimized while still retaining the entirety of the virtual window VW aligned with touch surface 110as). After step 546, process 500a may advance to step 548, where a new reportable current user touch position RP1' may be set to be equal to the proportional position of the new current actual user touch position AP1' of event U1' with respect to the virtual window VW (e.g., with respect to the coordinate system of the virtual window and not with respect to the coordinate system of the larger touch surface 110as). For example, continuing with the example of FIG. 7D, the reportable current user touch position RP1' may be set based on the relationship between the actual touch position AP1' (e.g., actual position (−0.6,0.6)) of event U1' with respect to the size of the virtual window VW (e.g., ([−0.8 to 0.8],[−0.8 to 0.8])) and not with respect to the size of the larger touch surface 110as (e.g., ([−1 to 1],[−1 to 1])). That is, rather than setting the new reportable current position RP1' to be the same as the new current actual position AP1' (e.g., (−0.6,0.6)) of initial touch event U1' of FIG. 7D, process 500a may be operative to set the new reportable current position RP1' to be (−0.5,0.5) as the new current actual position AP1' may be positioned halfway between the origin and the upper-left corner of the virtual window VW (see, e.g., FIG. 7D and TABLE 2). After step 548, process 500a may advance to step 544, where the current position of the virtual window VW (e.g., the position after the centering of step 546) may be stored, and then process 500a may return to step 532. Continuing with this second example of FIG. 7D, when a second new current actual position AP2' is detected at step 532 for a new user touch event U2' determined not to be an initial touch down position but a new position of existing user touch path PTH' at step 534, it may then be determined at step 550 that second new current actual position AP2' (0.3,0.5) of event U2' is not beyond the border of the virtual window VW (e.g., as shown in FIG. 7D). Then the second reportable touch position RP2' for that second new current actual position AP2' of event U2' may be set at step 548 to be indicative of the proportional relationship of that second new current actual position AP2' of event U2' with respect to the virtual window (e.g., reportable position (0.625,0.375) as position AP2' may be ⅝ths of the way removed from the origin VWC of the virtual window in the positive direction of the X-axis and ⅜ths of the way removed from the origin VWC of the virtual window in the positive direction of the Y-axis), after which process 500a may return to step 532 via step 544. It is to be noted that this second reportable position RP2' of actual position AP2' of event U2' of path PTH' of FIG. 7D may be different than the second reportable position RP2 of actual position AP2 of event U2 of path PTH of FIG. 7B, despite AP2 and AP2' being the same (e.g., due to the initial difference between AP1 and AP1' and/or due to the difference in positions between the virtual window of FIG. 7B and FIG. 7D with respect to touch surface 110as).

It is to be appreciated that, in some embodiments, steps 538, 540, and 542 may be omitted and step 536 may flow directly to step 546, such that the concept of a grace zone may not be utilized. Instead, the same effect of such a grace zone may be applied based on the relative size of the virtual window with respect to the size of touch surface 110as. For example, as shown in the embodiment of FIGS. 7B and 7D, any initial actual touch position that may exist within the grace zone GZ may also have the center of the virtual window VW positioned thereon (e.g., due to the particular relationships of the size and shapes of the grace zone GZ, the virtual window VW, and the touch surface of the particular embodiment of FIGS. 7B and 7D). However, in other embodiments, steps 538-542 may be provided in order for a grace zone to have a different size relationship with respect to the virtual window and/or touch surface 110as.

Therefore, any suitable algorithm or algorithms that may be provided by process 500a of FIG. 5A (e.g., in combination with process 500 of FIG. 5D) may improve the accuracy for media application 305 while also enabling practical use of touchpad input component 110a as a virtual directional controller. For example, an initial touch down point within a grace zone or at a point that may be used as a center point for a virtual window completely within the touch surface may become a reference origin even if the raw input value of that initial touch down point may be non-zero (e.g., non-zero API). When an initial touch down point is established, a virtual window may be estimated within the touch surface that may lock in on a motion range of a finger of a user (e.g., a thumb) and may renormalize user movement values to ([−1 to 1], [−1 to 1]) before being shared with media application 305. The virtual window may become adaptive and may slide or otherwise move when the user's touch may move outside of the original range of the window, and input may then be normalized again. As it may be virtually impossible to place finger at a precise origin of touch surface 110as on initial touch down, a grace window about the origin may be defined such that initial touch down within that zone may be reported as position (0,0) despite the raw input location being some offset away. Such an offset may then be applied to all subsequent movements of a user's touch along a path until touch up (e.g., until the path is discontinued), thereby providing position data relative to the initial touch down point. It may be difficult to reach full saturation (e.g., −1.0 or +1.0) on the X- or Y-axis of touch surface 110as. Therefore a virtual window may be utilized within the bounds of the touchpad extents of touch input component 110a. The virtual window may be centered about the initial touch down location. The virtual window may slide within the bounds of the touchpad based on the raw input location. The touch location may be reported to be the raw input location's proportional position within the bounds of the virtual window.

It is to be understood that the steps shown in process 500a of FIG. 5A are merely illustrative and that existing steps may be modified or omitted, additional steps may be added, and the order of certain steps may be altered.

Description of FIG. 5B and FIG. 7E

A particular processing sub-routine of step 512 of process 500 may be shown by a process 500b of FIG. 5B, which may be utilized by device application 303 for more practically handling initial and subsequent user touch events on surface 110as of touchpad input component 110a with respect to more accurately enabling horizontal linear control. The following discussion of process 500b of FIG. 5B may make reference to particular user touch positions, that may be illustrated by FIG. 7E. As shown, at step 554, process 500b may include detecting whether a new current actual user touch position has been determined (e.g., determined at step 508 of process 500). If a determination of a new current actual user touch position is not detected at step 554, then step 554 may be repeated until such a determination is detected or until any suitable interrupt of process 500*b* may be received. However, if a determination of a new current actual user touch position is detected at step 554, process 500*b* may advance to step 556, where it may be determined whether or not the new current actual user touch position is an initial touch down position. For example, at step 556, process 500*b* may analyze the new current actual user touch position in conjunction with any other suitable data, such as any number of previous actual touch positions that may have been previously determined (e.g., as may be accessed by device application 303 at step 510) and/or any other suitable data that may be indicative of whether any user control data was recently received that did not include a touch position user control data portion, such that device application 303 may be operative to determine whether the determined new current actual user touch position is a new initial user touch down event for a new user path along touch surface 110*as* or whether the determined new current actual user touch position is not an initial touch down event of a new user path along touch surface 110*as* but is rather another user touch down event of an existing user path along touch surface 110*as*.

If it is determined at step 556 that the determined new current actual user touch position is a new initial user touch down event for a new user path along touch surface 110*as*, process 500*b* may advance to step 558, whereby any suitable data associated with a previous user path (e.g., previously determined actual positions, previously determined reportable positions, previously determined force data, previously determined ratios, previously determined relationships, and the like) may be cleared from any suitable portion of memory accessible to device application 303 (e.g., for creating more available storage). Then, process 500*b* may advance from step 558 to step 560, whereby a new reportable current user touch position may be set to be equal to the new current actual user touch position. Such a setting of a new reportable current user touch position at step 560 of process 500*b* (e.g., a portion of step 512 of process 500) may then be utilized by device application 303 for generating and sharing new media control data with media application 305 (e.g., new media control data 528 may be shared at step 514 of process 500, where such new media control data may be indicative of that new reportable current position as set at step 560). Therefore, process 500*b* may be operable to set any actual touch position of an initial touch down event as a reportable touch position. For example, as shown in FIG. 7E, if initial user touch event U1 may be at an actual touch position other than the origin of touch surface 110*as* (e.g., at position (−0.6,−0.2)), such an actual touch position may be reportable to media application 305 as that same position by process 500*b*. Alternatively, it is to be understood that any other suitable process may also be applied to such an initial touch down event or any other events of process 500*b* for additionally handling touch data (e.g., process 500*a* of FIG. 5A may also be utilized such that media application 305 may interpret such an actual touch position as a touch event at a resting default position of touch surface 110*as* if within a grace zone). After step 560, process 500*b* may return to step 554.

If a determined new current actual user touch position is detected at step 554 but then it is determined at step 556 that the determined new current actual user touch position is not a new initial touch down event of a new user path along touch surface 110*as* but is rather another user touch down event of an existing user path along touch surface 110*as*, process 500*b* may advance to determine if each requirement of one or more requirements has been met by the existing user path such that the reportable current position may be defined to be different than the current actual position for more accurately enabling linear control (e.g., such that touchpad input component 110*a* may be used as a more effective directional controller for media application 305) or if at least one of such one or more requirements has not been met by the existing user path such that the reportable current position may be defined to be the same as the current actual position. For example, each one of steps 562, 564, 566, and 568 may determine if a particular requirement has been met for potentially enabling horizontal linear control. If the requirement of any one of steps 562, 564, 566, and 568 is not met, then process 500*b* may advance from that step to step 560 (e.g., such that the reportable current position may be defined to be the same as the current actual position). However, if the requirement of each one of steps 562, 564, 566, and 568 is met, then process 500*b* may advance to step 570 rather than step 560 (e.g., such that the reportable current position may be defined to be different than the current actual position for more accurately enabling horizontal linear control (e.g., such that touchpad input component 110*a* may be used as a more effective directional controller for media application 305)). The order in which steps 562, 564, 566, and 568 may be provided by process 500*b* may be any suitable order. Although the order shown by FIG. 5B may have certain advantages as may be understood based on the description thereof.

At step 562, if force data is available, it may be determined whether a force of the force data associated with the new current actual position is no greater than a force of the force data associated with the previous actual position. For example, as mentioned, user control data 526 may not only include touch position input component data 522 that may be indicative of the actual touch position of a user touch event on surface 110*as*, but user control data 526 may also include touch force input component data 522 that may be indicative of the magnitude of the force applied by the user touch event onto surface 110*as* (e.g., along a Z-axis into surface 110*as*), and step 562 may be operative to compare the magnitude of force of the user touch event associated with the new current actual position to the magnitude of force of the user touch event associated with the previous actual position. If such a force associated with the new current actual position is determined at step 562 to be greater than such a force associated with the previous actual position, then process 500*b* may proceed from step 562 to step 560. However, if such a force associated with the new current actual position is determined at step 562 to be no greater than such a force associated with the previous actual position, then process 500*b* may proceed from step 562 to step 564. Therefore, as long as the force associated with every new user touch event for a particular user path is no greater than the force associated with the previous user touch event for that particular user path, then the requirement of step 562 may be satisfied. For example, such a requirement may be operative to determine that the force applied by a user onto surface 110*as* does not increase while the user tracks a particular path along surface 110*as*. If such a requirement is met, process 500*b* may proceed to step 564, otherwise, process 500*b* may proceed to step 560. Such a requirement may be based on an assumption that a user interacting with surface 110*as* in an attempt to track a horizontal line across surface 110*as* may usually decrease the pressure it exerts onto surface 110*as* during such tracking (e.g., due to the mechanics of a user's hand with respect to surface 110*as*). For example, as shown in FIG. 2, a user may hold or support the back of device 100 in the palm of his or her right hand such that the thumb RT of that right hand may be operative to curl about the right side of device 100 and touch surface 110*as*, while one or more other fingers RF of that right hand may be operative to hold device 100 along the left side of device 100. While such a grip of device 100 may facilitate an interaction between thumb RT and surface 110*as*, the joints and/or other physical characteristics of the user's right hand may be such that the force of a touch event by thumb RT on surface 110*as* may naturally decline as the position of that touch event moves from the left hand side 110*al* of surface 110*as* toward the right hand side 110*ar* of surface 110*as*. Therefore, when a user may attempt to draw a horizontal line with thumb RT along a user path from an initial point proximate left hand side 110*al* to another point more proximate right hand side 110*ar*, the force of such user interaction with surface 110*as* may naturally decline, and such a characteristic of user force may be tracked by step 562 when such force data is available to device 300 for process 500*b*.

Alternatively, if force data is not available or otherwise not leveraged by process 500*b*, it may be determined at step 562 whether the distance (e.g., a spanning distance) between the initial actual position and the new current actual position is greater than a particular threshold percentage of the width of the touch surface. If such a spanning distance between the initial actual position and the new current actual position of a particular user path is determined at step 562 to not be greater than a particular threshold percentage or other ratio of the width of touch surface 110*as* (e.g., the dimension of surface 110*as* along the X-axis of FIG. 7E), then process 500*b* may proceed from step 562 to step 560. However, if such a spanning distance between the initial actual position and the new current actual position of a particular user path is determined at step 562 to be greater than a particular threshold percentage or other ratio of the width of touch surface 110*as*, then process 500*b* may proceed from step 562 to step 564. Therefore, in such embodiments, as long as the spanning distance between the actual position of an initial user touch event and the actual position of a new current user touch event for a particular user path is greater than a particular threshold percentage or other suitable ratio of the width of touch surface 110*as*, then the requirement of step 562 may be satisfied. Such a particular threshold percentage of step 562 may be any suitable percentage, such as any percentage between 33% and 66%, or any percentage between 45% and 55%, or 50%.

At step 564, it may be determined whether each actual position of each user touch event including and/or between an initial user touch event and a new current user touch event for a particular user path along surface 110*as* is no lower than a line segment (e.g., a spanning line segment) extending between the actual position of the initial user touch event and the actual position of the new current user touch event. If the actual position of any intermediate touch event is lower than a vertically linear point along such a spanning line segment extending between the actual position of the initial user touch event and the actual position of the new current user touch event (e.g., if the Y-axis coordinate of the actual position of any particular intermediate touch event is less than the Y-axis coordinate of a particular point along a spanning line segment extending between the actual position of the initial user touch event and the actual position of the new current user touch event, where that particular point shares the same X-axis coordinate as the actual position of that particular intermediate touch event), then process 500*b* may proceed from step 564 to step 560. However, if the actual position of each intermediate touch event is no lower than a vertically linear point along such a spanning line segment extending between the actual position of the initial user touch event and the actual position of the new current user touch event (e.g., if, for each particular intermediate user touch event, the Y-axis coordinate of the actual position of the particular intermediate touch event is no less than the Y-axis coordinate of a particular point along a spanning line segment extending between the actual position of the initial user touch event and the actual position of the new current user touch event, where that particular point shares the same X-axis coordinate as the actual position of that particular intermediate touch event), then process 500*b* may proceed from step 564 to step 566. Therefore, in such embodiments, as long as the actual Y-axis position of each intermediate touch event along a particular user path is no lower than a spanning line segment extending between the actual position of the initial touch event and the actual position of the new current touch event of that user path, then the requirement of step 564 may be satisfied. In some particular embodiments, it may be determined at step 564 whether each actual position of each intermediate user touch event between an initial user touch event and a new current user touch event for a particular user path along surface 110*as* is no lower than a line segment extending between any user touch event of the path made prior to the intermediate user touch event and any user touch event of the path made after the intermediate user touch event.

At step 566, it may be determined whether the ratio of the length of a line segment (e.g., a spanning line segment) extending between the actual position of an initial user touch event and the actual position of a new current user touch event for a particular user path along surface 110*as* to the maximum length of a path height line segment extending perpendicularly from the spanning line segment to any point along the user path is more than a particular threshold value. If such a ratio is greater than such a particular threshold value, then process 500*b* may proceed from step 566 to step 560. However, if such a ratio is not greater than such a particular threshold value, then process 500*b* may proceed from step 566 to step 568. Therefore, in such embodiments, as long as the distance between two points of a path (e.g., the initial position and the new current position) divided by the maximum perpendicular "height" of the path between those two points is greater than a particular threshold value, then the requirement of step 566 may be satisfied. In some particular embodiments, such two points of the path may be any two points along the path, and may not necessarily be the initial position and the new current position of the path. Such a particular threshold value of step 566 may be any suitable threshold value, such as any threshold value between 4.0 and 16.0, or any threshold value between 8.0 and 12.0, or a value of 10.0.

At step 568, it may be determined whether an absolute value of the angle formed by a horizontal axis (e.g., an absolute horizontal axis) of touch surface 110*as* and a line segment (e.g., a spanning line segment) extending between the actual position of an initial user touch event and the actual position of a new current user touch event for a particular user path along surface 110*as* is less than a particular threshold angle. If the absolute value of such an angle is not less than such a particular threshold angle, then process 500*b* may proceed from step 568 to step 560. However, if the absolute value of such an angle is less than such a particular threshold angle, then process 500*b* may proceed from step 568 to step 570. Therefore, in such embodiments, as long as the absolute value of the angle formed by an absolute horizontal axis of surface 110*as* and a line segment extending between any two points of a user path along surface 110as (e.g., the initial position and the new current position) is less than a particular threshold angle, then the requirement of step 568 may be satisfied. In some particular embodiments, such two points of the path may be any two points along the path, and may not necessarily be the initial position and the new current position of the path. Such a particular threshold angle of step 568 may be any suitable threshold angle, such as any threshold angle between 10.degree. and 30.degree., or any threshold angle between 15.degree. and 25.degree., or a threshold angle of 20.degree.

If each one of the requirements of process 500b (e.g., each one of steps 562, 564, 566, and 568) is satisfied, then process 500b will advance to step 570, whereby a new reportable current user touch position may be set based partially on a previous reportable position of the particular user path for more accurately enabling horizontal linear control (e.g., such that touchpad input component 110a may be used as a more effective directional controller for media application 305). For example, at step 570, the X-coordinate of the new reportable current position may be set to be the same as the X-coordinate of the new current actual position, while the Y-coordinate of the new reportable current position may be set to be the same as the Y-coordinate of the previous reportable position of the particular user path. Therefore, once certain criteria is met, a vertical (e.g., Y-coordinate) value of a path may be at least temporarily held static amongst consecutive touch events of a user path for enabling more effective horizontal linear control of such a path as may be reported to media application 305.

The following examples may be described to illustrate certain features of such a process 500b. Various touch events, actual touch forces, actual touch positions, reportable touch positions, and other characteristics of an exemplary user path of various particular embodiments of process 500b may be shown by illustration 700e of FIG. 7E and may be summarized by the below table:

detected at step 554 for a new user touch event U2 determined not to be an initial touch down position but a new position of existing user touch path PTH-U at step 556, it may then be determined at step 562 whether the magnitude F2 of the force data associated with touch event U2 is no greater than (e.g., less than or equal to) the magnitude F1 of the force data associated with touch event U1, or, if no such force data is available, whether the distance between the position of actual position AP1 and the position of actual position AP2 (e.g., 0.22) is greater than a particular threshold percentage (e.g., 50%) of the width of surface 110as (e.g., 2.0). If step 562 is satisfied, then process 500b may advance to step 564. For the purposes of clarity and ease of explanation, it may be assumed that the requirement of step 562 is not satisfied for each one of new user touch events U2 and U3, for whatever reason, such that step 560 may be leveraged to set RP2 to be equal to AP2 and to set RP3 to be equal to AP3, as shown. While the requirement of step 562 may be satisfied for the new user touch event U4, such that one or more of steps 564, 566, and 568 may be processed, it is to be understood that whether or not user touch event U4 satisfies the requirement of each one of steps 564, 566, and 568, such that either step 560 or step 570 is leveraged to set RP4, the position of RP4 may be equal to AP4 (e.g., as the Y-coordinate of AP4 (e.g., "0.3") is the same as the Y-coordinate of RP3.

Therefore, continuing with the example of FIG. 7E, when a fifth new current actual position AP5 is detected at step 554 for a new user touch event U5 determined not to be an initial touch down position but a new position of existing user touch path PTH-U at step 556, it may then be determined at step 562 whether the magnitude F5 of the force data associated with touch event U5 is no greater than (e.g., less than or equal to) the magnitude F4 of the force data associated with touch event U4, or, if no such force data is available, whether the distance between the position of actual position AP1 and the position of actual position AP5 (e.g., 1.26) is greater than a particular threshold percentage (e.g., 50%) of

TABLE 3

(FIG. 7E)

| User Touch Event | Actual Touch Force | Actual Touch Position | Reportable Touch Position | Distance from Initial (compared to Width) | Satisfy Step 562 (threshold = 50%)? | Satisfy Step 564? |
|---|---|---|---|---|---|---|
| U1 | F1 | AP1 (−.6, −.2) | RP1 (−.6, −.2) | N/A | N/A | N/A |
| U2 | F2 | AP2 (−.5, 0) | RP2 (−.5, 0) | .22 (11%) | Yes if F2 ≤ F1, else No | Yes |
| U3 | F3 | AP3 (−.1, .3) | RP3 (−.1, .3) | .71 (36%) | Yes if F3 ≤ F2 ≤ F1, else No | Yes |
| U4 | F4 | AP4 (.3, .3) | RP4 (.3, .3) | 1.0 (50%) | Yes | Yes |
| U5 | F5 | AP5 (.6, .2) | RP5 (.6, .3) | 1.26 (63%) | Yes | Yes |
| U6 | F6 | AP6 (.8, .1) | RP6 (.8, .3) | 1.43 (73%) | Yes | Yes |

Following the example of FIG. 7E, if a first new current actual position AP1 is detected at step 554 for a first user touch event U1 and is determined to be an initial touch down position of a new user touch path PTH-U at step 556, any suitable data associated with a previous touch path of process 500b may be cleared at step 558 and, then, the first reportable touch position RP1 for that first new current actual position AP1 of event U1 may be set as position (−0.6,0.2) at step 560 (e.g., the same position as the position of actual position AP1). Continuing with the example of FIG. 7E, when a second new current actual position AP2 is the width of surface 110as (e.g., 2.0). If step 562 is satisfied, then process 500b may advance to step 564. At step 564, a spanning line SL extending between initial actual position AP1 of event U1 and new current actual position AP5 of event U5 may be compared to each other position of path PTH-U (e.g., actual position AP2 of event U2, actual position AP3 or event U3, and actual position AP4 of event U4) to determine if any other position of path PTH-U is lower than spanning line SL. For example, step 564 may be operative to determine that the Y-axis coordinate of AP2 (e.g., "0") at the X-coordinate of AP2 (e.g., "−0.5") is not lower than the Y-axis coordinate of line SL (e.g., "−1.66") at the X-coordinate of AP2, to determine that the Y-axis coordinate of AP3 (e.g., "0.3") at the X-coordinate of AP3 (e.g., "−0.1") is not lower than the Y-axis coordinate of line SL (e.g., "−0.33") at the X-coordinate of AP3, and/or to determine that the Y-axis coordinate of AP4 (e.g., "0.3") at the X-coordinate of AP4 (e.g., "0.4") is not lower than the Y-axis coordinate of line SL (e.g., "0.1") at the X-coordinate of AP4, such that the requirement of step 564 may be satisfied and such that process 500*b* may advance to step 566. At step 566, the ratio (e.g., 4.002) of the length of spanning line SL (e.g., length DS that may be equal to "1.26" between positions AP1 and AP5) to the maximum height of path PTH-U (e.g., to the maximum length DH of a line PH that may be perpendicular to spanning line SL and that may extend between spanning line SL and path PTH-U between position AP1 of event U1 and position AP5 of event U5, which may be a length equal to "0.32") may be compared to a particular threshold value (e.g., 3.9). If such a ratio is greater than such a particular threshold value, then step 566 may be satisfied and process 500*b* may then advance to step 568. At step 568, an absolute value of an angle (e.g., angle θ of FIG. 7E) formed by an absolute horizontal axis of surface 110*as* (e.g., the X-axis) and spanning line SL may be compared to a particular threshold angle (e.g., a threshold angle of 20°). As shown in this example, angle θ of FIG. 7E may be equal to 18.5° and may be determined to be less than a threshold angle of 20° at step 568, thereby satisfying the requirement of step 568, such that process 500*b* may advance from step 568 to step 570. Continuing with this particular example, at step 570, process 500*b* may be operative to set the X-coordinate of the new reportable current position RP5 to be the same as the X-coordinate of the new current actual position AP5 (e.g., "0.6" of AP5 of event U5) and to set the Y-coordinate of the new reportable current position RP5 to be the same as the Y-coordinate of the previous reportable position RP4 (e.g., "0.3" of RP4). Therefore, as shown in FIG. 7E, while the path PTH-U tracked by a user along surface 110*as* may proceed from AP1 of event U1 to AP2 of event U2 to AP3 of event U3 to AP4 of event U4 to AP5 of event U5, the path PTH-R reported to media application 305 may proceed from RP1 of event U1 to RP2 of event U2 to RP3 of event U3 to RP4 of event U4 to RP5 of event U5, such that a Y-axis coordinate of the report path PTH-R may be held static when the requirements of process 500*b* may be met for a new current actual position of a particular user path PTH-U. Moreover, as also shown in FIG. 7E, the requirements of process 500*b* may similarly be met for new current actual position AP6 of new user touch event U6 of path PTH-U, such that process 500*b* may be operative to set the X-coordinate of the new reportable current position RP6 to be the same as the X-coordinate of the new current actual position AP6 (e.g., "0.8" of AP6 of event U6) and to set the Y-coordinate of the new reportable current position RP6 to be the same as the Y-coordinate of the previous reportable position RP5 of path PTH-R (e.g., "0.3" of RP5).

Therefore, any suitable algorithm or algorithms that may be provided by process 500*b* of FIG. 5B (e.g., in combination with process 500 of FIG. 5D) may improve the accuracy for media application 305 while also enabling practical use of touchpad input component 110*a* as a virtual directional controller for more accurately enabling horizontally linear control. For example, it may be difficult for a user of input component 110*a* to move a finger, such as right thumb RT, in a perfectly straight horizontal line along an X-axis of surface 110*as*. For example, as shown, a right thumb's movement path (e.g., PTH-U of FIG. 7E) may typically be an arc or other suitable non-linear or curved shape due to the thumb moving on one or more pivots (e.g., thumb joints) with respect to one or more surfaces of device 100. Therefore, process 500*b* may be at least partially operative to apply a transform to one or more current actual positions of such a user path for straightening at least a portion of such a non-linear path as it may be reported to media application 305. Process 500*b* may be operative to transform a user path provided by right thumb RT extending over surface 110*as* from side 110*ar* or by a left thumb extending over surface 110*al* from side 110*al* (not shown) or by any other suitable portion of a user. Therefore, at least a portion of a non-linear or curved or arced user path PTH-U may be snapped or transformed by process 500*b* into a straight horizontal reportable path PTH-R for use by media application 305. In some embodiments, such transformation may occur as soon as in response to a second user touch event (e.g., event U2), whereby each one of steps 562, 564, 566, and 568 may be satisfied based on data associated with an initial event U1 and event U2 without any intervening events.

It is to be understood that the steps shown in process 500*b* of FIG. 5B are merely illustrative and that existing steps may be modified or omitted, additional steps may be added, and the order of certain steps may be altered.

Figure 5C:
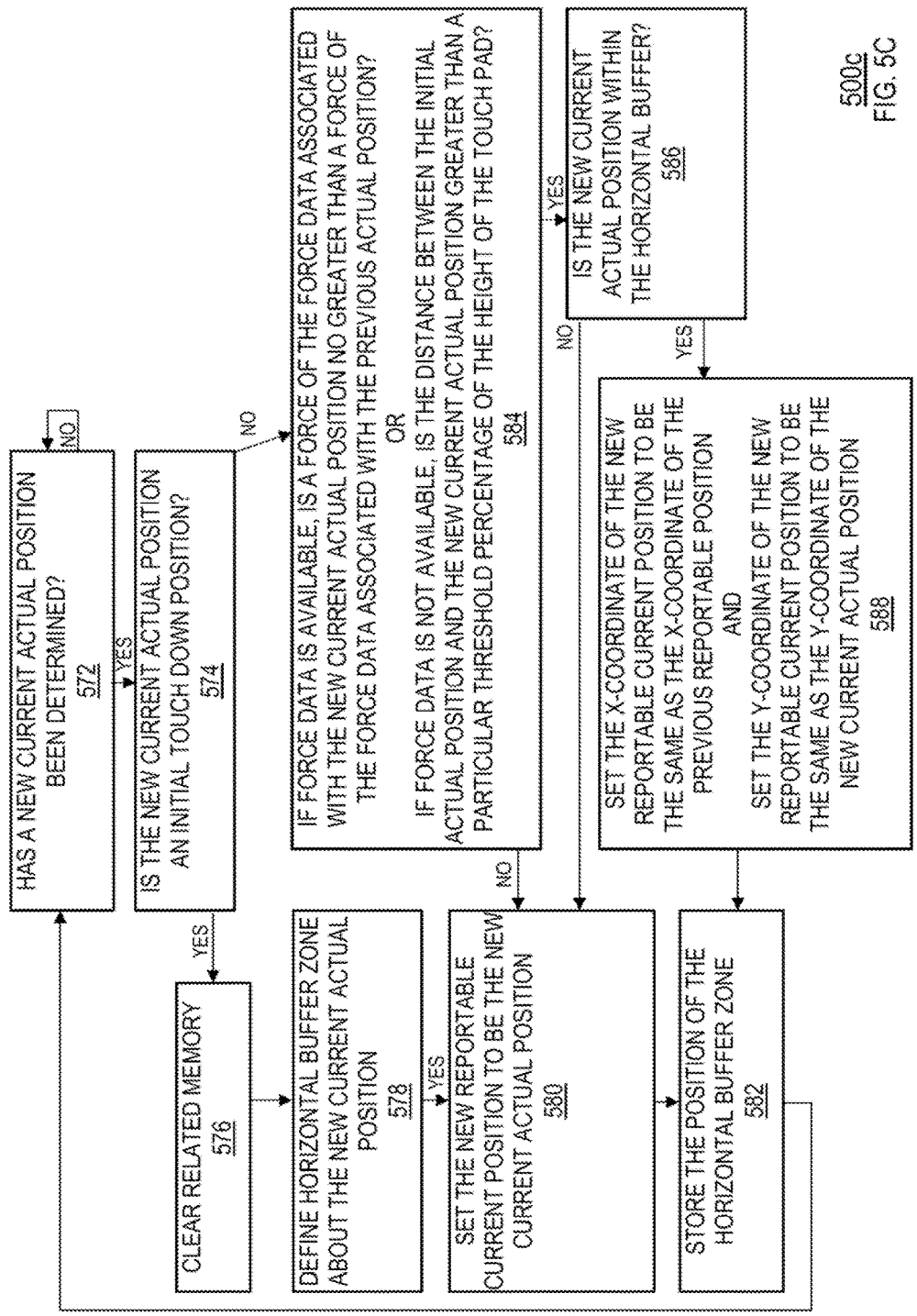

Description of FIG. 5C and FIG. 7F

A particular processing sub-routine of step 512 of process 500 may be shown by a process 500*c* of FIG. 5C, which may be utilized by device application 303 for more practically handling initial and subsequent user touch events on surface 110*as* of touchpad input component 110*a* with respect to more accurately enabling vertical linear control. The following discussion of process 500*c* of FIG. 5C may make reference to particular user touch positions, that may be illustrated by FIG. 7F. As shown, at step 572, process 500*c* may include detecting whether a new current actual user touch position has been determined (e.g., determined at step 508 of process 500). If a determination of a new current actual user touch position is not detected at step 572, then step 572 may be repeated until such a determination is detected or until any suitable interrupt of process 500*c* may be received. However, if a determination of a new current actual user touch position is detected at step 572, process 500*c* may advance to step 574, where it may be determined whether or not the new current actual user touch position is an initial touch down position. For example, at step 574, process 500*c* may analyze the new current actual user touch position in conjunction with any other suitable data, such as any number of previous actual touch positions that may have been previously determined (e.g., as may be accessed by device application 303 at step 510) and/or any other suitable data that may be indicative of whether any user control data was recently received that did not include a touch position user control data portion, such that device application 303 may be operative to determine whether the determined new current actual user touch position is a new initial user touch down event for a new user path along touch surface 110*as* or whether the determined new current actual user touch position is not an initial touch down event of a new user path along touch surface 110*as* but is rather another user touch down event of an existing user path along touch surface 110*as*.

If it is determined at step 574 that the determined new current actual user touch position is a new initial user touch down event for a new user path along touch surface 110*as*, process 500c may advance to step 576, whereby any suitable data associated with a previous user path (e.g., previously determined actual positions, previously determined reportable positions, previously determined force data, previously determined buffers, and the like) may be cleared from any suitable portion of memory accessible to device application 303 (e.g., for creating more available storage). Then, process 500c may advance from step 576 to step 578, and a horizontal buffer zone may be defined at step 578 with respect to the new current actual position. Such a horizontal buffer zone HBZ may be defined to include any portion of surface 110as (e.g., a vertically extending band of surface 110as that may include the portion of surface 110as that may be bound by two vertical lines (e.g., left boundary LB and right boundary RB) and that may include the new current actual position, where such vertical lines may be spaced the same or different amounts away from the new current actual position, and/or where the thickness of such a buffer zone may vary based on the distance of the new current actual position from a vertical edge of surface 110as (e.g., left hand side 110al and/or right hand side 110ar)). Alternatively, the width of the horizontal buffer zone may be a fixed percentage of the width of surface 110as (e.g., 20% of the surface width as shown by horizontal buffer zone HBZ of FIG. 7F or 25% of the surface width as shown by horizontal buffer zone HBZ' of FIG. 7F) and may be centered about the initial touch down event (e.g., as shown by horizontal buffer zone HBZ of FIG. 7F) or not centered about the initial touch down event (e.g., as shown by horizontal buffer zone HBZ' of FIG. 7F). In some embodiments, if a width of a horizontal buffer zone is cut off by an edge of surface 100as when that horizontal buffer zone is positioned (e.g., centered or otherwise) about an initial touch down event, that portion of the width may simply not be utilized. Then, after step 578, process 500c may advance to step 580, whereby a new reportable current user touch position may be set to be equal to the new current actual user touch position. Such a setting of a new reportable current user touch position at step 580 of process 500c (e.g., a portion of step 512 of process 500) may then be utilized by device application 303 for generating and sharing new media control data with media application 305 (e.g., new media control data 528 may be shared at step 514 of process 500, where such new media control data may be indicative of that new reportable current position as set at step 580). Therefore, process 500c may be operable to set any actual touch position of an initial touch down event as a reportable touch position. For example, as shown in FIG. 7F, if initial user touch event U1 may be at an initial actual touch position AP1 (e.g., at position (−0.8,−0.6)), such an actual touch position may be reportable to media application 305 as that same position by process 500c. Alternatively, it is to be understood that any other suitable process may also be applied to such an initial touch down event or any other events of process 500c for additionally handling touch data (e.g., process 500a of FIG. 5A may also be utilized such that media application 305 may interpret such an initial actual touch position as a touch event at a resting default position of touch surface 110as if within a grace zone). After step 580, process 500c may advance to step 582, where the current position of the horizontal buffer zone (e.g., positioned with respect to the actual position of the initial user touch event) may be stored or otherwise made accessible in the future to device application 303 (e.g., for later steps of process 500c). Then, process 500c may advance from step 582 to step 572 to detect when a next new current actual position has been determined.

If a determined new current actual user touch position is detected at step 572 but then it is determined at step 574 that the determined new current actual user touch position is not a new initial touch down event of a new user path along touch surface 110as but is rather another user touch down event of an existing user path along touch surface 110as, process 500c may advance to determine if each requirement of one or more requirements has been met by the existing user path such that the reportable current position may be defined to be different than the current actual position for more accurately enabling linear control (e.g., such that touchpad input component 110a may be used as a more effective directional controller for media application 305) or if at least one of such one or more requirements has not been met by the existing user path such that the reportable current position may be defined to be the same as the current actual position. For example, each one of steps 584 and 586 may determine if a particular requirement has been met for potentially enabling vertical linear control. If the requirement of any one of steps 584 and 586 is not met, then process 500c may advance from that step to step 580 (e.g., such that the reportable current position may be defined to be the same as the current actual position). However, if the requirement of each one of steps 584 and 586 is met, then process 500c may advance to step 588 rather than step 580 (e.g., such that the reportable current position may be defined to be different than the current actual position for more accurately enabling vertical linear control (e.g., such that touchpad input component 110a may be used as a more effective directional controller for media application 305)). The order in which steps 584 and 586 may be provided by process 500c may be any suitable order. Although the order shown by FIG. 5C may have certain advantages as may be understood based on the description thereof.

At step 584, if force data is available, it may be determined whether a force of the force data associated with the new current actual position is no greater than a force of the force data associated with the previous actual position. For example, as mentioned, user control data 526 may not only include touch position input component data 522 that may be indicative of the actual touch position of a user touch event on surface 110as, but user control data 526 may also include touch force input component data 522 that may be indicative of the magnitude of the force applied by the user touch event onto surface 110as (e.g., along a Z-axis into surface 110as), and step 584 may be operative to compare the magnitude of force of the user touch event associated with the new current actual position to the magnitude of force of the user touch event associated with the previous actual position. If such a force associated with the new current actual position is determined at step 584 to be greater than such a force associated with the previous actual position, then process 500c may proceed from step 584 to step 580. However, if such a force associated with the new current actual position is determined at step 584 to be no greater than such a force associated with the previous actual position, then process 500c may proceed from step 584 to step 586. Therefore, as long as the force associated with every new user touch event for a particular user path is no greater than the force associated with the previous user touch event for that particular user path, then the requirement of step 584 may be satisfied. For example, such a requirement may be operative to determine that the force applied by a user onto surface 110as does not increase while the user tracks a particular path along surface 110as. If such a requirement is met, process 500c may proceed to step 586, otherwise, process 500c may proceed to step 580. Such a requirement may be based on an assumption that a user interacting with surface 110as in an attempt to track a vertical line across surface 110as may usually decrease the pressure it exerts onto surface 110as during such tracking (e.g., due to the mechanics of a user's hand with respect to surface 110as). In some embodiments, if force data is available, a requirement of step 584 may be satisfied if a force of the force data of the vertically higher one of the new current actual position and the previous actual position is no greater than a force of the force data of the vertically lower one of the new current actual position and the previous actual position, such that process 500c may be operative to handle both upward swipes and downward swipes along surface 110as.

Alternatively, if force data is not available or otherwise not leveraged by process 500c, it may be determined at step 584 whether the distance (e.g., a spanning distance) between the initial actual position and the new current actual position is greater than a particular threshold percentage of the height of the touch surface. If such a spanning distance between the initial actual position and the new current actual position of a particular user path is determined at step 584 to not be greater than a particular threshold percentage or other ratio of the height of touch surface 110as (e.g., the dimension of surface 110as along the Y-axis of FIG. 7F), then process 500c may proceed from step 584 to step 580. However, if such a spanning distance between the initial actual position and the new current actual position of a particular user path is determined at step 584 to be greater than a particular threshold percentage or other ratio of the height of touch surface 110as, then process 500c may proceed from step 584 to step 586. Therefore, in such embodiments, as long as the spanning distance between the actual position of an initial user touch event and the actual position of a new current user touch event for a particular user path is greater than a particular threshold percentage or other suitable ratio of the height of touch surface 110as, then the requirement of step 584 may be satisfied. Such a particular threshold percentage of step 584 may be any suitable percentage, such as any percentage between 33% and 66%, or any percentage between 45% and 55%, or 50%.

At step 586, it may be determined whether the actual position of the new current user touch event for a particular user path is within the horizontal buffer zone (e.g., the zone defined at step 578 and/or stored at step 582 with respect to that particular user path). Alternatively, in some embodiments, at step 586, it may be determined whether the actual position of each user touch event, including the new current user touch event, for a particular user path is within the horizontal buffer zone. Therefore, as long as the horizontal buffer zone includes the actual position of each user touch event for a particular user path or at least the actual position of the new current user touch event for a particular user path, then the requirement of step 586 may be satisfied.

If each one of the requirements of process 500c (e.g., each one of steps 584 and 586) is satisfied, then process 500c will advance to step 588, whereby a new reportable current user touch position may be set based partially on a previous reportable position of the particular user path for more accurately enabling vertical linear control (e.g., such that touchpad input component 110a may be used as a more effective directional controller for media application 305). For example, at step 588, the X-coordinate of the new reportable current position may be set to be the same as the X-coordinate of the previous reportable position of the particular user path, while the Y-coordinate of the new reportable current position may be set to be the same as the Y-coordinate of the new current actual position. Therefore, once certain criteria is met, a horizontal (e.g., X-coordinate) value of a path may be at least temporarily held static amongst consecutive touch events of a user path for enabling more effective vertical linear control of such a path as may be reported to media application 305.

The following examples may be described to illustrate certain features of such a process 500c. Various touch events, actual touch forces, actual touch positions, reportable touch positions, and other characteristics of an exemplary user path of various particular embodiments of process 500c may be shown by illustration 700f of FIG. 7F and may be summarized by the below table:

TABLE 4

(FIG. 7F)

| User Touch Event | Force | Actual Touch Position | Reportable Touch Position | Distance from Initial (compared to Height) | Satisfy Step 584 (threshold = 50%)? | Satisfy Step 586? |
|---|---|---|---|---|---|---|
| U1 | F1 | AP1 (−.8, −.6) | RP1 (−.8, −.6) | N/A | N/A | N/A |
| U2 | F2 | AP2 (−.77, −.3) | RP2 (−.77, −.3) | .301 (15%) | Yes if F2 ≤ F1, else No | Yes |
| U3 | F3 | AP3 (−.73, .1) | RP3 (−.73, .1) | .703 (35%) | Yes if F3 ≤ F2 ≤ F1, else No | Yes |
| U4 | F4 | AP4 (−.7, .4) | RP4 (−.73, .4) | 1.01 (51%) | Yes | Yes |
| U5 | F5 | AP5 (−.65, .6) | RP5 (−.73, .6) | 1.21 (61%) | Yes | Yes |
| U1' | F1' | AP1' (.5, −.7) | RP1' (.5, −.7) | N/A | N/A | N/A |
| U2' | F2' | AP2' (.4, −.4) | RP2' (.5, −.38) | .316 (16%) | Yes if F2' ≤ F1', else No | Yes |

Following the example of FIG. 7F, if a first new current actual position AP1 is detected at step 572 for a first user touch event U1 and is determined to be an initial touch down position of a new user touch path PTH-U at step 574, any suitable data associated with a previous touch path of process 500c may be cleared at step 576 and, then, at step 578, a horizontal buffer zone HBZ may be defined with respect to the initial actual position AP1 of the new user touch path. For example, as shown, HBZ may be defined by a left boundary vertical line LB that may extend through X-coordinate −1 and a right boundary vertical line RB that may extend through X-coordinate −0.6 (e.g., such that HBZ may be centered about a vertical line that may extend through X-coordinate −0.8 of the initial actual position AP1), although it is to be understood that HBZ may be defined in any other suitable manner. Then, after step 578, the first reportable touch position RP1 for that first new current actual position AP1 of event U1 may be set as position (−0.8,−0.6) at step 580 (e.g., the same position as the position of actual position AP1). Continuing with the example of FIG. 7F, when a second new current actual position AP2 is detected at step 572 for a new user touch event U2 determined not to be an initial touch down position but a new position of existing user touch path PTH-U at step 574, it may then be determined at step 584 whether the magnitude F2 of the force data associated with touch event U2 is no greater than (e.g., less than or equal to) the magnitude F1 of the force data associated with touch event U1, or, if no such force data is available, whether the distance between the position of actual position AP1 and the position of actual position AP2 (e.g., 0.301) is greater than a particular threshold percentage (e.g., 50%) of the height of surface 110as (e.g., 2.0). If step 584 is satisfied, then process 500c may advance to step 586. For the purposes of clarity and ease of explanation, it may be assumed that the requirement of step 584 is not satisfied for each one of new user touch events U2 and U3, for whatever reason, such that step 580 may be leveraged to set RP2 to be equal to AP2 and to set RP3 to be equal to AP3, as shown.

Therefore, continuing with the example of FIG. 7F, when a fourth new current actual position AP4 is detected at step 572 for a new user touch event U4 determined not to be an initial touch down position but a new position of existing user touch path PTH-U at step 574, it may then be determined at step 584 whether the magnitude F4 of the force data associated with touch event U4 is no greater than (e.g., less than or equal to) the magnitude F3 of the force data associated with touch event U3, or, if no such force data is available, whether the distance between the position of actual position AP1 and the position of actual position AP4 (e.g., 1.01) is greater than a particular threshold percentage (e.g., 50%) of the height of surface 110as (e.g., 2.0). If step 584 is satisfied, then process 500c may advance to step 586. At step 586, it may be determined whether or not actual position AP4, if not also each one of actual positions AP1-AP3, is within the horizontal buffer zone previously defined for user touch path PTH-U (e.g., at step 578). If each one of such one or more actual positions of user touch path PTH-U is determined to be within the horizontal buffer zone (e.g., as shown in FIG. 7F), then step 586 may be satisfied and process 500c may then advance to step 588, whereby process 500c may be operative to set the X-coordinate of the new reportable current position RP4 to be the same as the X-coordinate of the previous reportable position RP3 (e.g., "−0.73" of RP3) and to set the Y-coordinate of the new reportable current position RP4 to be the same as the Y-coordinate of the new current actual position AP4 (e.g., "0.4" of AP4 of event U4). Therefore, as shown in FIG. 7F, while the path PTH-U tracked by a user along surface 110as may proceed from AP1 of event U1 to AP2 of event U2 to AP3 of event U3 to AP4 of event U4, the path PTH-R reported to media application 305 may proceed from RP1 of event U1 to RP2 of event U2 to RP3 of event U3 to RP4 of event U4, such that an X-axis coordinate of the report path PTH-R may be held static when the requirements of process 500c may be met for a new current actual position of a particular user path PTH-U. Moreover, as also shown in FIG. 7F, the requirements of process 500c may similarly be met for new current actual position AP5 of new user touch event U5 of path PTH-U, such that process 500c may be operative to set the X-coordinate of the new reportable current position RP5 to be the same as the X-coordinate of the previous reportable position RP4 of path PTH-R (e.g., "−0.73" of RP4) and to set the Y-coordinate of the new reportable current position RP5 to be the same as the Y-coordinate of the new current actual position AP5 (e.g., "0.6" of AP5 of event U5).

As another example, as also shown by FIG. 7F, if a first new current actual position AP1' is detected at step 572 for a first user touch event U1' and is determined to be an initial touch down position of a new user touch path PTH-U' at step 574, any suitable data associated with a previous touch path of process 500c may be cleared at step 576 and, then, at step 578, a horizontal buffer zone HBZ' may be defined with respect to the initial actual position AP1' of the new user touch path. For example, as shown, HBZ' may be defined by a left boundary vertical line LB' that may extend through X-coordinate 0.1 and a right boundary vertical line RB' that may extend through X-coordinate 0.6 (e.g., such that HBZ' may be positioned but not centered about a vertical line that may extend through X-coordinate 0.5 of the initial actual position AP1'), although it is to be understood that HBZ' may be defined in any other suitable manner. Then, after step 578, the first reportable touch position RP1' for that first new current actual position AP1' of event U1' may be set as position (0.5,0.7) at step 580 (e.g., the same position as the position of actual position AP1'). Continuing with the example of FIG. 7F and new user touch path PTH-U', when a second new current actual position AP2' is detected at step 572 for a new user touch event U2' determined not to be an initial touch down position but a new position of existing user touch path PTH-U' at step 574, it may then be determined at step 584 whether the magnitude F2' of the force data associated with touch event U2' is no greater than (e.g., less than or equal to) the magnitude F1' of the force data associated with touch event U1', or, if no such force data is available, whether the distance between the position of actual position AP1' and the position of actual position AP2' (e.g., 0.316) is greater than a particular threshold percentage (e.g., 50%) of the height of surface 110as (e.g., 2.0). If step 584 is satisfied (e.g., due to F2' being less than or equal to F1'), then process 500c may advance to step 586. At step 586, it may be determined whether or not actual position AP2' is within the horizontal buffer zone previously defined for user touch path PTH-U' (e.g., at step 578). If actual position AP2' of user touch path PTH-U' is determined to be within the horizontal buffer zone HBZ' (e.g., as shown in FIG. 7F), then step 586 may be satisfied and process 500c may then advance to step 588, whereby process 500c may be operative to set the X-coordinate of the new reportable current position RP2' to be the same as the X-coordinate of the previous reportable position RP1' (e.g., "0.5" of RP1') and to set the Y-coordinate of the new reportable current position RP2' to be the same as the Y-coordinate of the new current actual position AP2' (e.g., "−0.4" of AP2' of event U2'). Alternatively, as shown, rather than setting the Y-coordinate of the new reportable current position RP2' to be the same as the Y-coordinate of the new current actual position AP2' at step 588, which may shorten the actual length of path PTH-R' compared to path PTH-U', step 588 may be operative to counter-rotate the segment of path PTH-U' between events U1' and U2' about an angle θ' that may be defined by an absolute vertical axis of surface 110as and the segment of path PTH-U' between events U1' and U2', such that the segment of path PTH-R' between RP1' and RP2' may be the same length as the segment of path PTH-U' between events U1' and U2' (e.g., such that step 588 may set the Y-coordinate of the new reportable current position RP2' to be −0.38 rather than −0.4 of AP2').

Therefore, any suitable algorithm or algorithms that may be provided by process 500c of FIG. 5C (e.g., in combination with process 500 of FIG. 5D) may improve the accuracy for media application 305 while also enabling practical use of touchpad input component 110a as a virtual directional controller for more accurately enabling vertically linear control. For example, it may be difficult for a user of input component 110a to move a finger, such as a left thumb (not shown when device 100 is held by a left hand of a user), in a perfectly straight vertical line along a Y-axis of surface 110as. For example, a left thumb's movement path (e.g., PTH-U of FIG. 7F) may typically be rotated slightly in a clockwise angular direction with respect to an intended vertical path due to the thumb moving on one or more pivots (e.g., thumb joints) with respect to one or more surfaces of device 100. Alternatively, a right thumb RT's movement path (e.g., PTH-U' of FIG. 7F) may typically be rotated slightly in a counter-clockwise angular direction (e.g., by an angle θ') with respect to an intended vertical path due to the thumb moving on one or more pivots (e.g., thumb joints) with respect to one or more surfaces of device 100. Therefore, process 500c may be at least partially operative to applya transform to one or more current actual positions of such a user path for counter-rotating at least a portion of such a rotated path as it may be reported to media application 305. Process 500c may be operative to transform a user path provided by right thumb RT extending over surface 110as from side 110ar or by a left thumb extending over surface 110as from side 110al (not shown) or by any other suitable portion of a user. Therefore, at least a portion of an unintentionally user-rotated user path PTH-U/PTH-U' may be counter-rotated or snapped or transformed by process 500c into a straight vertical reportable path PTH-R/PTH-R' for use by media application 305. In some embodiments, such transformation may occur as soon as in response to a second user touch event (e.g., event U2'), whereby each one of steps 584 and 586 may be satisfied based on data associated with an initial event U1' and event U2' without any intervening events.

It is to be understood that the steps shown in process 500c of FIG. 5C are merely illustrative and that existing steps may be modified or omitted, additional steps may be added, and the order of certain steps may be altered.

Description of FIG. 6D and FIG. 10

FIG. 6D is a flowchart of an illustrative process 600 for enabling efficient use of various types of user electronic devices that may be providing control data for a media application running on a media electronic device. Process 600 is shown being implemented by first user electronic device 100 (e.g., one or more input components 110 (e.g., touchpad input component 110a, one or more button input components 110b-110e, and/or one or more motion sensors of motion sensor input component 110f), application 103 running on processor 102, communications component 106, and bus 114), first media electronic device 300 (e.g., device application 303 and media application 305 running on processor 302, communications component 306, and bus 314), and communications set-up 55. However, it is to be understood that process 600 may be implemented using any other suitable components or subsystems. For example, although not shown in FIG. 6D, at least certain portions of process 600 (e.g., steps 604-608 and/or steps 616-620) may additionally or alternatively be implemented by first media electronic device 300 in communication with second user electronic device 200 via communications set-up 155. The following discussion of process 600 of FIG. 6D may make reference to a particular media rule system table or data structure 1099 of FIG. 10 that may be generated and/or leveraged for determining how device application 303 may enable efficient use of the various types of user electronic devices 100 and 200 that may be providing control data for media application 305 running on media electronic device 300. Processor 302 may be used to run one or more applications, such as application 303 and/or application 305 and/or to at least partially generate, store, share, access, leverage, and/or maintain media rule system data structure 1099, as described below.

Process 600 may enable efficient use of various types of user electronic devices, such as first user electronic device 100 and second user electronic device 200, either simultaneously or at different instances, as different types of remote controllers for providing control data for controlling media application 305 running on media electronic device 300. Current user control data may be received from a controller application of a user electronic device by a media electronic device via a communications set-up, whereby such received current user control data may be processed and utilized by a device application of the media electronic device in combination with a rule system and an event notification system of a media application to generate supplemented user control data with simulated control data from a missing input component of the user electronic device for generating corresponding supplemented media control data for use by a media application (e.g., to control playback of the media application (e.g., to control game play of a video game media application)). For example, as mentioned and as shown in the particular embodiment of system 1', first user electronic device 100 may be provided by a first type of media controller and second user electronic device 200 may be provided by a second type of media controller that may be different than the first type of media controller, where each one of first and second user electronic devices 100 and 200 may be operative to be communicatively coupled with first media electronic device 300 for controlling at least a portion of media application 305 at device 300, while first media electronic device 300 and/or second media electronic device 400 may be operative to present at least a portion of that controlled media application 305 to a user of system 1' (e.g., a first user using first user electronic device 100 and/or a second user using second user electronic device 200). It is to be appreciated that second user electronic device 200 may include at least one input component that may not be provided by first user electronic device 100 (e.g., one or more shoulder input components 210i-210l and/or one or more thumbstick input components 210m and/or 210n, etc.), whereby second user electronic device 200 may be referred to herein as an extended or fully-equipped or fully-enabled controller while first user electronic device 100 may be referred to herein as a limited or partially-equipped controller.

Media application 305 (e.g., a video game or a media center interface application or any other suitable application) may be developed or otherwise at least partially created (e.g., by a media application developer) to define an optimal control scheme with respect to a fully-enabled controller (e.g., second user electronic device 200) that may include all of the controller functionalities or capabilities that may be leveraged by one or more portions of media application 305.

That is, an optimal or certain control scheme of media application 305 may be defined with respect to a particular set of input component types of an optimal controller device (e.g., a controller device that may be enabled to generate all the possible types of user control data usable by media application 305). For example, one particular media application 305 (e.g., a simple media center interface application) may be developed so as to be fully controllable by an optimal controller device that has just three button input components (e.g., button input components 110c-110e of device 100 or button input components 210f-210h of device 200), while another particular media application 305 (e.g., a complex action-adventure video game) may be developed so as to be fully controllable by an optimal controller device that has sixteen various input components (e.g., sixteen various input components 210a-210p of the exemplary device 200 of FIG. 2, but not the limited set of six input components of the exemplary device 100 of FIG. 2). An optimal controller device for a particular media application 305 may be defined to be a controller device with appropriate input components operative to generate every type of user control data that may be leveraged to control every possible media application action for every possible media application event or state of media application 305.

Moreover, media application 305 may be developed to include a rule system (e.g., a rule system that may be at least partially represented by media rule system data structure 1099 of FIG. 10 or any other suitable data) that may include various rules, where each rule may be associated with at least one particular action of at least one particular input component of the multiple input components of the optimal controller device for media application 305, and where each rule may also be associated with at least one particular event that may occur while media application 305 is actively being used (e.g., played back or controlled in some manner by one or more user devices interfacing with media device 300). A device application (e.g., device application 303) may be operative to receive media rule system data indicative of such a rule system from media application 305 in order to determine the number and types of all input components of the optimal controller of media application 305 (e.g., "optimal input components" that may be provided by a user controller device for use in controlling media application 305), in order to determine the number and types of all input components required by media application 305 (e.g., "required input components" that must be provided by a user controller device for use in controlling media application 305), and/or in order to determine when and how to automate certain input component actions when enabling control of media application 305 by a non-optimal controller. Therefore, rather than a developer of a media application 305 having to define multiple code paths, multiple logic flows, multiple flow logic paths, multiple game codes, and/or multiple game logic flows, each one of which may be utilized by the media application for processing input control data from a respective particular user controller device type, a developer of a media application 305 may only define a single rule system for an optimal controller, and that single rule system may then be leveraged by device application 303 in combination with an event notification system of media application 305 for enabling various types of user controller devices to independently or simultaneously control that media application 305. Rather than requiring media application 305 to query what type of user controller is being used in order to determine the number and types of input components available to that user controller for selectively running one of many available types of code (e.g., one of many various controller schemes) available to media application 305 based on the determined type of controller being used, device application 303 may enable developers of media application 305 to focus on one controller scheme (e.g., a superset or optimal controller scheme) and then to define a single rule system for use by device application 303 for setting up an artificial intelligence bridge.

For example, a user may be holding or otherwise proximate user electronic device 100 for manipulating one or more input components 110, whereby data indicative of such manipulation (or lack thereof) may be collected by processor 102 using application 103 (e.g., a controller application) and may be communicated by user electronic device 100 as user control data via communications component 106 and communications set-up 55 to communications component 306 of media electronic device 300, whereby such user control data may be analyzed by processor 302 using device application 303 (e.g., a game controller framework) to generate game control data or media control data, and whereby such media control data may be accessed by game or media application 305 for controlling playback of game or media application 305 (e.g., a video game), which may then be presented to the user via any suitable output component (e.g., an output component 312 of media electronic device 300 and/or output component 412 of media electronic device 400, as described above). As a player user manipulates one or more input components 110 of user electronic device 100, such inputs may be communicated as user control data (e.g., as hardware signals) to device application 303, which may be operative to normalize and/or compute a consistent value for each input component 110 represented by the user control data and to update media control data (e.g., to update the values of various elements of a current user device control state), where such media control data may then be accessed by media application 305 for use in controlling media application 305. As such, at least a portion of device application 303 may provide a game controller framework that may be operative to receive user control data from one or more game controllers (e.g., user electronic device 100 and/or user electronic device 200) and may define one or more functions operative to transform such collected user control data into any suitable data objects or structs for generating any suitable media control data that may be utilized by media application 305. Such user control data and/or such media control data may be supplemented with additional data generated by device application 303 for simulating control data for an input component of an optimal controller of media application 305 that may not be available to user controller device 100 (e.g., based on a rule system made available by media application 305). Moreover, at least a portion of device application 303 may be operative to receive and process a media control data request from media application 305 and then to generate an appropriate user control data request that may be utilized by user electronic device 100 for efficiently providing new user control data.

At step 602 of process 600, media rule system data 603 may be transferred from media application 305 to device application 303 or otherwise accessed at device application 303 (e.g., when media application 305 is initially launched for use by device 300 or at any other suitable time). Such media rule system data 603 may include any suitable data associated with media application 305, such as media rule system table or data structure 1099 of FIG. 10, which may include various rules, where each rule may be associated with at least one particular action of at least one particular input component of the multiple input components of the optimal controller device for media application 305, and where each rule may also be associated with at least one particular event that may occur while media application 305 is actively being used (e.g., played back or controlled in some manner by one or more user devices interfacing with media device 300 via device application 303). Data structure 1099 may be any suitable database or any suitable ordered data storage that may be accessible in any suitable way by media electronic device 300 (e.g., by processor 302). For example, as shown in FIG. 10, media rule system data structure 1099 may include one or more rules or entries 1091 (e.g., rules 1091-1 through 1091-20). As shown, each rule 1091 may include or otherwise be associated with one or more particular types of input component of an optimal controller device of media application 305 (e.g., one or more of sixteen input component ("IC") types "IC #1"-"IC #16"), as may be indicated by a specific input element 1092 of each rule 1091. Moreover, as shown, each rule 1091 may include or otherwise be associated with one or more particular events, where each event may be a media application event that may occur while media application 305 is actively being used (e.g., one or more of various event types "event #1"-"event #17"), as may be indicated by a specific event element 1096 of each rule 1091. Rules 1091-1 through 1091-20 of structure 1099 of FIG. 10 may be illustrative of one particular rule set of any suitable number of rule sets that may be provided by a rule system of media application 305, where each rule set may include one or more rules 1091 for a particular state of media application 305 (e.g., a particular game state of a video game media application 305).

As shown, each particular rule 1091 may also include an action description element 1095 that may provide a description of one or more actions of media application 305 to be carried out when the one or more inputs of input element 1092 of that particular rule 1091 are simulated or otherwise made available by device application 303 to provide media control data (e.g., at step 626, described below) to media application 305 in response to each event of event element 1097 of that particular rule 1091 being detected as satisfied by device application 303 (e.g., at step 622, described below). Additionally or alternatively, as shown, each particular rule 1091 may also include an event description element 1097 that may provide a description of each one of such events of that particular rule 1091. Each one of description elements 1095 and 1097 may be merely descriptive and provided for promoting better understanding of process 600 but may not actually be included in any media rule system data 603 utilized by device application 303. For example, structure 1099 may only include multiple rules 1091, where each rule 1091 may be associated with one or more inputs of a particular input element 1092 and with one or more events of a particular event element 1096. As just one example, each distinct input component of each input element 1092 may be provided as a unique input component identifier (e.g., an alphanumeric string, such as "IC_#1"), which may be detected within structure 1099 when compared with a unique input component identifier of an input component of a user controller device (e.g., as may be made available to device application 303 at step 608, described below). Additionally or alternatively, as just one example, each distinct event of each event element 1097 may be provided as a unique event identifier (e.g., an alphanumeric string, such as "EVENT_#1"), which may be detected within structure 1099 when compared with a unique event identifier of media event system notification data of media application 305 (e.g., as may be made available to device application 303 at step 622, described below). Media rule system data 603 (e.g., data structure 1099) may be operative to identify to device application 303 the number and types of all input components of the optimal controller of media application 305 (e.g., each one of such "optimal input components" may be identified by the input elements 1092) and/or to identify to device application 303 the number and types of all input components required by media application 305 (e.g., each one of such "required input components" may be identified by the input elements 1092), such that device application 303 may be operative to leverage such media rule system data 603 for efficiently enabling various different types of user controller devices to provide control data for controlling media application 305.

Before, after, or while media rule system data 603 of media application 305 may be accessed by device application 303, device application 303 may be operative to generate and transmit a user device functionality request 605 to at least one user controller device (e.g., to device 100 and/or to device 200) at step 604. Such a request 605 may include a request for the target user controller device to generate and transmit data indicative of the type(s) of one or more input components of that user controller device to device application 303. For example, as shown, at step 606, first user controller device 100 may be operative to process a user device functionality request 605 received from media device 300 and then to generate and transmit responsive user device functionality data 609 back to device application 303 of media device 300 at step 608. Additionally or alternatively, although not shown in FIG. 6D, second user controller device 200 may be operative to process a user device functionality request 605 received from media device 300 and then to generate and transmit responsive user device functionality data 609 back to device application 303 of media device 300 (e.g., concurrently with steps 604-608 or alternatively to steps 604-608, such as based on whether only one or both of devices 100 and 200 are made available for communication with device 300 at a particular moment). In some embodiments, a user controller device 100 and/or 200 may be operative to generate and transmit user device functionality data 609 to media device 300 automatically (e.g., in response to detecting the presence of device 300 and not necessarily in response to receiving a particular user device functionality request 605 from device 300).

User device functionality data 609 from a particular user controller device (e.g., device 100 or device 200) may include any suitable data that may be indicative of the number and/or type(s) of the one or more input components of that device that may be utilized for generating and sharing user control data with device 300 for controlling a media application (e.g., application 305). For example, user device functionality data 609 that may be generated by first user controller device 100 and shared with device application 303 of media device 300 at step 608 may include data indicative of each one of the six input components 110a-110f of device 100 (e.g., data indicative of each input component's existence and functional type (e.g., four button input components, one directional controller input component, and one motion sensor input component)). As another example, user device functionality data 609 that may be generated by second user controller device 200 and shared with device application 303 of media device 300 at step 608 may include data indicative of each one of sixteen input components 210a-210p of device 200. In some embodiments, user device functionality data 609 may not be indicative of every input component of the user controller device that generated that user device functionality data 609, but instead may only be indicative of the subset of such input components that may be available for use at that particular time (e.g., as may be determined by the processing of step 606), as certain input components of a user controller device may be selectively enabled or disabled by a user or automatically for any suitable reason (e.g., motion sensor input component 110f of user controller device 100 may be disabled or otherwise unavailable when an amount of power available to power supply 108 of device 100 is below a particular threshold).

Once media rule system data 603 (e.g., rule system data, such as data structure 1099) has been received by device application 303 of media device 300 for a particular media application 305 to be controlled (e.g., at step 602) and once user device functionality data 609 has been received by device application 303 of media device 300 for one or more available user controller devices (e.g., at step 608), media device 300 (e.g., device application 303) may be operative to process or otherwise analyze the received user device functionality data 609 for each particular user controller device with respect to the received media rule system data 603 at step 610. Such processing may be operative to enable media device 300 to determine whether or not a particular user controller device (e.g., device 100 and/or device 200) may meet the input component requirements of media application 305 for controlling media application 305. For example, as mentioned, media rule system data 603 may identify at least one or more particular input component types that must be available to a user controller device in order for that user controller device to properly interact with media device 300 for controlling media application 305.

With reference to the particular example of data structure 1099 of FIG. 10, media rule system data 603 may include rules 1091 with input elements 1092 that may be indicative of (1) the type(s) of all optimal input components of an optimal controller of media application 305 and (2) which of those optimal input components are required input components (e.g., which input components are required of a user controller device in order to properly control media application 305). As shown, the input elements 1092 of rules 1091 may identify sixteen unique input component types as optimal input components of media application 305 (i.e., IC #1-IC #16) and may identify that at least one of such input components is a required input component of media application 305 (i.e., required ICs #8, #13, and #15). In one particular embodiment, such as where a controller device like second controller device 200 may be the optimal device of media application 305, the unique input component types of the input elements 1092 of data structure 1099 may be as follows:

1. IC #1 may be for a directional controller button (e.g., a button input component, such as up button IC 210a of an analog directional pad of optimal device 200);
2. IC #2 may be for a directional controller button (e.g., a button input component, such as down button IC 210b of an analog directional pad of optimal device 200);
3. IC #3 may be for a directional controller button (e.g., a button input component, such as left button IC 210c of an analog directional pad of optimal device 200);
4. IC #4 may be for a directional controller button (e.g., a button input component, such as right button IC 210d of an analog directional pad of optimal device 200);
5. IC #5 may be for a button (e.g., a button input component, such as analog face button IC 210e of optimal device 200);
6. IC #6 may be for a button (e.g., a button input component, such as analog face button IC 210f of optimal device 200);
7. IC #7 may be for a button (e.g., a button input component, such as analog face button IC 210g of optimal device 200);
8. IC #8 may be for a button (e.g., a button input component, such as analog face button IC 210h of optimal device 200) and may be identified as a required input component type;
9. IC #9 may be for a button (e.g., a button input component, such as left analog shoulder button IC 210i of optimal device 200);
10. IC #10 may be for a button (e.g., a button input component, such as left analog shoulder button IC 210j of optimal device 200);
11. IC #11 may be for a button (e.g., a button input component, such as right analog shoulder button IC 210k of optimal device 200);
12. IC #12 may be for a button (e.g., a button input component, such as right analog shoulder button IC 210l of optimal device 200);
13. IC #13 may be for a directional controller (e.g., a directional controller input component, such as left analog thumbstick directional controller IC 210m of optimal device 200) and may be identified as a required input component type;
14. IC #14 may be for a directional controller (e.g., a directional controller input component, such as right analog thumbstick directional controller IC 210n of optimal device 200);
15. IC #15 may be for a button (e.g., a button input component, such as pause/resume gameplay button IC 210o of optimal device 200) and may be identified as a required input component type; and
16. IC #16 may be for a motion sensor (e.g., a motion sensor input component, such as motion sensor IC 210p of optimal device 200).

As mentioned, each rule 1091 of a rule system of media application 305 may be associated with one or more events (e.g., in event element 1096 of table 1099), such that when new media event system notification data 623 is received that may be indicative of the occurrence of each event of a particular rule 1091, device application 303 may determine whether or not user control data 621 ought to be supplemented with additional control data based on that particular rule 1091. The occurrence of a single particular event may satisfy multiple distinct rules. For example, as shown by structure 1099 of FIG. 10, the occurrence of event #1 may satisfy each one of rules 1091-1, 1091-2, 1091-4, and 1091-15, where rule 1091-4 may alternatively be satisfied by the occurrence of event #7, and where rule 1091-15 may be satisfied at all times regardless of the events indicated by new media event system notification data 623 (e.g., such that gameplay may be paused in any situation). Additionally or alternatively, the occurrence of two particular events indicated by new media event system notification data 623 (e.g., simultaneous event occurrence) may satisfy a particular rule. For example, as shown by structure 1099 of FIG. 10, the occurrence of event #1 and event #7 may satisfy rule 1091-3. Each automation rule may be defined such that it may be satisfied by the occurrence of one or more events, where each one of such occurrences may be operative to be shared with device application 303 by the event notification system of media application 305 (e.g., with particular media event system notification data 623).

As mentioned, each rule 1091 of a rule system of media application 305 may be associated with one or more optimal input components (e.g., in input element 1092 of table 1099), such that when new media event system notification data 623 is received that may be indicative of the occurrence of each event of a particular rule 1091, device application 303 may determine if each of the one or more optimal input components of that particular rule is correlated with an available input component of a user controller device sourcing new user control data 621 to device application 303 and, if not, device application 303 may then supplement such new user control data 621 with additional control data based on that particular rule 1091. Different rules may be associated with the same optimal input component. For example, as shown by structure 1099 of FIG. 10, each one of rules 1091-14 and 1091-20 may be associated with the same optimal input component IC #14 but may be associated with different events (i.e., events 9 and 3, respectively). A particular rule may be associated with a combination of multiple optimal input components. For example, as shown by structure 1099 of FIG. 10, rule 1091-17 may be associated with a combination (e.g., simultaneous use) of optimal input components IC #11 and IC #12, rule 1091-18 may be associated with a combination (e.g., simultaneous use) of optimal input components IC #6 and IC #7, and rule 1091-18 may be associated with a combination (e.g., simultaneous use) of optimal input components IC #8 and IC #11.

At step 610, device application 303 may be operative to compare such media rule system data 603 with received user device functionality data 609 from one or more user controller devices in order to determine whether a particular user controller device includes each required input component type of the rule system of media application 305. For example, as shown in FIG. 10, a first user controller device correlation element 1093 for first user device 100 may be populated by media device 300 in structure 1099 (e.g., based on user device functionality data 609 received from first user device 100) for identifying which available input components of first user device 100 may meet the requirements of which input components of input element 1092 of each rule 1091. Additionally or alternatively, as also shown, a second user controller device correlation element 1094 for second user device 200 may be populated by media device 300 in structure 1099 (e.g., based on user device functionality data 609 received from second user device 200) for identifying which available input components of second user device 200 may meet the requirements of which input components of input element 1092 of each rule 1091. As shown, each one of required ICs #8, #13, and #15 may be correlated or mapped with a particular input component available to each one of first user device 100 (e.g., ICs 110e, 110a, and 110b, respectively) and second user device 200 (e.g., ICs 210h, 210m, and 210o, respectively). Not only may such mapping of each particular input component of a particular user controller device to a respective particular optimal input component of the optimal controller of media application 305 be operative to identify whether a particular user controller device meets the input component requirements of media application 305, but such mapping may also be operative to identify which particular optimal input components of the optimal controller of media application 305 may not be mapped to any input component of a particular user controller device. Such mapping may be carried out, for example, at step 610 and/or at any other suitable step of process 600 (e.g., by processor 302).

For example, as shown in FIG. 10, each particular optimal input component of the optimal controller of media application 305 (i.e., optimal ICs #1-#16 of input element 1092) may be mapped to a respective particular input component of second user controller device 200 (i.e., second user controller device ICs 210a-210o of correlation element 1094), as second user controller device 200 may be similar to the optimal controller considered by the developer of media application 305. However, as also shown in FIG. 10, certain particular optimal input components of the optimal controller of media application 305 (i.e., optimal ICs #1-#5, #9-#12, and #14 of input element 1092) may be not mapped to a respective particular input component of first user controller device 100 (e.g., as indicated by an "XXX" for particular entries of correlation element 1093), as first user controller device 100 may not include certain non-required input components of the optimal controller considered by the developer of media application 305. In such embodiments, as described below with respect to steps 622-628, when each event of event element 1096 of a particular rule 1091 is satisfied but that particular rule 1091 is associated with an optimal input component type of input element 1092 that is not mapped to a particular input component of first user controller device 100 at correlation element 1093, then input user control data for that optimal input component type may be automatically simulated by device application 303 and made available to media application 305 as media control data such that the media control data may include simulated control data to mimic a full set of control data provided by an optimal controller. For example, a developer of media application 305 may develop media application 305 to specify which input component on a physical controller (e.g., device 100) maps to the input component on the optimal controller when a rule for media application 305 is created. As a specific example, when a developer creates a rule for at least one specific input of input element 1092, the developer may specifically indicate which type of physical input component it ought to be mapped to (e.g., rule 1091-13 may specifically indicate that IC #13 of input element 1092 of rule 1091-13 is to be mapped to a touchpad (e.g., if no thumbstick is available)). Any suitable mapping requirements may be included by data structure 1099 or otherwise provided by media application 305 to device application 303 for determining how device application 303 may correlate each input component of a particular user controller device (e.g., as identified by user device functionality data 609) with a particular input component of the rule system of media application 305 (e.g., as identified by input element 1092 of data structure 1099 of media rule system data 603). Each one of correlation elements 1093 and 1094 may be merely descriptive and provided for promoting better understanding of process 600 but may not actually be included in any media rule system data 603 utilized by device application 303. For example, structure 1099 of media rule system data 603 may only include multiple rules 1091, where each rule 1091 may be associated with one or more inputs of a particular input element 1092 and with one or more events of a particular event element 1096.

Therefore, media device 300 may be operative to determine (e.g., at step 610) that each one of first user device 100 and second user device 200 meets the input component requirements of media application 305, such that process 600 may continue with utilizing one or both of such user devices for controlling media application 305. However, if it is detected at step 610 that one or both of first user device 100 and second user device 100 fails to meet the input component requirements of media application 305, then process 600 may instruct media application 305 accordingly (e.g., alert media application 305 that no suitable user controller device is currently available). Once at least one user controller device (e.g., first user controller device 100 and/or second user controller device 200) has been determined to meet the input component requirements of the rule system of media application 305 (e.g., at step 610), process 600 may proceed with accessing and leveraging user control data from such acceptable user controller device(s) in combination with the rule system of media application 305 for appropriately controlling media application 305.

At step 612 of process 600, a media control data request 613 may be transferred from media application 305 to device application 303 or otherwise accessed at device application 303. Such a media control data request 613 may be similar to media control data request 333 of step 332 of process 330 and/or may be any suitable call (e.g., an API call of API-M) or other suitable type of request for any suitable media control data that may be made available by device application 303 to media application 305. Such a request may be made at any suitable moment, such as whenever media application 305 would like a most recent value for one, some, or all of the various elements of a user device control state (e.g., the most recent value for one or more input components of one or more user controller devices that may be communicatively coupled to device application 303), or at any suitable frequency, such as 30 Hz or 60 Hz.

At step 614 of process 600, device application 303 may process at least a portion of the most recently received media control data request (e.g., media control data request 613 of step 612). Such processing of step 614 may include similar processing to step 334 of process 330 and/or may include any suitable number of components that may be operative to enable device application 303 to generate an appropriate user control data request 617 that may then be transferred from device application 303 to controller application 103 of first user electronic device 100 at step 616 (and/or to controller application 203 of second user electronic device 200). Such a user control data request 617 may be similar to user control data request 337 of process 330 and/or may be handled by first user electronic device 100 at step 618 similarly to one or more of steps 338-344 of process 330 and/or to adjust the functionality of user electronic device 100 in one or more ways for increasing the efficiency of user electronic device 100 as a remote controller and/or for generating and transmitting user control data 621 to device application 303 at step 620, which may be similar to user control data 347 of process 330 and/or which may be utilized by device application 303 at steps 624 and 626 at least partially similarly to steps 348 and 350 of process 330 and/or for generating and transmitting media control data 627 to media application 305 for use in controlling media application 305. Additionally or alternatively, although not shown, an iteration of steps 614-626 may be carried out between device application 303 and second user electronic device 200 and/or any other suitable user controller device that may be determined (e.g., at step 610) to be enabled to properly control media application 305.

The processing of media control data request 613 at step 614 may enable device application 303 to generate a user control data request 617 that may be operative to request that user electronic device 100 include all or only certain input component data from user electronic device 100 as user control data to be communicated from user electronic device 100 to media electronic device 300 (e.g., as user control data 621 at step 620 described below), which may dictate the size of such user control data and/or the latency of the communication of such user control data. Once a most recently received media control data request 613 has been analyzed at step 614, any appropriate new user control data request 617 may be generated and transmitted to user device 100 at step 616, where such new user control data request 617 may include any suitable information, such as information that may be operative to request that user electronic device 100 include only certain input component data as user control data to be communicated from user electronic device 100 to media electronic device 300 and/or such as information that may be operative to instruct user electronic device 100 to alter the functioning state of one or more components of device 100. Such a user control data request 617 may be any suitable call (e.g., an API call of API-U) or other suitable type of request for any suitable user control data that may be made available by controller application 103 of user electronic device 100 to media application 303 of media electronic device 300. Such a request may be made at any suitable moment, such as after a new media control data request 613 has been processed, or at any suitable frequency, such as 30 Hz or 60 Hz, or when such new user control data request 617 may be different than a previous user control data request sent by application 303 to application 103.

At step 618 of process 600, controller application 103 of first user electronic device 100 may process at least a portion of the most recently received user control data request (e.g., user control data request 617 of step 616). Such processing of step 618 may include any suitable number of components that may be operative to enable controller application 103 to generate one or more appropriate I/O control requests and/or to collect and process input component data from any or all input components 110 for generating and transmitting appropriate user control data 621 (e.g., at step 620). For example, controller application 103 may be operative to collect input component data from any or all input components 110 that may be generating output data and/or to collect any other suitable data from any other suitable components (e.g., the status of output components of device 100 for sharing as status information with device 300). Controller application 103 may be operative to collect such available input component data and then to process such collected component data at step 618 in conjunction with any suitable information from user control data request 617 to generate user control data 621 for transmission to device application 303 of media electronic device 300 at step 620.

Such user control data 621 may be communicated from controller application 103 of user electronic device 100 to device application 303 of media electronic device 300 using any suitable protocol and may be a return via API-U. Device application 303 may be operative to receive and to process any user control data 621 from controller application 103 at step 624 for generating and making available media control data 627 to media application 305 at step 626 (e.g., via API-M), which may then be processed by media application 305 at step 628 for controlling playback of media application 305 (e.g., a video game application or any other suitable media construct), which may dictate the data presented by the system to the user (e.g., via output components 412, and/or 412a of system 1'). Media control data 627 may be an updated user device control status state, which may be updated based on received new user control data 621 and processing of step 624. Although not shown in FIG. 6D, it is to be understood that media control data that may be older than media control data 627 may be made accessible to media application 305 by device application 303 in response to receipt of media control data request 613 at step 612 (e.g., prior to, concurrently with, or after one or more of steps 614-624, but prior to step 626), where such older media control data may be made available to media application 305 prior to media control data 627 of step 626 but such older media control data may not include data for each type of in component indicated in media control data request 613.

The processing of step 624 of process 600 may not only be based on new user control data 621 received by device application 303 from first user electronic device 100 at step 620, but may also be based on certain media rule system data 603 received by device application 303 from media application 305 at step 602 and/or certain media event system notification data 623 that may be received by device application 303 from media application 305 at step 624, which may be received at any time prior to step 624. Media event system notification data 623 may be generated by media application 305 and made available to device application 303 (e.g., via API-M) at any suitable moment, such as concurrently with or after a new media control data request 613 has been shared at step 612, such as concurrently with or after new user control data 621 has been received at step 620, or at any suitable frequency, such as 30 Hz or 60 Hz, or when such new media event system notification data 623 may be different than previous media event system notification data shared by application 305 with application 303. In some embodiments, media application 305 may have an event system that may define any suitable number of events that may occur when media application 305 is running, and new media event system notification data 623 may include one or more event notifications indicative of the occurrence of one or more events of that event system. As mentioned, each rule 1091 of a rule system of media application 305 may be associated with one or more events (e.g., in event element 1096 of table 1099), such that when new media event system notification data 623 is received that may be indicative of the occurrence of each event of a particular rule 1091, device application 303 may determine whether or not user control data 621 ought to be supplemented with additional control data based on that particular rule 1091 and whether it is correlated with an input component of the source of such user control data 621 (e.g., user controller device 100).

For example, if new media event system notification data 623 received by device application 303 at step 622 is indicative of the occurrence of an event #13 (e.g., an enemy has been tasered during the execution of a video game media application 305), device application 303 may be operative at step 624 to process that new media event system notification data 623 at step 624 in conjunction with media rule system data 603 (e.g., the data of table 1099) to determine that each event of event element 1096 of particular rule 1091-11 has been satisfied by new media event system notification data 623 and to determine that particular IC #11 of input element 1092 of that satisfied particular rule 1091-11 is not correlated with any input component of first user controller device 100 (e.g., as illustrated by the "XXX" at correlation element 1093 of rule 1091-11). In such a situation where device application 303 determines at step 624 that particular rule 1091-11 satisfied by new media event system notification data 623 is not correlated with an available input component of first user controller device 100, device application 303 may further be operative to supplement new user control data 621 from first user controller device 100 with additional control data that may simulate the availability and use of such an input component by first user controller device 100 at step 624 (e.g., to enable the action(s) of action description element 1095 of that satisfied particular rule 1091-11 at media application 305 (e.g., to enable the action of the player dropping a taser during the execution of a video game media application 305)), such that new media control data 627 made available to media application 305 at step 626 may be at least partially automated based on new media event system notification data 623, media rule system data 603, and any available user control data 621 provided by non-optimal first user controller device 100. In some embodiments, device application 303 may be operative to represent mechanical button input component presses as continuous values between 0 (e.g., not pressed) and 1 (e.g., fully pressed). Developers of a media application 305 may be able to use those continuous values, or have the option of accessing a more simple discrete boolean value indicating the button state (e.g., true for pressed, false for not pressed, etc.). If the developer chooses the latter option, device application 303 may be operative to evaluate the continuous value for the button, and if it's above 0.5 returns true (e.g., the button is pressed), otherwise returns false (e.g., the button is not pressed). When simulating a button press (e.g., such as IC #11 of rule 1091-11), device application 303 may be operative to set the continuous value to 1, indicating IC #11 is fully pressed. In an example such as rule 1091-14, where action item 1095 is to turn player to face enemy, there may be in fact additional granularity to such a rule other than what is shown such that device application 303 need not know the details of the actual gameplay other than that a rule has been satisfied (e.g., where the satisfied event may be "enemy in taser range but player turned to the right of the enemy" the associated action may be "turn player to the left to face the enemy", such that a left button press or leftward movement of a thumbstick may be simulated for that satisfied rule and/or where the satisfied event may be "enemy in taser range but player turned to the left of the enemy" the associated action may be "turn player to the right to face the enemy", such that a right button press or rightward movement of a thumbstick may be simulated for that satisfied rule). Therefore, device application 303 does not need to know the specifics of the game (e.g., the relative locations of the player and the enemy in question) other than event system notification data that satisfies such rules).

Device application 303 (e.g., a game controller framework) may be operative to intelligently process media rule system data 603 (e.g., the data of table 1099) and new media event system notification data 623 in light of user device functionality data 609 for more efficiently enabling the processing of step 624. For example, when determining whether or not to supplement new user control data 621 from first user controller device 100 based on one or more rules of media rule system data 603 satisfied by new media event system notification data 623, device application 303 may be operative to determine whether the events of new media event system notification data 623 satisfy one or more of the rules 1091 that are not correlated with an available input component of first user controller device 100 (e.g., rules 1091-1 through 1091-5, rules 1091-9 through 1091-12, rule 1091-14, rule 1091-17, rule 1091-19, and rule 1091-20) rather than to determine whether the events of new media event system notification data 623 satisfy one or more of every rule 1091 (e.g., rules 1091-1 through 1091-20), as it may be inefficient to consider the rules that are correlated with an available input component of first user controller device 100 (e.g., rules 1091-6 through 1091-8, rule 1091-13, rule 1091-15, rule 1091-16, and rule 1091-18) because it may not be effective to supplement new user control data 621 with data for an input component of first user controller device 100 that is available and correlated with an optimal input component of media application 305. In the situation of satisfaction of rule 1091-19, device application 303 may simulate input for IC #11 when IC #8 (i.e., IC 110e of device 100) is engaged or may simulate input for IC #11 and for IC #8 when IC #8 (i.e., IC 110e of device 100) is not engaged. As another example, if device application 303 has determined that a particular user controller device includes each input component type of the optimal controller of media application 305 (e.g., at step 610 for second user controller device 200, whereby each correlation element 1094 may include one or more input components of device 200), then device application 303 may not process new user control data 621 from that particular user controller device in combination with any new media event system notification data 623 or media rule system data 603 at step 624 as it may not be effective to supplement such new user control data 621 with data for an input component of that particular user controller device that is available and correlated with an optimal input component of media application 305. As another example, any rule that may be associated with only required input components (e.g., rules 1091-8, 1091-13, and 1091-15) may not be included in data structure 1099 or may not be analyzed to determine if its associated events have been satisfied, as no simulation may be carried out for such required input components of such rules.

Although process 600 of FIG. 6D is shown to include communication between media device 300 and first user controller device 100 such that device application 303 of media device 300 may be operative to receive new user control data 621 from first user controller device 100 and selectively supplement such user control data 621 for generating new media control data 628 that may at least partially control media application 305 based on first user controller device 100, it is to be understood that process 600 may also utilize similar communication between media device 300 and second user controller device 200 such that device application 303 of media device 300 may be operative to receive new user control data 621 from second user controller device 200 and selectively supplement such user control data for generating new media control data 628 that may at least partially control media application 305 based on second user controller device 200. For example, each one of steps 604-626 may be conducted for multiple different controller devices in parallel (e.g., when multiple users are controlling media application 305 at the same time using multiple different user controller devices, such as when a first user is interacting with first user controller device 100 while a second user is simultaneously interacting with second user controller device 200 for controlling the same multi-player video game media application 305). Alternatively, each one of steps 604-626 may be conducted for multiple different controller devices at different times (e.g., when a single user switches between controlling media application 305 with a first controller device and with a second controller device, such as when a first user initially interacts with first user controller device 100 for controlling media application 305 and then interacts with second user controller device 200 for controlling the same media application 305).

Developers of media application 305 may not be operative to communicate directly with controller application 103 of first user controller device or with controller application 203 of second user controller device 200 or with any other component of any controller device, let alone be operative to detect the types of the enabled input components of such a controller device, let alone the status of such input components. Instead, device application 303 may be provided as an intermediary that may communicate with both media application 305 (e.g., via a first API-M) and with controller application 103 (e.g., via a second API-U, which may be different than API-M), whereby media application 305 may be developed and/or may run agnostic to the limitations of one or more user electronic devices 100/200 that may be communicatively coupled to device application 303 for controlling media application 305. Similarly, controller application 103 may be developed and/or may run agnostic to the limitations or requirements of media application 305. Likewise, controller application 203 may be developed and/or may run agnostic to the limitations or requirements of media application 305. Media application 305 may therefore have a single origin API (e.g., API-M with device application 303), which may be publicly visible, but media application 305 may be prevented from interacting with the HID or core motion framework of device 300 and/or of device 100, while potentially being a system level provider of both. Additionally or alternatively, controller application 103 may be developed and/or may run agnostic to the limitations or requirements of controller application 203.

By using a customizable context-sensitive computer intelligence, device application 303 can map a game control scheme that requires a specific set of optimal input components to a scheme that may enable control by a non-optimal controller. Depending on the game situation, the computer intelligence may automate certain game actions (e.g., by simulating certain user control data by supplementing received user control data with application-generated control data) for altering the media control data provided to the game for certain user control data provided by the non-optimal controller. This may allow a non-optimal controller to play as effectively as an optimal controller, while also improving game accessibility. Many games may require complex controllers to play effectively. However, controllers with the desired functionality are not always available to the user. This problem may be particularly pronounced for games designed for fully-equipped controllers (e.g., the DualShock 4 Wireless Controller for PlayStation 4 made available by Sony Corporation of Tokyo, Japan and/or the Xbox One Wireless Controller for Xbox One made available by Microsoft Corporation of Redmond, Wash.) when used with a partially-equipped controller or a non-optimal controller that does not include every input component type as the fully-equipped controller (e.g., an iPhone™ made available by Apple Inc. of Cupertino, Calif.). When a non-optimal controller is detected, media device 300 may employ a context-sensitive computer intelligence to automate certain game actions, which may enable user interaction with a non-optimal controller to play as or at least almost as effectively as user interaction with an optimal controller.

Game developers of media application 305 may first define their optimal control scheme for a fully-enabled or optimal controller, and may then use a simple rule system to define what game actions may need to be automated for non-ideal controllers and when such actions should be triggered (e.g., a game rule system that may be represented by a data structure, such as by data structure 1099). When a controller is communicatively coupled with media device 300, its available input components may be examined with respect to those of the optimal controller for the media application. If the controller does not have the desired functionality, but meets a bare minimum requirement for enabling control of the media application, the computer intelligence may use the rule system to automate the game actions for the missing inputs. When the game is running, the computer intelligence may watch for the conditions defined by the controller rules to be triggered. When a rule is triggered, the computer intelligence may take the appropriate action. For example, the missing input may be simulated for supplementing media control data provided to the media application, such that to the underlying media application it may appear as if the user is providing all such control data using an optimal or fully-featured controller. The optimal control scheme may be selected automatically at runtime of the media application. This may seamlessly allow multiple controllers of varying levels of capability to be used on the same system for multi-player gaming. Partial automation of game actions may improve accessibility. As such, game developers may not need to know details of the one or more user controllers that may be controlling the game, as all controller-handling may be provided by the computer intelligence (e.g., of device application 303), thereby obviating the need for developers to worry about covering every distinct situation for every potential controller that may be used.

Therefore, a rule system may be utilized that may allow a game developer to outline an optimal control scheme for an optimal controller and fallback automation rules for when a particular controller functionality of the optimal controller is not available during use of the game. Such rules may be observed in light of new media event system notification data generated during use of the game and if a particular rule is satisfied by a particular state of the game (e.g., by one or more events), the game controller framework may bridge in and simulate a missing controller functionality of that satisfied rule (e.g., the functionality of any missing controller input may be automatically covered by the game controller framework such that any associated input actions may be automatically generated for the user). Such a rule system may genericize a game, which may make it easier for non-gamers or gamers with disabilities to more effectively control the game with a non-optimal controller. Rather than requiring media application 305 to query what type of user controller is being used (e.g., to determine the number and types of input components available to that user controller) in order to selectively run one of many available types of code (e.g., one of many various controller schemes based on the determined type of controller being used), device application 303 may enable developers of media application 305 to focus on one controller scheme (e.g., a superset) and then to define a single rule system for use by device application 303 for setting up an artificial intelligence bridge. The game (e.g., media application 305) may not identify or generate a query with respect to determining what type of user controller is being used to at least partially generate the media control data being provided to the game. Instead, the game may be developed to identify all input component types of an optimal controller that may be supported by the game, to identify each mandatory input component type of that superset that may be essential for gameplay, and to define an automation rule for each non-mandatory input component type of that superset for any or all game states of the game. The game controller framework (e.g., device application 303) may auto-populate the object that the game may poll for data by leveraging known controller capability to efficiently use the game's rule set. This may bring stability of controller use back to developers, increase runtime efficiency, and/or make it simpler for a game developer. Device application 303 may map data from each controller input component to a particular software control element of a controller profile to be read by media application 305 as media control data (e.g., the profile may be implemented as a class of API-M by device application 303).

It is to be understood that the steps shown in process 600 of FIG. 6D are merely illustrative and that existing steps may be modified or omitted, additional steps may be added, and the order of certain steps may be altered.

Description of FIG. 6A

FIG. 6A is a flowchart of an illustrative process 600*a* for enabling a user electronic device to control a media application processing module running a media application, wherein the user electronic device may include a plurality of enabled input components, wherein the media application may be associated with a plurality of input component types and a rule system that may include a plurality of rules, and wherein each rule of the plurality of rules may be associated with at least one input component type of the plurality of input component types and at least one event of a plurality of events. At step 631 of process 600*a*, the media electronic device may map each enabled input component of the user electronic device to a respective input component type of a proper subset of input component types of the plurality of input component types, such that each input component type of the proper subset is mapped to a particular enabled input component, and such that each input component type of the plurality of input component types not of the proper subset is not mapped to any enabled input component (e.g., at an instance of step 610 of process 600, as described with respect to FIG. 6D). At step 632 of process 600*a*, the media electronic device may receive from the user electronic device new user control data indicative of any new input component data from each enabled input component of the plurality of enabled input components (e.g., at an instance of step 620 of process 600, as described with respect to FIG. 6D). At step 633 of process 600*a*, the media electronic device may receive from the media application processing module new media event system notification data indicative of at least one new event of the media application (e.g., at an instance of step 622 of process 600, as described with respect to FIG. 6D). At step 634 of process 600*a*, the media electronic device may identify a particular rule of the plurality of rules, wherein each event of the at least one event associated with the identified particular rule is indicated by the at least one new event of the received new media event system notification data, and wherein at least one input component type of the at least one input component type associated with the identified particular rule is not mapped to any enabled input component of the plurality of enabled input components (e.g., at a portion of an instance of step 624 of process 600, as described with respect to FIG. 6D). At step 635 of process 600*a*, the media electronic device may supplement the received new user control data with simulated new input component data for each one of the at least one input component type of the at least one input component type associated with the identified particular rule that is not mapped to any enabled input component of the plurality of enabled input components (e.g., at a portion of an instance of step 624 of process 600, as described with respect to FIG. 6D). At step 636 of process 600*a*, the media electronic device may share the supplemented new user control data with the media application processing module (e.g., at an instance of step 626 of process 600, as described with respect to FIG. 6D).

It is to be understood that the steps shown in process 600*a* of FIG. 6A are merely illustrative and that existing steps may be modified or omitted, additional steps may be added, and the order of certain steps may be altered.

Figure 6:
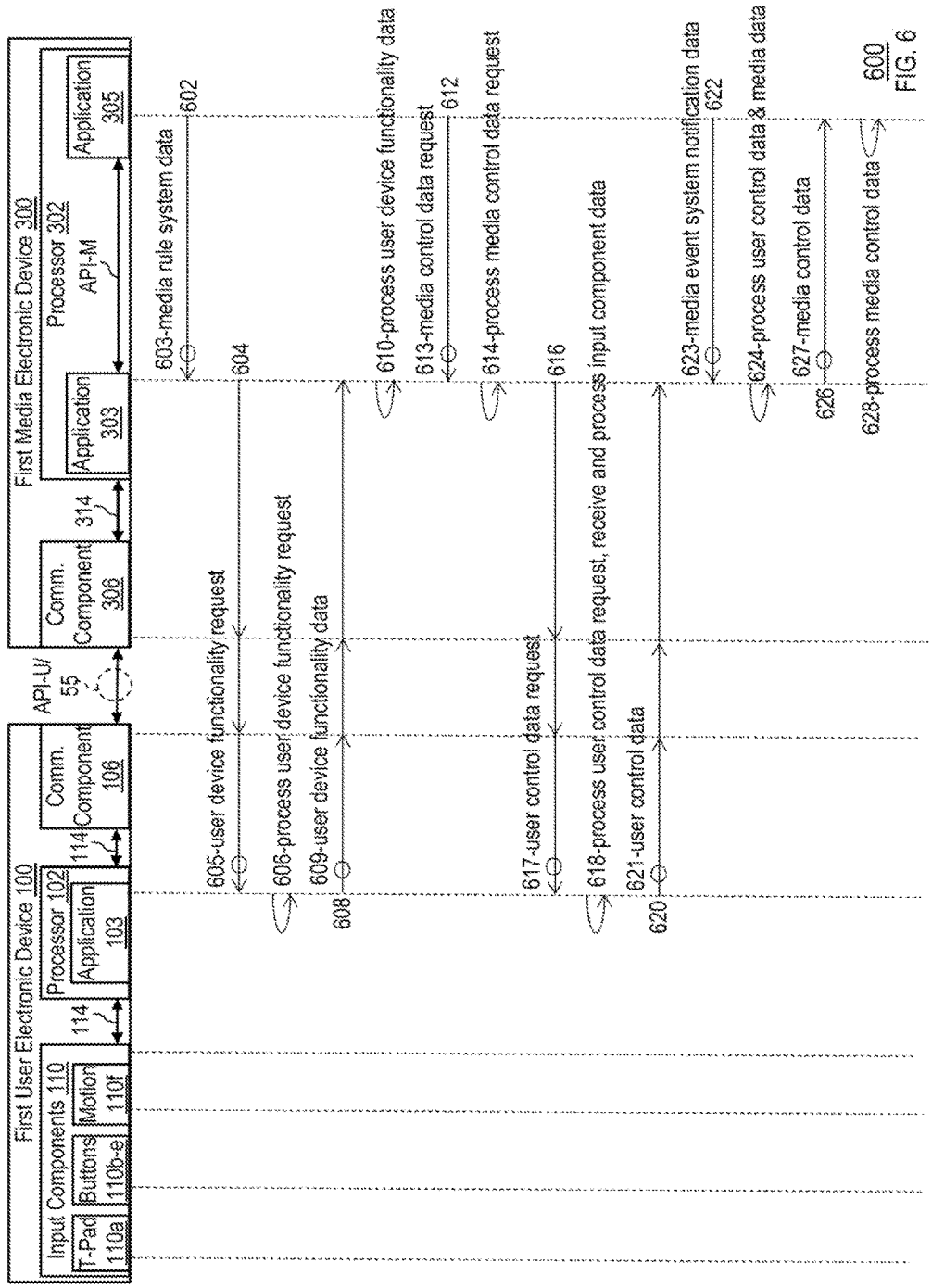
Figure 6B:
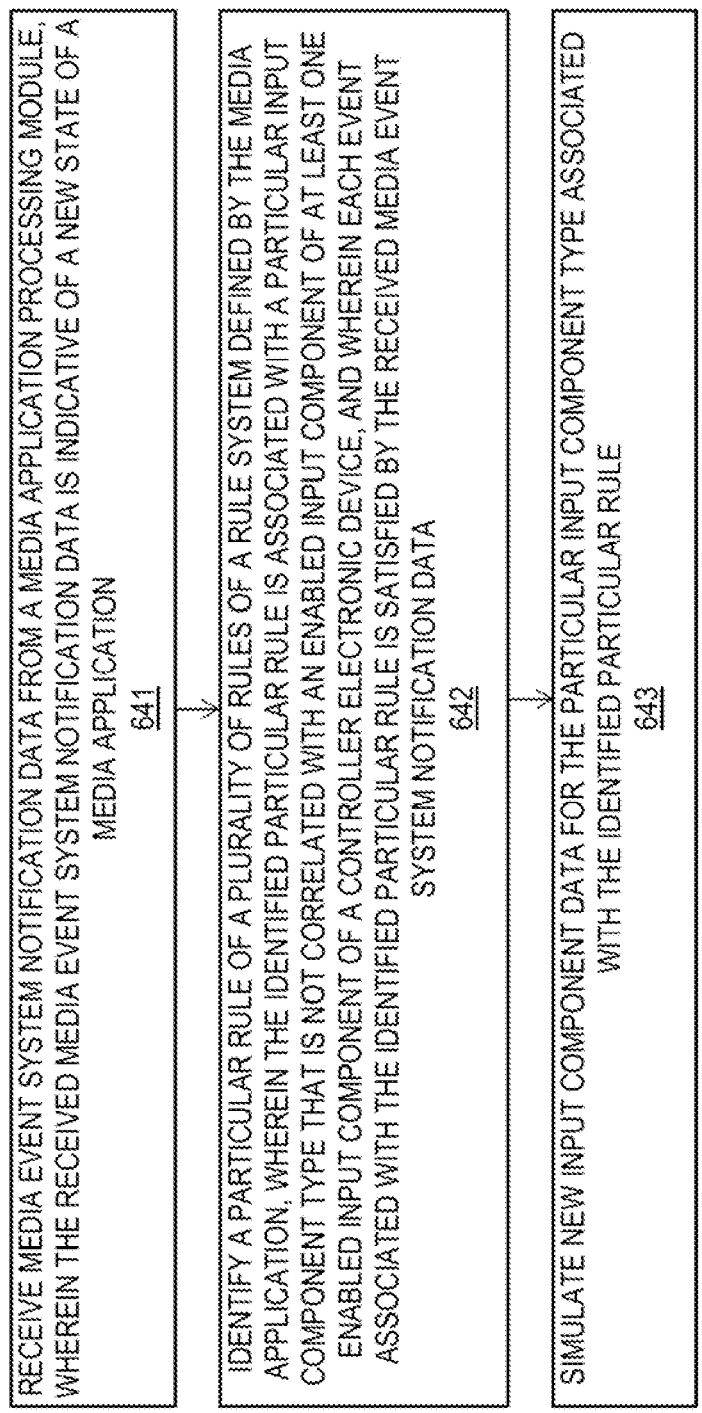

Description of FIG. 6B

FIG. 6B is a flowchart of an illustrative process 600*b* for enabling interaction between a media application processing module running a media application that may define a rule system including a plurality of rules, a device application processing module running a device application, and a controller application processing module running a controller application on a controller electronic device that may include at least one enabled input component. At step 641 of process 600b, the device application processing module may receive media event system notification data from the media application processing module, wherein the received media event system notification data may be indicative of a new state of the media application (e.g., at an instance of step 622 of process 600, as described with respect to FIG. 6D). At step 642 of process 600b, the device application processing module may identify a particular rule of the plurality of rules of the rule system, wherein the identified particular rule may be associated with a particular input component type that is not correlated with an enabled input component of the at least one enabled input component, and wherein each event associated with the identified particular rule may be satisfied by the received media event system notification data (e.g., at a portion of an instance of step 624 of process 600, as described with respect to FIG. 6D). At step 643 of process 600b, the device application processing module may simulate new input component data for the particular input component type associated with the identified particular rule (e.g., at a portion of an instance of step 624 of process 600, as described with respect to FIG. 6D).

It is to be understood that the steps shown in process 600b of FIG. 6B are merely illustrative and that existing steps may be modified or omitted, additional steps may be added, and the order of certain steps may be altered.

Figure 6C:
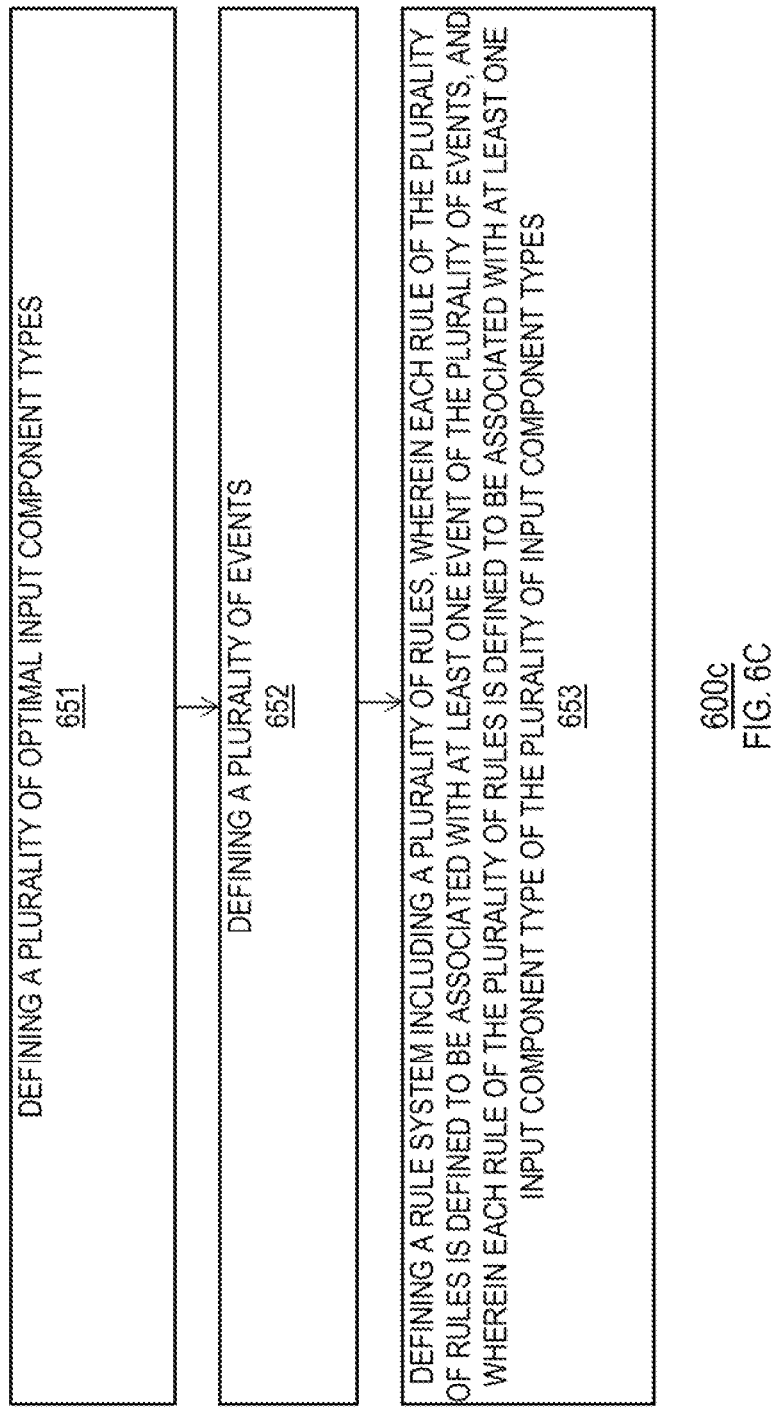

Description of FIG. 6C

FIG. 6C is a flowchart of an illustrative process 600c for developing a media application. At step 651 of process 600c, a plurality of optimal input component types may be defined for the media application (e.g., for media application 305). At step 652 of process 600c, a plurality of events may be defined for the media application (e.g., for media application 305). At step 653 of process 600c, a rule system including a plurality of rules may be defined for the media application (e.g., for media application 305), wherein each rule of the plurality of rules may be defined to be associated with at least one event of the plurality of events, and wherein each rule of the plurality of rules may be defined to be associated with at least one input component type of the plurality of input component types (e.g., each rule 1091 of data structure 1099, as described with respect to FIG. 10).

It is to be understood that the steps shown in process 600c of FIG. 6C are merely illustrative and that existing steps may be modified or omitted, additional steps may be added, and the order of certain steps may be altered.

Figure 9:
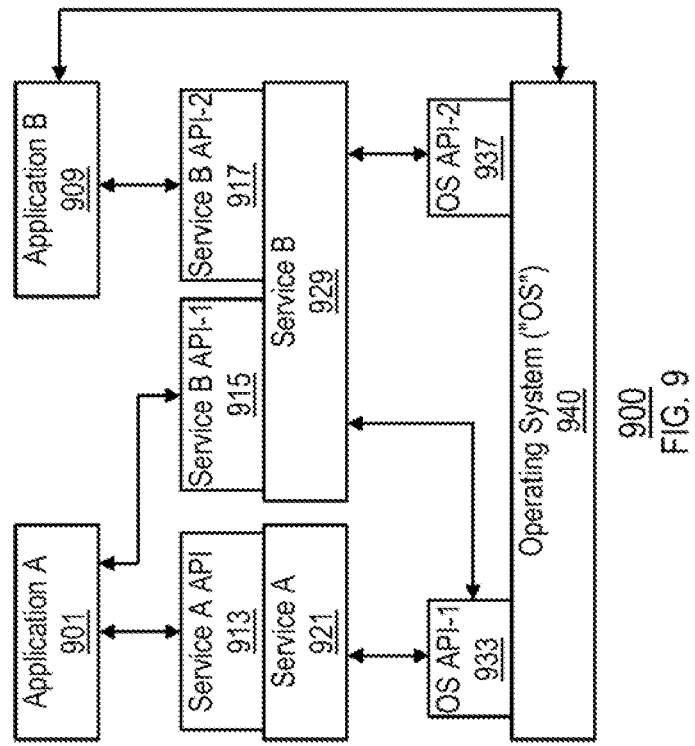
FIG. 9 is a block diagram of an illustrative API software stack, in accordance with some embodiments.
Figure 8:
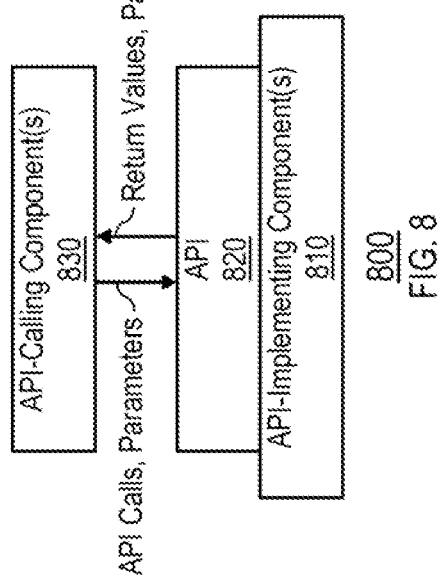
FIG. 8 is a block diagram of an illustrative application programming interface ("API") architecture, in accordance with some embodiments.

Description of FIG. 8 and FIG. 9

One or more application programming interfaces ("APIs") may be used in some embodiments (e.g., with respect to device 100, device 200, device 300, device 400, or any other suitable module or any other suitable portion of such device of FIGS. 1-7F). An API may be an interface implemented by a program code component or hardware component (hereinafter "API-implementing component") that may allow a different program code component or hardware component (hereinafter "API-calling component") to access and use one or more functions, methods, procedures, data structures, classes, and/or other services provided by the API-implementing component. An API can define one or more parameters that may be passed between the API-calling component and the API-implementing component.

An API may allow a developer of an API-calling component, which may be a third party developer, to leverage specified features provided by an API-implementing component. There may be one API-calling component or there may be more than one such component. An API can be a source code interface that a computer system or program library may provide in order to support requests for services from an application. An operating system ("OS") can have multiple APIs to allow applications running on the OS to call one or more of those APIs, and a service (e.g., a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (e.g., not exposed) and can provide a subset of the first set of functions and can also provide another set of functions, such as testing or debugging functions which are not in the first set of functions. In other embodiments, the API-implementing component may itself call one or more other components via an underlying API and may thus be both an API-calling component and an API-implementing component.

An API may define the language and parameters that API-calling components may use when accessing and using specified features of the API-implementing component. For example, an API-calling component may access the specified features of the API-implementing component through one or more API calls or invocations (e.g., embodied by function or method calls) exposed by the API and may pass data and control information using parameters via the API calls or invocations. The API-implementing component may return a value through the API in response to an API call from an API-calling component. While the API may defines the syntax and result of an API call (e.g., how to invoke the API call and what the API call does), the API may not reveal how the API call accomplishes the function specified by the API call. Various API calls may be transferred via the one or more application programming interfaces between the calling component (e.g., API-calling component) and an API-implementing component. Transferring the API calls may include issuing, initiating, invoking, calling, receiving, returning, and/or responding to the function calls or messages. Thus, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list, or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module. It should be understood that the API-implementing component and the API-calling component may be the same or different type of module from each other. API-implementing components may in some cases be embodied at least in part in firmware, microcode, or other hardware logic. In some embodiments, an API may allow a client program to use the services provided by a Software Development Kit ("SDK") library. In other embodiments, an application or other client program may use an API provided by an Application Framework. In such embodiments, the application or client program may incorporate calls to functions or methods provided by the SDK and provided by the API or may use data types or objects defined in the SDK and provided by the API. An Application Framework may, in these embodiments, provide a main event loop for a program that responds to various events defined by the Framework. The API may allow the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, and the like, and the API may be implemented in part by firmware, microcode, or other low level logic that may execute in part on the hardware component.

The API-calling component may be a local component (i.e., on the same data processing system as the API-implementing component) or a remote component (i.e., on a different data processing system from the API-implementing component) that may communicate with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that may be exposed to a different API-calling component.

The API may allow multiple API-calling components written in different programming languages to communicate with the API-implementing component, such that the API may include features for translating calls and returns between the API-implementing component and the API-calling component. However, the API may be implemented in terms of a specific programming language. An API-calling component can, in some embodiments, may call APIs from different providers, such as a set of APIs from an OS provider and another set of APIs from a plug-in provider and another set of APIs from another provider (e.g., the provider of a software library) or creator of the another set of APIs.

FIG. 8 is a block diagram illustrating an exemplary API architecture 800, which may be used in some embodiments. As shown in FIG. 8, the API architecture 800 may include an API-implementing component 810 (e.g., an operating system, a library, a device driver, an API, an application program, software, or other module) that may implement an API 820. API 820 may specify one or more functions, methods, classes, objects, protocols, data structures, formats, and/or other features of API-implementing component 810 that may be used by an API-calling component 830. API 820 can specify at least one calling convention that may specify how a function in API-implementing component 810 may receive parameters from API-calling component 830 and how the function may return a result to API-calling component 830. API-calling component 830 (e.g., an operating system, a library, a device driver, an API, an application program, software, or other module) may make API calls through API 820 to access and use the features of API-implementing component 810 that may be specified by API 820. API-implementing component 810 may return a value through API 820 to API-calling component 830 in response to an API call.

It is to be appreciated that API-implementing component 810 may include additional functions, methods, classes, data structures, and/or other features that may not be specified through API 820 and that may not be available to API-calling component 830. It is to be understood that API-calling component 830 may be on the same system as API-implementing component 810 or may be located remotely and may access API-implementing component 810 using API 820 over a network. While FIG. 8 illustrates a single API-calling component 830 interacting with API 820, it is to be understood that other API-calling components, which may be written in different languages than, or the same language as, API-calling component 830, may use API 820.

API-implementing component 810, API 820, and API-calling component 830 may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104, memory 204, memory 304, memory 404, server 70, server 170, and/or server 270 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol (e.g., the computer-readable medium may be communicated to one electronic device from another electronic device via a communications setup and/or to one electronic device from a remote server of a communications setup of the system). The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

FIG. 9 is a block diagram illustrating an exemplary software stack 900, which may be used in some embodiments. As shown in FIG. 9, Application A 901 and Application B 909 can make calls to Service A 921 or Service B 929 using several Service APIs (e.g., Service APIs 913, 915, and 917) and to Operating System ("OS") 940 using several OS APIs (e.g., OS APIs 933 and 937). Service A 921 and Service B 929 can make calls to OS 940 using several OS APIs (e.g., OS APIs 933 and 937).

For example, as shown in FIG. 9, Service B 929 may include two APIs, one of which (i.e., Service B API-1 915)

may receive calls from and return values to Application A 901 and the other of which (i.e., Service B API-2 917) may receive calls from and return values to Application B 909. Service A 921, which can be, for example, a software library, may make calls to and receive returned values from OS API-1 933, and Service B 929, which can be, for example, a software library, may make calls to and receive returned values from both OS API-1 933 and OS API-2 937. Application B 909 may make calls to and receive returned values from OS API-2 937.

In some embodiments, a data processing system may be provided to include a processor to execute instructions, and a memory coupled with the processor to store instructions that, when executed by the processor, may cause the processor to perform operations to generate an API that may allow an API-calling component to perform at least some of the operations of one or more of the processes described with respect to one or more of FIGS. 1-7F and 10. In some other embodiments, a data processing system may be provided to include a memory to store program code, and a processor to execute the program code to generate an API that may include one or more modules for performing at least some of the operations of one or more of the processes described with respect to one or more of FIGS. 1-7F and 10. In yet some other embodiments, a machine-readable storage medium may be provided that provides instructions that, when executed by a processor, cause the processor to generate an API that allows an API-implementing component to perform at least some of the operations of one or more of the processes described with respect to one or more of FIGS. 1-7F and 10. In yet some other embodiments, a data processing system may be provided to include an API-implementing component, and an API to interface the API-implementing component with an API-calling component, wherein the API may include one or more modules or means for performing at least some of the operations of one or more of the processes described with respect to one or more of FIGS. 1-7F and 10. In yet some other embodiments, a data processing system may be provided to include a processor to execute instructions, and a memory coupled with the processor to store instructions that, when executed by the processor, cause the processor to perform operations to generate an API-implementing component that implements an API, wherein the API exposes one or more functions to an API-calling component, and wherein the API may include one or more functions to perform at least some of the operations of one or more of the processes described with respect to one or more of FIGS. 1-7F and 10. In yet some other embodiments, a data processing system may be provided to include a processor to execute instructions, and a memory coupled with the processor to store instructions that, when executed by the processor, cause the processor to interface a component of the data processing system with an API-calling component and to perform at least some of the operations of one or more of the processes described with respect to one or more of FIGS. 1-7F and 10. In yet some other embodiments, an apparatus may be provided to include a machine-readable storage medium that provides instructions that, when executed by a machine, cause the machine to allow an API-calling component to perform at least some of the operations of one or more of the processes described with respect to one or more of FIGS. 1-7F and 10.

Further Description of FIGS. 1-10

Moreover, the processes described with respect to one or more FIGS. 1-10, as well as any other aspects of the disclosure, may each be implemented by software, but may also be implemented in hardware, firmware, or any combination of software, hardware, and firmware.

Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and optical data storage devices (e.g., memory 104, memory 204, memory 304, memory 404, server 70, server 170, and/or server 270 of FIG. 1). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol. Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of any one or more of device 100, device 200, device 300, and/or device 400 may be provided as a software construct, firmware construct, one or more hardware components, or a combination thereof, and may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of any one or more of device 100, device 200, device 300, and/or device 400 are merely illustrative, and that the number, configuration, functionality, and interconnection of existing modules may be modified or omitted, additional modules may be added, and the interconnection of certain modules may be altered.

At least a portion of one or more of the modules of any one or more of device 100, device 200, device 300, and/or device 400 may be stored in or otherwise accessible in any suitable manner (e.g., in memory 104 of device 100, in memory 204 of device 200, in memory 304 of device 300, in memory 404 of device 400, in server 70, in server 170, and/or in server 270). Any or each module of any one or more of device 100, device 200, device 300, and/or device 400 may be implemented using any suitable technologies (e.g., as one or more integrated circuit devices), and different modules may or may not be identical in structure, capabilities, and operation. Any or all of the modules or other components of any one or more of device 100, device 200, device 300, and/or device 400 may be mounted on an expansion card, mounted directly on a system motherboard, or integrated into a system chipset component (e.g., into a "north bridge" chip). Any one or more of device 100, device 200, device 300, and/or device 400 may include any amount of dedicated media playback memory, may include no dedicated media playback memory and may rely on device memory or network memory (e.g., memory of server 70), or may use any combination thereof.

It is to be understood that any process described above or any portion thereof may be carried out on any one of device 100, device 200, device 300, and/or device 400 or any combination thereof. For example, the entirety of process 330 of FIG. 3 may be carried out entirely on a single device (e.g., on device 300 that may be a portable user electronic device, such as an iPhone™ made available by Apple Inc. and that may be running media application 305 and device application 303 and that may be operative to enable or disable certain input components of that device 300 (e.g., a motion sensor input component) based on what control data is required by media application 305). As another example, device application 303 may be run on a first processor of a first electronic device and media application 305 may be run on a second processor of a second electronic device and API-M may be enabled over a communications set-up similar to API-U over communications set-up 55, such that the first electronic device running device application 303 may act as an intermediary device (e.g., a dongle) between the second electronic device running media application 305 (e.g., a gaming console) and a user controller device 100.

As mentioned, an input component 110 of device 100 (e.g., input component 110a) may include a touch input component that can receive touch input for interacting with other components of device 100 via wired or wireless bus 114. Such a touch input component 110 may be used to provide user input to device 100 in lieu of or in combination with other input components, such as a keyboard, mouse, and the like.

A touch input component 110 may include a touch sensitive panel, which may be wholly or partially transparent, semitransparent, non-transparent, opaque, or any combination thereof. A touch input component 110 may be embodied as a touch screen, touch pad, a touch screen functioning as a touch pad (e.g., a touch screen replacing the touchpad of a laptop), a touch screen or touch pad combined or incorporated with any other input device (e.g., a touch screen or touch pad disposed on a keyboard), or any multi-dimensional object having a touch sensitive surface for receiving touch input. In some embodiments, the terms touch screen and touch pad may be used interchangeably.

In some embodiments, a touch input component 110 embodied as a touch screen may include a transparent and/or semitransparent touch sensitive panel partially or wholly positioned over, under, and/or within at least a portion of a display output component 112. In other embodiments, a touch input component 110 may be embodied as an integrated touch screen where touch sensitive components/devices are integral with display components/devices. In still other embodiments, a touch input component 110 may be used as a supplemental or additional display screen for displaying supplemental or the same graphical data as a primary display and to receive touch input.

A touch input component 110 may be configured to detect the location of one or more touches or near touches based on capacitive, resistive, optical, acoustic, inductive, mechanical, chemical measurements, or any phenomena that can be measured with respect to the occurrences of the one or more touches or near touches in proximity to input component 110. Software, hardware, firmware, or any combination thereof may be used to process the measurements of the detected touches to identify and track one or more gestures.

A gesture may correspond to stationary or non-stationary, single or multiple, touches or near touches on a touch input component 110. A gesture may be performed by moving one or more fingers or other objects in a particular manner on touch input component 110, such as by tapping, pressing, rocking, scrubbing, rotating, twisting, changing orientation, pressing with varying pressure, and the like at essentially the same time, contiguously, or consecutively. A gesture may be characterized by, but is not limited to, a pinching, pulling, sliding, swiping, rotating, flexing, dragging, or tapping motion between or with any other finger or fingers. A single gesture may be performed with one or more hands, by one or more users, or any combination thereof.

An electronic device may drive a display with graphical data to display a graphical user interface ("GUI"). Such a GUI may be configured to receive touch input via a touch input component 110. Embodied as a touch screen (e.g., touch input component 110 with a display output component 112 as an I/O component 111), such a touch screen may display a GUI. Alternatively, a GUI may be displayed on a display (e.g., a display output component 112) separate from a touch input component 110. A GUI may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110f, which may be associated with the graphical elements of a GUI. In other embodiments, the user may perform gestures at one or more locations that are independent of the locations of graphical elements of a GUI. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of a device or system (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on a display screen. In other embodiments, in which gestures are performed directly on a touch screen, a user may interact directly with objects on the touch screen, with or without a cursor or pointer being displayed on the touch screen. Feedback may be provided to the user in response to or based on the touch or near touches on a touch input component 110. Feedback may be transmitted optically, mechanically, electrically, olfactory, acoustically, or the like or any combination thereof and in a variable or non-variable manner.

Further Applications of Described Concepts

While there have been described systems, methods, and computer-readable media for enabling efficient control of a media application at a media electronic device by a user electronic device, it is to be understood that many changes may be made therein without departing from the spirit and scope of the disclosure. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method for a media electronic device enabling a user electronic device to control a media application processing module, the method comprising:
   at the media electronic device:
      receiving from the user electronic device first user control data indicative of a first user position of a first user touch event of a user touch path along a touch sensitive surface of a touch input component of the user electronic device;
      defining a first actual device position based on the first user position of the received first user control data relative to the bounds of the touch sensitive surface;
      centering a virtual window within the bounds of the touch sensitive surface as close as possible to the first actual device position;
      after the centering, defining a first reportable device position based on the first actual device position relative to the bounds of the centered virtual window; and
      sharing the first reportable device position with the media application processing module.

2. The method of claim 1, further comprising, at the media electronic device, sharing the first reportable device position with the media application instead of sharing the first actual device position with the media application.

3. The method of claim 1, further comprising, at the media electronic device, after the centering:
   receiving from the user electronic device second user control data indicative of a second user position of a second user touch event of the user touch path along the touch sensitive surface of the touch input component of the user electronic device;
   defining a second actual device position based on the second user position relative to the bounds of the touch sensitive surface;
   determining whether the second actual device position is within the bounds of the centered virtual window;
   when the second actual device position is determined to be within the bounds of the centered virtual window, defining a second reportable device position based on the second actual device position relative to the bounds of the centered virtual window; and
   when the second actual device position is determined to not be within the bounds of the centered virtual window:
      identifying the point along the bounds of the centered virtual window that is closest to the second actual device position;
      moving the centered virtual window such that the identified point is coincident with the second actual device position; and
      defining the second reportable device position based on the second actual device position relative to the bounds of the moved virtual window.

4. The method of claim 3, further comprising, at the media electronic device, sharing the second reportable device position with the media application.

5. The method of claim 3, wherein:
   when the second actual device position is determined to be within the bounds of the centered virtual window, the defining the second reportable device position comprises setting the second reportable device position to be equal to the proportional position of the second actual device position with respect to the centered virtual window; and
   when the second actual device position is determined to not be within the bounds of the centered virtual window, the defining the second reportable device position comprises setting the second reportable device position to be equal to the proportional position of the second actual device position with respect to the moved virtual window.

6. The method of claim 1, wherein the size of the bounds of the virtual window is in the range of 50% to 75% of the size of the bounds of the touch sensitive surface.

7. The method of claim 1, wherein the media electronic device comprises the media application processing module.

8. The method of claim 1, wherein the first user touch event is an initial touch down event of the user touch path.

9. The method of claim 1 further comprising, at the media electronic device, prior to the centering, determining that the first user touch event is an initial touch down event, wherein the centering comprises centering the virtual window within the bounds of the touch sensitive surface as close as possible to the first actual device position when the first user touch event is determined to be an initial touch down event.

10. The method of claim 1, wherein the size of the bounds of the virtual window is less than 65% of the size of the bounds of the touch sensitive surface.

11. The method of claim 1, wherein the shape of the bounds of the virtual window is the same as the shape of the bounds of the touch sensitive surface.

12. The method of claim 1, wherein the centering comprises centering the virtual window at the first actual device position.

13. The method of claim 1, wherein the centering comprises centering the virtual window at a position within the bounds of the touch sensitive surface that is different than the first actual device position.

14. The method of claim 1, wherein the centering maintains the entirety of the virtual window within the bounds of the touch sensitive surface.

15. The method of claim 1, wherein the centering ensures that the entirety of the virtual window is aligned with the touch sensitive surface.

16. The method of claim 1, wherein the defining the first reportable device position comprises setting the first reportable device position to be equal to the proportional position of the first actual device position with respect to the centered virtual window.

17. A system for enabling interaction between a media application processing module running a media application, a device application processing module running a device application, and a user electronic device that comprises a touch input component comprising a touch sensitive surface, the system comprising:
   a media electronic device comprising:
      a processor comprising the device application processing module; and
      a communications component, wherein the device application processing module is operative to:

receive, via the communications component from the user electronic device, first user control data indicative of a first user position of a first user touch event of a user touch path along the touch sensitive surface of the touch input component of the user electronic device;

define a first actual device position based on the first user position of the received first user control data relative to the bounds of the touch sensitive surface;

center a virtual window within the bounds of the touch sensitive surface as close as possible to the first actual device position;

define a first reportable device position based on the first actual device position relative to the bounds of the centered virtual window; and share the first reportable device position with the media application processing module for controlling the media application.

18. The system of claim 17, wherein the device application processing module is further operative to:

receive, via the communications component from the user electronic device, second user control data indicative of a second user position of a second user touch event of the user touch path along the touch sensitive surface of the touch input component of the user electronic device;

define a second actual device position based on the second user position relative to the bounds of the touch sensitive surface;

determine whether the second actual device position is within the bounds of the centered virtual window;

when the second actual device position is determined to be within the bounds of the centered virtual window, define a second reportable device position based on the second actual device position relative to the bounds of the centered virtual window; and when the second actual device position is determined to not be within the bounds of the centered virtual window:

identify the point along the bounds of the centered virtual window that is closest to the second actual device position;

move the centered virtual window such that the identified point is coincident with the second actual device position; and define the second reportable device position based on the second actual device position relative to the bounds of the moved virtual window.

19. A non-transitory computer-readable medium comprising computer-readable instructions recorded thereon that, when executed by a processor of a media electronic device communicatively coupled to a user electronic device comprising a touch input component that comprises a touch sensitive surface, cause the processor to perform the following operations for controlling a media application processing module:

receiving from the user electronic device first user control data indicative of a first user position of a first user touch event of a user touch path along the touch sensitive surface of the touch input component of the user electronic device;

defining a first actual device position based on the first user position of the received first user control data relative to the bounds of the touch sensitive surface;

centering a virtual window within the bounds of the touch sensitive surface as close as possible to the first actual device position;

after the centering, defining a first reportable device position based on the first actual device position relative to the bounds of the centered virtual window; and sharing the first reportable device position with the media application processing module.

20. The non-transitory computer-readable medium of claim 19 further comprising additional computer-readable instructions recorded thereon that, when executed by the processor of the media electronic device, cause the processor to perform the following additional operations:

receiving from the user electronic device second user control data indicative of a second user position of a second user touch event of the user touch path along the touch sensitive surface of the touch input component of the user electronic device;

defining a second actual device position based on the second user position relative to the bounds of the touch sensitive surface;

determining whether the second actual device position is within the bounds of the centered virtual window;

when the second actual device position is determined to be within the bounds of the centered virtual window, defining a second reportable device position based on the second actual device position relative to the bounds of the centered virtual window; and when the second actual device position is determined to not be within the bounds of the centered virtual window:

identifying the point along the bounds of the centered virtual window that is closest to the second actual device position;

moving the centered virtual window such that the identified point is coincident with the second actual device position; and defining the second reportable device position based on the second actual device position relative to the bounds of the moved virtual window.

* * * * *

UNITED STATES PATENT AND TRADEMARK OFFICE
CERTIFICATE OF CORRECTION

PATENT NO. : 10,114,499 B2
APPLICATION NO. : 14/833943
DATED : October 30, 2018
INVENTOR(S) : Gasselin de Richebourg et al.

It is certified that error appears in the above-identified patent and that said Letters Patent is hereby corrected as shown below:

On the Title Page

Column 2, item (56), under "OTHER PUBLICATIONS", Line 1, delete "Conrtoller" and insert -- Controller --, therefor.

In the Specification

In Column 7, Line 1, delete "FIGS 3A-3C," and insert -- FIGS. 3A-3C, --, therefor.

In Column 73, Line 27, delete "applya" and insert -- apply a --, therefor.

In the Claims

In Column 100, Claim 9, Line 26, delete "claim 1" and insert -- claim 1, --, therefor.

Signed and Sealed this
Second Day of June, 2020

Andrei Iancu
*Director of the United States Patent and Trademark Office*